US012555676B2

(12) United States Patent
Shelton, IV et al.

(10) Patent No.: US 12,555,676 B2
(45) Date of Patent: Feb. 17, 2026

(54) ADAPTIVE CONTROL OF OPERATING ROOM SYSTEMS

(71) Applicant: Cilag GmbH International, Zug (CH)

(72) Inventors: Frederick E. Shelton, IV, Hillsboro, OH (US); Kevin M. Fiebig, Cincinnati, OH (US); Taylor W. Aronhalt, Loveland, OH (US)

(73) Assignee: Cilag GmbH International, Zug (CH)

( * ) Notice: Subject to any disclaimer, the term of this patent is extended or adjusted under 35 U.S.C. 154(b) by 487 days.

(21) Appl. No.: 17/335,566

(22) Filed: Jun. 1, 2021

(65) Prior Publication Data

US 2022/0378520 A1 Dec. 1, 2022

Related U.S. Application Data

(60) Provisional application No. 63/194,675, filed on May 28, 2021.

(51) Int. Cl.
*G16H 40/20* (2018.01)
*A61B 5/01* (2006.01)
(Continued)

(52) U.S. Cl.
CPC .............. *G16H 40/20* (2018.01); *A61B 5/01* (2013.01); *A61B 5/165* (2013.01); *A61B 34/10* (2016.02);
(Continued)

(58) Field of Classification Search
CPC ......... B64D 27/10; F01D 5/147; F01D 5/148; F01D 5/282; F05D 2220/36;
(Continued)

(56) References Cited

U.S. PATENT DOCUMENTS 6,547,720 B1 4/2003 Street
9,345,481 B2 5/2016 Hall et al.
(Continued)

FOREIGN PATENT DOCUMENTS

WO 2020/084625 A1 4/2020

OTHER PUBLICATIONS

Bree et al. The Dangers of Electrosurgical Smoke to Operating Room Personnel, Nov. , Wright State University General Surgery Residency,, p. 517-526. (Year: 2017).*

(Continued)

*Primary Examiner* — Kidest Bahta
(74) *Attorney, Agent, or Firm* — Condo Roccia Koptiw LLP

(57) ABSTRACT

Adaptive control of operating room systems is performed based upon monitored data associated with the operating room. Monitoring systems may collect data regarding the patient being treated in the operating room, the healthcare professionals participating in the surgical procedure, and/or the environment in the operating room. The collected data, referred to as monitored data, may be communicated to a surgical computing system. The surgical computing system may evaluate received monitored data in view of the surgical tasks that are ongoing in the operating room. The surgical computing system may determine, based upon the monitored data, parameters for controlling various systems associated with the operating room, and may communicate the parameters to the operating room systems. The parameters may be received, for example, at lighting systems, air filtration and extraction systems, smoke evacuation systems, sound systems, video systems, and/or display monitor systems, which may modify operation based upon the received parameters.

16 Claims, 21 Drawing Sheets

(51) Int. Cl.
*A61B 5/16* (2006.01)
*A61B 34/00* (2016.01)
*A61B 34/10* (2016.01)
*A61B 34/20* (2016.01)
*A61B 90/30* (2016.01)
*A61M 21/02* (2006.01)
*G01N 33/00* (2006.01)
*G05B 13/04* (2006.01)
*G05B 19/042* (2006.01)
*G07C 9/32* (2020.01)
*G16H 20/40* (2018.01)
*G16H 40/40* (2018.01)
*G16H 40/63* (2018.01)
*G16H 40/67* (2018.01)
*G16H 50/20* (2018.01)
*G16H 50/30* (2018.01)
*A61B 34/30* (2016.01)
*A61B 90/00* (2016.01)
*A61M 21/00* (2006.01)
*G16H 20/70* (2018.01)

(52) U.S. Cl.
CPC .............. *A61B 34/20* (2016.02); *A61B 34/25* (2016.02); *A61B 90/30* (2016.02); *A61M 21/02* (2013.01); *G01N 33/0075* (2013.01); *G05B 13/042* (2013.01); *G05B 19/042* (2013.01); *G07C 9/32* (2020.01); *G16H 20/40* (2018.01); *G16H 40/40* (2018.01); *G16H 40/63* (2018.01); *G16H 40/67* (2018.01); *G16H 50/20* (2018.01); *G16H 50/30* (2018.01); *A61B 2034/252* (2016.02); *A61B 2034/254* (2016.02); *A61B 34/30* (2016.02); *A61B 90/361* (2016.02); *A61B 90/37* (2016.02); *A61B 2090/372* (2016.02); *A61B 2505/05* (2013.01); *A61M 2021/0027* (2013.01); *G05B 2219/25257* (2013.01); *G16H 20/70* (2018.01)

(58) Field of Classification Search
CPC ......... F05D 2240/303; F05D 2240/307; F05D 2260/407; F05D 2270/02; F05D 2300/505; F05D 2300/603
See application file for complete search history.

(56) References Cited

U.S. PATENT DOCUMENTS

| | | | |
|---|---|---|---|
| 2002/0081979 A1* | 6/2002 | Okuya | G01V 1/223 455/67.11 |
| 2003/0143252 A1 | 7/2003 | Philippe et al. | |
| 2003/0195644 A1* | 10/2003 | Borders | A61G 12/00 340/568.1 |
| 2005/0251026 A1 | 11/2005 | Stone | |
| 2006/0082542 A1 | 4/2006 | Morita et al. | |
| 2007/0225574 A1 | 9/2007 | Ueda | |
| 2009/0248036 A1 | 10/2009 | Hoffman et al. | |
| 2011/0276340 A1 | 11/2011 | Deboer et al. | |
| 2014/0018960 A1 | 1/2014 | Itkowitz | |
| 2014/0263552 A1 | 9/2014 | Hall et al. | |
| 2014/0276855 A1 | 9/2014 | De La Barrera et al. | |
| 2014/0357984 A1 | 12/2014 | Wallace et al. | |
| 2015/0301732 A1* | 10/2015 | Henderson | G06T 7/0012 715/781 |
| 2016/0022374 A1 | 1/2016 | Haider et al. | |
| 2016/0179460 A1 | 6/2016 | Macdonald | |
| 2017/0086926 A1* | 3/2017 | Amling | A61B 34/25 |
| 2017/0090865 A1 | 3/2017 | Armstrong-muntner et al. | |
| 2017/0172675 A1 | 6/2017 | Jarc et al. | |
| 2017/0249432 A1 | 8/2017 | Grantcharov | |
| 2017/0296213 A1 | 10/2017 | Swensgard et al. | |
| 2018/0092706 A1 | 4/2018 | Anderson et al. | |
| 2018/0139434 A1 | 5/2018 | Roe et al. | |
| 2018/0242985 A1* | 8/2018 | Vipperman | A61B 90/06 |
| 2018/0344308 A1 | 12/2018 | Nawana et al. | |
| 2018/0360452 A1 | 12/2018 | Shelton, IV et al. | |
| 2019/0090969 A1 | 3/2019 | Jarc et al. | |
| 2019/0117217 A1 | 4/2019 | Overmyer et al. | |
| 2019/0125455 A1* | 5/2019 | Shelton, IV | A61B 17/072 |
| 2019/0200844 A1 | 7/2019 | Shelton, IV et al. | |
| 2019/0201087 A1 | 7/2019 | Shelton, IV et al. | |
| 2019/0201127 A1* | 7/2019 | Shelton, IV | G16H 20/40 |
| 2019/0201136 A1 | 7/2019 | Shelton, IV et al. | |
| 2019/0201137 A1 | 7/2019 | Shelton, IV et al. | |
| 2019/0206551 A1 | 7/2019 | Yates et al. | |
| 2019/0206569 A1 | 7/2019 | Shelton, IV et al. | |
| 2019/0290524 A1 | 9/2019 | Augustine et al. | |
| 2019/0328598 A1* | 10/2019 | Mangiardi | F21V 33/0088 |
| 2020/0138518 A1 | 5/2020 | Lang | |
| 2020/0138534 A1 | 5/2020 | Garcia Kilroy et al. | |
| 2020/0251017 A1 | 8/2020 | Rios et al. | |
| 2020/0396400 A1* | 12/2020 | Takahashi | H04N 25/534 |
| 2021/0015554 A1 | 1/2021 | Chow et al. | |
| 2021/0059857 A1 | 3/2021 | Voigt et al. | |
| 2021/0121232 A1 | 4/2021 | Fuerst et al. | |
| 2021/0138534 A1 | 5/2021 | Okada | |
| 2021/0335483 A1 | 10/2021 | Freeman et al. | |
| 2022/0233119 A1 | 7/2022 | Shelton, IV et al. | |
| 2022/0233241 A1 | 7/2022 | Shelton, IV et al. | |
| 2022/0233244 A1 | 7/2022 | Shelton, IV et al. | |
| 2022/0233253 A1 | 7/2022 | Shelton, IV et al. | |
| 2022/0233267 A1 | 7/2022 | Shelton, IV et al. | |
| 2022/0238209 A1 | 7/2022 | Shelton, IV et al. | |
| 2022/0384011 A1 | 12/2022 | Shelton, IV et al. | |
| 2022/0384016 A1 | 12/2022 | Shelton, IV et al. | |
| 2022/0384017 A1 | 12/2022 | Shelton, IV et al. | |
| 2022/0384018 A1 | 12/2022 | Shelton, IV et al. | |
| 2022/0384019 A1 | 12/2022 | Shelton, IV et al. | |
| 2022/0384025 A1 | 12/2022 | Shelton, IV et al. | |
| 2022/0399105 A1* | 12/2022 | Wagner Block | G16H 40/20 |
| 2022/0409326 A1 | 12/2022 | Wright et al. | |

OTHER PUBLICATIONS

Gianikellis et al., "A Method to Assess Upper-Body Postural Variability in Laparoscopic Surgery", 5th IEEE RAS & EMBS International Conference on Biomedical Robotics and Biomechatronics (BioRob), Sao Paulo, Brazil, Aug. 12-15, 2014, pp. 76-81.

Greer et al., "Human-Machine Interface for Robotic Surgery and Stereotaxy", IEEE/ASME Transactions on Mechatronics, vol. 13, No. 3, Jun. 2008, pp. 355-361.

Divakarla, Kavya Prabha, "ISO 26262 And IEC 61508 Functional Safety Overview", NXP: Secure Connections for Smarter World, Jun. 2017, 46 pages.

International Search Report and Written Opinion received for PCT Application No. PCT/IB2022/054907, Mailed on Aug. 18, 2022, 11 pages.

Invitation to Pay Additional Fees received for PCT Application No. PCT/IB2022/054897, Mailed on Sep. 1, 2022, 14 pages.

International Search Report and Written Opinion received for PCT Application No. PCT/IB2022/054897, Mailed on Dec. 6, 2022, 26 pages.

* cited by examiner

ADAPTIVE CONTROL OF OPERATING ROOM SYSTEMS

CROSS-REFERENCE TO RELATED APPLICATIONS

This application claims the benefit of Provisional U.S. Patent Application No. 63/194,675, filed May 28, 2021, the disclosure of which is incorporated herein by reference in its entirety.

This application is related to the following, filed contemporaneously, the contents of each of which are incorporated by reference herein:
- U.S. patent application Ser. No. 17/335,669, filed Jun. 1, 2021, titled EFFICIENCY OF MOTION MONITORING AND ANALYSIS FOR A SURGICAL PROCEDURE
- U.S. patent application Ser. No. 17/335,688, filed Jun. 1, 2021, titled ERGONOMIC MONITORING AND ANALYSIS FOR AN OPERATING ROOM

BACKGROUND

Operating rooms (OR) are complex and busy spaces. Surgical instruments that are used to perform surgical procedures are often advanced multifunction systems. During a surgical procedure, numerous surgical instruments may be employed and passed between healthcare professionals. Displays monitors may be used to display critical information related to the patient, the surgical procedure being performed, and/or the healthcare professionals. Numerous systems may be used to control environmental features such as, for example, lighting, heating and air conditioning, and air movement and filtration.

Successful surgeries depend on the expertise of several types of OR team members. The roles of different OR personnel may be different. Surgeons make the critical decisions involved in directing the course of a procedure. Surgeons may perform the incisions involved in an operation. Anesthesiologists or nurse anesthetists may be in charge of safely administering anesthesia to patients prior to surgery, monitoring them during surgery and making sure that they safely come out of anesthesia after the operation. A circulating technician may bring the patient to the operating room, tie the surgical gowns of surgeons and other personnel, deliver needed additional supplies such as instruments and medicine, and document the surgery. Scrub technicians may sterilize instruments before and after the surgery, keep the surgical field organized during surgery, and provide the surgeon with needed instruments. Registered nurses may perform the duties typically associated with surgical technicians, including acting as circulating nurses and scrub nurses. In addition, a nurse may act as the first assistant to the surgeon.

Ergonomic stressors in the OR, such as maintaining awkward positions for extended periods of time, can lead to a variety of musculoskeletal problems. Surgeons often develop pain in their neck, shoulders, and back, which may become debilitating, forcing them to halt an operation or miss work entirely. If left unchecked over time, significant degenerative changes can manifest, possibly resulting in a career-ending injury.

Healthcare professional motion and OR layouts may affect surgical procedure efficiency and surgical outcomes. Surgical procedures incur high costs based on the times required to complete the surgery. Minimizing procedure times can reduce costs associated with the surgery and improve surgical outcomes. Surgical procedures may reduce completion times by using an efficient OR layout.

SUMMARY

Systems, methods, and instrumentalities are disclosed for adaptive control of operating room systems based upon monitored data associated with the operating room. Data relating to, for example, the patient receiving treatment in the operating room, healthcare professionals working in the operating room, environmental readings in the operating room, and/or activity in the operating room may be collected and communicated to a surgical computing system. The surgical computing system may obtain the data, which may be referred to as monitored data, and may determine, based upon the monitored data, parameters for controlling various systems associated with the operating room. The surgical computing system may communicate the parameters to the systems which may modify their operation based upon the received parameters.

The surgical computing system may be configured to analyze monitored data to identify the occurrence of particular surgical events, and to control one or more operating room systems based upon detection that a surgical event is taking or has taken place. The surgical computing system may determine, based on the monitored data, that a particular surgical event, such as, for example, a significant step in a surgical procedure is being undertaken. The surgical computing system, based upon the monitored data and in view of the surgical event being undertaken, may determine parameters to modify operation of operating room systems. The surgical computing system may determine parameters for controlling the display of data on a display monitor used by the healthcare professionals performing the surgical procedure. The parameters may control the display monitor to highlight or emphasize on the display particular patient biomarker data that is relevant to the surgical event.

The surgical computing system may be configured to analyze monitored data and may determine, based upon the monitored data, parameters for adaptively controlling lighting systems in the operating room. The surgical computing system may obtain monitored data associated with one or more healthcare professionals in the operating room. The monitored data may comprise data associated with the focus of a healthcare professional, the location of the healthcare professional, and/or the activity of the healthcare professional. The monitored data may further comprise data associated with the surgical task that is being undertaken. The surgical computing system may determine, based on the monitored data, parameters for controlling or adjusting lighting systems in the operating room. For example, the surgical computing system may determine parameters that result in one or more lighting systems decreasing or increasing intensity depending upon the environment in the operating room as indicated by the monitored data.

The surgical computing system may be configured to analyze monitored data and may determine, based upon the monitored data, parameters for adaptively controlling air handling systems in the operating room. The surgical computing system may obtain monitored data that may be associated with, for example, air quality and/or air particulates in the air in the operating room. The surgical computing system may determine, based on the monitored data, parameters for controlling or adjusting operation of air handling and filtration systems. The parameters may adjust operating room systems that perform surgical insulation, smoke evacuation, and/or air filtration.

The surgical computing system may be configured to analyze monitored data and may determine, based upon the monitored data, parameters for adaptively controlling heating and/or cooling control systems associated with the operating room. The surgical computing system may obtain monitored data that may be associated with, for example, patient and/or healthcare professional's biomarkers. The surgical computing system may determine, based on the monitored data, that one or more temperatures associated with the operating room, patient, and/or healthcare providers is relatively high or low. The surgical computing system may determine parameters for controlling the heating and/or cooling systems associated with the operating room so as to raise and/or lower a particular temperature. The heating and/or cooling systems may be ambient and/or local control systems.

The surgical computing system may be configured to analyze monitored data and may determine, based upon the monitored data, parameters for adaptively controlling operating room systems to implement room conditions associated with a particular healthcare provider who may be participating in the ongoing surgical procedure. The surgical computing system may determine the monitored data may indicate or are associated with a particular step, e.g., a significant or critical step, of a surgical procedure. If the surgical computing system determines the monitored data indicate a particular step in a surgical procedure is being performed, the surgical computing system may determine parameters for operating room systems associated with preferred room conditions for a particular healthcare professional. The surgical computing system may be configured to determine parameters that implement hierarchical priority based adjustments to equipment based on situational awareness and importance of a step in a surgical procedure.

The surgical computing system may be configured to analyze monitored data and may determine, based on the monitored data, parameters for adaptively controlling operating room environment control systems. The surgical computing system may determine to generate parameters associated with adjusting, for example, one or more of the intensity, duration, and/or rapidity of operation of environmental control devices. For example, the surgical computing system may determine to generate parameters associated with the intensity of operation of an air flow control system. The surgical computing system may apply thresholds to considering the monitored data and may adjust the thresholds that the surgical computing system may apply over time based on the importance of the measure to the patient or a healthcare professional.

Systems, methods, and instrumentalities are disclosed for monitoring healthcare professionals (HCPs) in a surgical procedure and providing parameters associated with improving performance for surgical procedure(s) and/or maintenance of operating room(s). The parameters may include recommendations, adjustments, feedback, and/or control signals. The parameters may be associated with positioning, such as operating room (OR) layout, surgical equipment positioning, and/or the like. For example, a computing system may monitor HCP motion and interactions, and perform an analysis of HCP motion and interactions throughout a procedure. The computing system may perform an analysis of HCP motion and interactions throughout a procedure to identify improvements for positioning, OR layout, surgical instrument mix, access to the surgical site, and/or the like.

The computing system may record one or more of HCP motion, HCP activities, HCP, surgical instrument exchange, surgical instrument positioning, and/or the like. The computing system may analyze one or more of the HCP motion, HCP activities, HCP, surgical instrument exchange, surgical instrument positioning, and/or the like. The system may record and analyze one or more of the HCP motion, HCP activities, HCP, surgical instrument exchange, surgical instrument positioning, and/or the like to generate positioning parameters. The positioning parameters may include one or more of an OR layout, surgical instrument positioning, surgical site access positioning, camera positioning, display positioning, and/or the like.

For example, the computing system may obtain monitored data associated with an operating room. The monitored data may include data associated with one or more of HCP motion, HCP interactions, OR layout, surgical equipment location, surgical instrument mix, or surgical site access. The computing system may obtain procedure data associated with the surgical procedure plan. The computing system may determine one or more positioning parameters associated with a system associated with the operating room. The positioning parameters may include adjustments to one or more of OR layout, surgical instrument mix, surgical equipment positioning, and/or the like. The computing system may determine one or more adjustment parameters associated with HCP actions, HCP staffing, and/or the like. The computing system may communicate the positioning and/or adjustment parameters, for example, to one or more systems associated with the operating room.

Systems, methods, and instrumentalities are disclosed for monitoring HCPs in a surgical procedure and providing parameters associated with improving wear on HCPs. The parameters may be indicated in control signals, recommendations, adjustments, and/or feedback. The parameters may be associated with ergonomic positioning. For example, a computing system may monitor surgeon motion, posture, and surgical access to create recommendations to improve wear on HCPs.

A computing system may analyze motions and postures of HCPs, for example, throughout a surgical procedure. The computing system may analyze motions and postures of HCPs throughout a procedure to identify improvements for posture, weightlifting, standing, and the like. The computing system may record one or more of a patient position, a surgeon access location, and a surgeon access orientation. The computing system may analyze one or more of the patient position, surgeon access location, and/or surgeon access orientation. The computing system may record and analyze one or more of the patient position, surgeon access location, and/or surgeon access orientation to generate parameters. The parameters may minimize repositioning and awkward positions and postures. The parameters may include one or more of an instrument mix selection, a trocar location, an OR table setup, or a patient positioning. For example, the computing system may obtain monitored data associated with an operating room. The monitored data may include data associated with one or more of OR layout, surgical equipment location, patient positioning, surgical instrument mix, surgical device positioning, HCP motion(s), HCP posture(s), physical trait(s) of HCP(s), the head and/or eye position(s) of HCP(s), or surgical display positioning. The computing system may determine one or more ergonomic adjustment parameters associated with ergonomic positioning within the operating room based on the monitored data. The ergonomic adjustment parameter(s) may include adjustments to one or more of OR layout, patient positioning, surgical display operation, surgical equipment location and/or the like. The computing system may send an indication of the ergonomic adjustment parameter(s). The computing system may communicate the ergonomic adjustment parameter(s) associated with ergonomic positioning to one or more systems associated with the operating room. For example, the computing system may communicate the adjustment parameter(s) to a system configured to control surgical display(s) in the OR. The surgical display may present the ergonomic adjustment parameters. The system configured to control surgical display(s) may modify the positioning or settings of one or more surgical display(s), for example, based on the ergonomic adjustment parameters.

DETAILED DESCRIPTION

Figure 1:
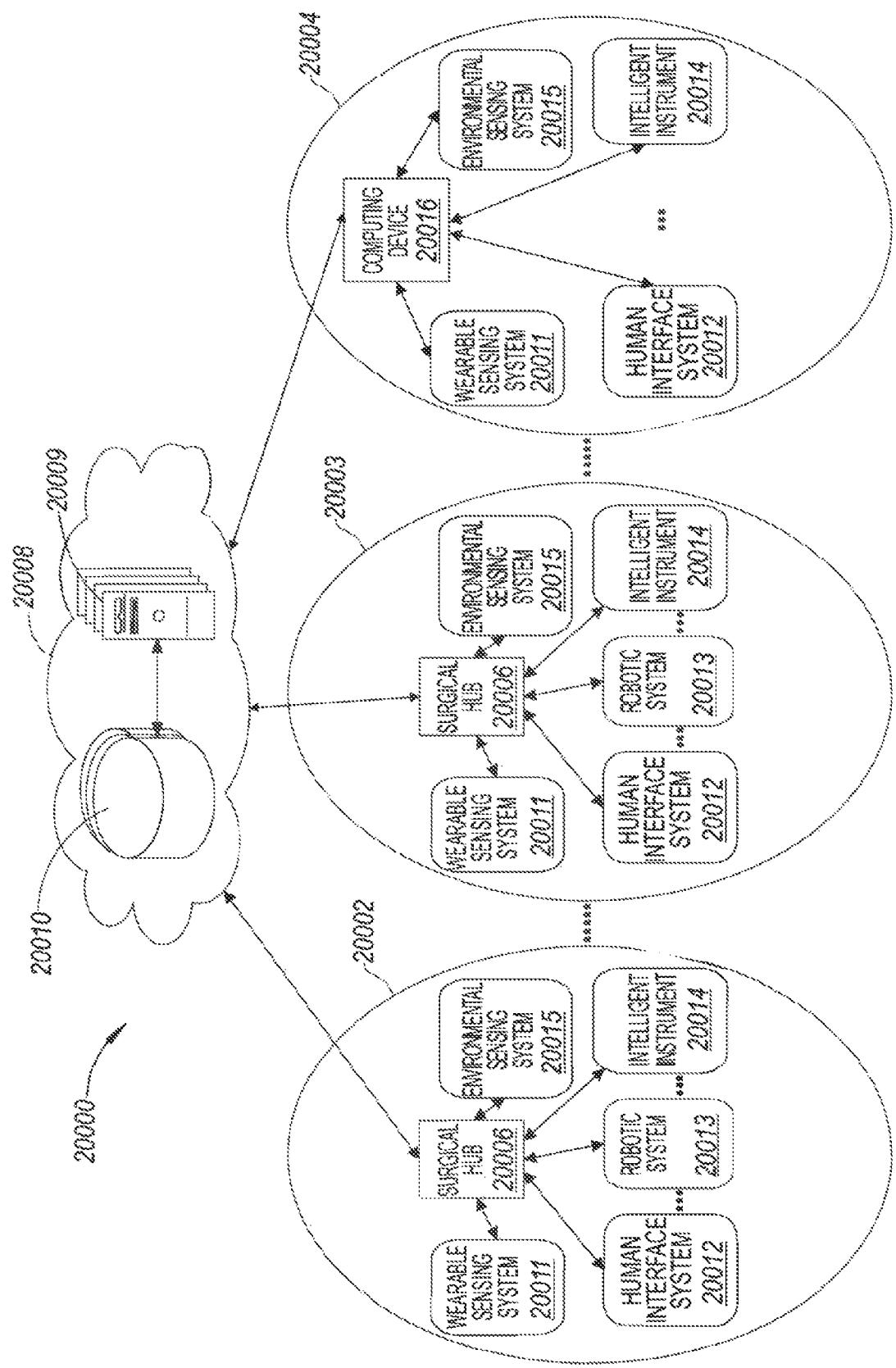
FIG. 1 is a block diagram of a computer-implemented healthcare personnel (HCP) monitoring system.

FIG. 1 is a block diagram of a computer-implemented HCP monitoring system 20000. An example HCP monitoring system such as the HCP monitoring system 20000 may include one or more HCP monitoring systems (e.g., HCP monitoring sub-systems) 20002, 20003 and 20004. For example, HCP monitoring system 20002 may include a computer-implemented interactive surgical system. For example, HCP monitoring system 20002 may include at least one of the following: a surgical hub 20006 in communication with a cloud computing system 20008, for example, as described in FIG. 2. An HCP monitoring system may include at least one of the following: a surgical hub 20006 or a computing device 20016 in communication with a could computing system 20008. The cloud computing system 20008 may include at least one remote cloud server 20009 and at least one remote cloud storage unit 20010. Example HCP monitoring systems 20002, 20003, or 20004 may include a wearable sensing system 20011, an environmental sensing system 20015, a robotic system 20013, one or more intelligent instruments 20014, human interface system 20012, etc. The human interface system is also referred herein as the human interface device. The wearable sensing system 20011 may include one or more HCP sensing systems, and/or one or more patient sensing systems. The environmental sensing system 20015 may include one or more devices, for example, used for measuring one or more environmental attributes, for example, as further described in FIG. 2. The robotic system 20013 may include a plurality of devices used for performing a surgical procedure, for example, as further described in FIG. 2.

The HCP monitoring system 20002 may be in communication with a remote server 20009 that may be part of a cloud computing system 20008. In an example, HCP monitoring system 20002 may be in communication with a remote server 20009 via an internet service provider's cable/FIOS networking node. In an example, a patient sensing system may be in direct communication with a remote server 20009. The HCP monitoring system 20002 and/or a component therein may communicate with the remote servers 20009 via a cellular transmission/reception point (TRP) or a base station using one or more of the following cellular protocols: GSM/GPRS/EDGE (2G), UMTS/HSPA (3G), long term evolution (LTE) or 4G, LTE-Advanced (LTE-A), new radio (NR) or 5G.

A surgical hub 20006 may have cooperative interactions with one of more means of displaying the image from the laparoscopic scope and information from one or more other smart devices and one or more sensing systems 20011. The surgical hub 20006 may interact with one or more sensing systems 20011, one or more smart devices, and multiple displays. The surgical hub 20006 may be configured to gather measurement data from the one or more sensing systems 20011 and send notifications or control messages to the one or more sensing systems 20011. The surgical hub 20006 may send and/or receive information including notification information to and/or from the human interface system 20012. The human interface system 20012 may include one or more human interface devices (HIDs). The surgical hub 20006 may send and/or receive notification information or control information to audio, display and/or control information to various devices that are in communication with the surgical hub.

For example, the sensing systems 20001 may include the wearable sensing system 20011 (which may include one or more HCP sensing systems and one or more patient sensing systems) and the environmental sensing system 20015 as discussed in FIG. 1. The one or more sensing systems 20001 may measure data relating to various biomarkers. The one or more sensing systems 20001 may measure the biomarkers using one or more sensors, for example, photosensors (e.g., photodiodes, photoresistors), mechanical sensors (e.g., motion sensors), acoustic sensors, electrical sensors, electrochemical sensors, thermoelectric sensors, infrared sensors, etc. The one or more sensors may measure the biomarkers as described herein using one of more of the following sensing technologies: photoplethysmography, electrocardiography, electroencephalography, colorimetry, impedimentary, potentiometry, amperometry, etc.

The biomarkers measured by the one or more sensing systems 20001 may include, but are not limited to, sleep, core body temperature, maximal oxygen consumption, physical activity, alcohol consumption, respiration rate, oxygen saturation, blood pressure, blood sugar, heart rate variability, blood potential of hydrogen, hydration state, heart rate, skin conductance, peripheral temperature, tissue perfusion pressure, coughing and sneezing, gastrointestinal motility, gastrointestinal tract imaging, respiratory tract bacteria, edema, mental aspects, sweat, circulating tumor cells, autonomic tone, circadian rhythm, and/or menstrual cycle.

The biomarkers may relate to physiologic systems, which may include, but are not limited to, behavior and psychology, cardiovascular system, renal system, skin system, nervous system, gastrointestinal system, respiratory system, endocrine system, immune system, tumor, musculoskeletal system, and/or reproductive system. Information from the biomarkers may be determined and/or used by the computer-implemented patient and HCP monitoring system 20000, for example. The information from the biomarkers may be determined and/or used by the computer-implemented patient and HCP monitoring system 20000 to improve said systems and/or to improve patient outcomes, for example. The one or more sensing systems 20001, biomarkers 20005, and physiological systems are described in more detail in U.S. application Ser. No. 17/156,287, titled METHOD OF ADJUSTING A SURGICAL PARAMETER BASED ON BIOMARKER MEASUREMENTS, filed Jan. 22, 2021, the disclosure of which is herein incorporated by reference in its entirety.

Figure 2:
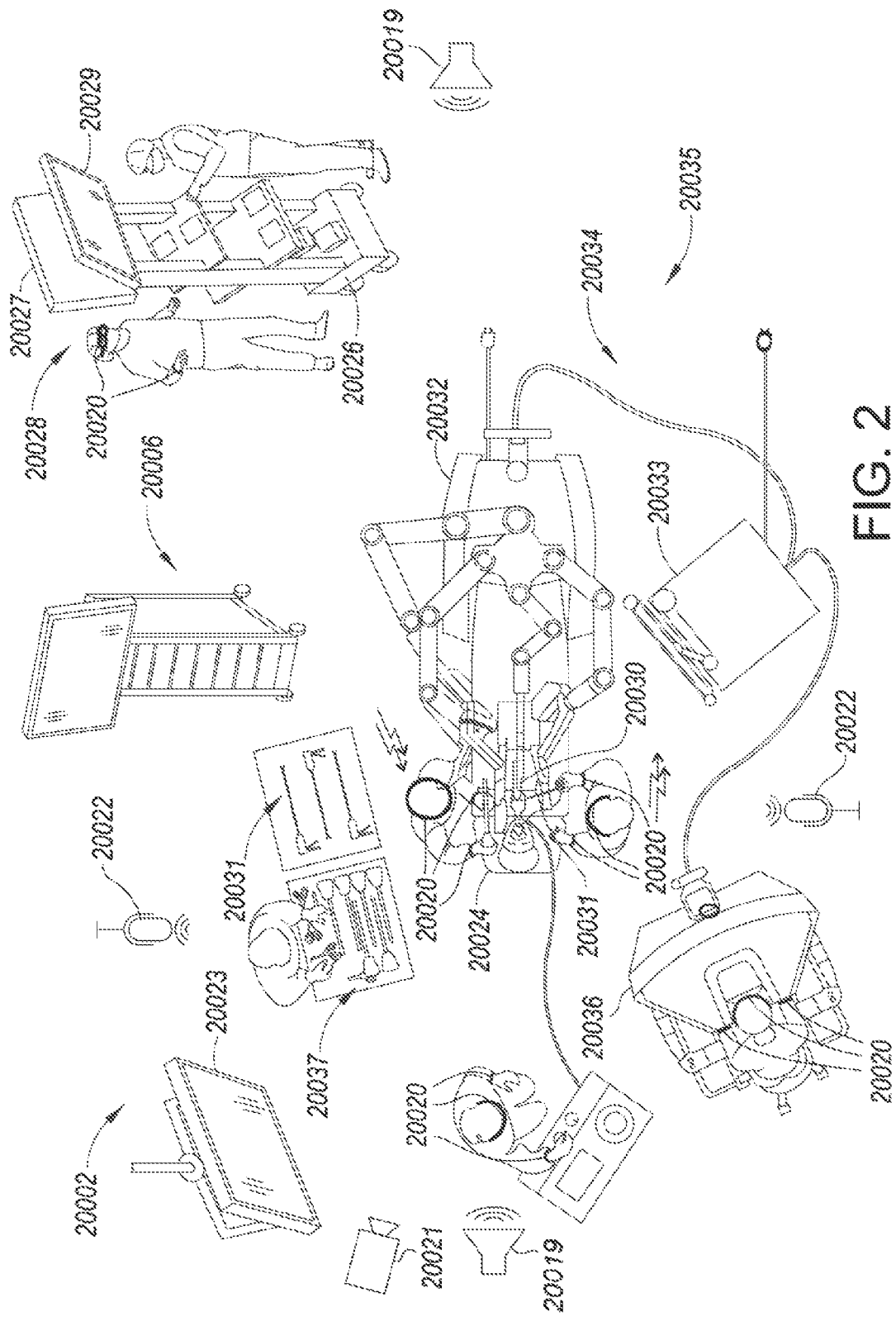
FIG. 2 shows an example of an HCP monitoring system in a surgical operating room.

FIG. 2 shows an example of an HCP monitoring system 20002 in a surgical operating room. As illustrated in FIG. 2, a patient is being operated on by one or more health care professionals (HCPs). The HCPs are being monitored by one or more HCP sensing systems 20020 worn by the HCPs. The HCPs and the environment surrounding the HCPs may also be monitored by one or more environmental sensing systems including, for example, a set of cameras 20021, a set of microphones 20022, and other sensors, etc. that may be deployed in the operating room. The HCP sensing systems 20020 and the environmental sensing systems may be in communication with a surgical hub 20006, which in turn may be in communication with one or more cloud servers 20009 of the cloud computing system 20008, as shown in FIG. 1. The environmental sensing systems may be used for measuring one or more environmental attributes, for example, HCP position in the surgical theater, HCP movements, ambient noise in the surgical theater, temperature/humidity in the surgical theater, etc.

As illustrated in FIG. 2, a primary display 20023 and one or more audio output devices (e.g., speakers 20019) are positioned in the sterile field to be visible to an operator at the operating table 20024. In addition, a visualization/notification tower 20026 is positioned outside the sterile field. The visualization/notification tower 20026 may include a first non-sterile human interactive device (HID) 20027 and a second non-sterile HID 20029, which may face away from each other. The HID may be a display or a display with a touchscreen allowing a human to interface directly with the HID. A human interface system, guided by the surgical hub 20006, may be configured to utilize the HIDs 20027, 20029, and 20023 to coordinate information flow to operators inside and outside the sterile field. In an example, the surgical hub 20006 may cause an HID (e.g., the primary HID 20023) to display a notification and/or information about the patient and/or a surgical procedure step. In an example, the surgical hub 20006 may prompt for and/or receive input from personnel in the sterile field or in the non-sterile area. In an example, the surgical hub 20006 may cause an HID to display a snapshot of a surgical site, as recorded by an imaging device 20030, on a non-sterile HID 20027 or 20029, while maintaining a live feed of the surgical site on the primary HID 20023. The snapshot on the non-sterile display 20027 or 20029 can permit a non-sterile operator to perform a diagnostic step relevant to the surgical procedure, for example.

In one aspect, the surgical hub 20006 may be configured to route a diagnostic input or feedback entered by a non-sterile operator at the visualization tower 20026 to the primary display 20023 within the sterile field, where it can be viewed by a sterile operator at the operating table. In one example, the input can be in the form of a modification to the snapshot displayed on the non-sterile display 20027 or 20029, which can be routed to the primary display 20023 by the surgical hub 20006.

Referring to FIG. 2, a surgical instrument 20031 is being used in the surgical procedure as part of the HCP monitoring system 20002. The hub 20006 may be configured to coordinate information flow to a display of the surgical instrument 20031. For example, in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety. A diagnostic input or feedback entered by a non-sterile operator at the visualization tower 20026 can be routed by the hub 20006 to the surgical instrument display within the sterile field, where it can be viewed by the operator of the surgical instrument 20031. Example surgical instruments that are suitable for use with the HCP monitoring system 20002 are described under the heading "Surgical Instrument Hardware" and in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety, for example.

FIG. 2 illustrates an example of an HCP monitoring system 20002 being used to perform a surgical procedure on a patient who is lying down on an operating table 20024 in a surgical operating room 20035. A robotic system 20034 may be used in the surgical procedure as a part of the HCP monitoring system 20002. The robotic system 20034 may include a surgeon's console 20036, a patient side cart 20032 (surgical robot), and a surgical robotic hub 20033. The patient side cart 20032 can manipulate at least one removably coupled surgical tool 20037 through a minimally invasive incision in the body of the patient while the surgeon views the surgical site through the surgeon's console 20036. An image of the surgical site can be obtained by a medical imaging device 20030, which can be manipulated by the patient side cart 20032 to orient the imaging device 20030. The robotic hub 20033 can be used to process the images of the surgical site for subsequent display to the surgeon through the surgeon's console 20036.

Other types of robotic systems can be readily adapted for use with the HCP monitoring system 20002. Various examples of robotic systems and surgical tools that are suitable for use with the present disclosure are described in U.S. Patent Application Publication No. US 2019-0201137 A1 (U.S. patent application Ser. No. 16/209,407), titled METHOD OF ROBOTIC HUB COMMUNICATION, DETECTION, AND CONTROL, filed Dec. 4, 2018, the disclosure of which is herein incorporated by reference in its entirety.

Various examples of cloud-based analytics that are performed by the cloud computing system 20008, and are suitable for use with the present disclosure, are described in U.S. Patent Application Publication No. US 2019-0206569 A1 (U.S. patent application Ser. No. 16/209,403), titled METHOD OF CLOUD BASED DATA ANALYTICS FOR USE WITH THE HUB, filed Dec. 4, 2018, the disclosure of which is herein incorporated by reference in its entirety.

In various aspects, the imaging device 20030 may include at least one image sensor and one or more optical components. Suitable image sensors may include, but are not limited to, Charge-Coupled Device (CCD) sensors and Complementary Metal-Oxide Semiconductor (CMOS) sensors.

The optical components of the imaging device 20030 may include one or more illumination sources and/or one or more lenses. The one or more illumination sources may be directed to illuminate portions of the surgical field. The one or more image sensors may receive light reflected or refracted from the surgical field, including light reflected or refracted from tissue and/or surgical instruments.

The one or more illumination sources may be configured to radiate electromagnetic energy in the visible spectrum as well as the invisible spectrum. The visible spectrum, sometimes referred to as the optical spectrum or luminous spectrum, is that portion of the electromagnetic spectrum that is visible to (i.e., can be detected by) the human eye and may be referred to as visible light or simply light. A typical human eye will respond to wavelengths in air that range from about 380 nm to about 750 nm.

The invisible spectrum (e.g., the non-luminous spectrum) is that portion of the electromagnetic spectrum that lies below and above the visible spectrum (i.e., wavelengths below about 380 nm and above about 750 nm). The invisible spectrum is not detectable by the human eye. Wavelengths greater than about 750 nm are longer than the red visible spectrum, and they become invisible infrared (IR), microwave, and radio electromagnetic radiation. Wavelengths less than about 380 nm are shorter than the violet spectrum, and they become invisible ultraviolet, x-ray, and gamma ray electromagnetic radiation.

In various aspects, the imaging device 20030 is configured for use in a minimally invasive procedure. Examples of imaging devices suitable for use with the present disclosure include, but are not limited to, an arthroscope, angioscope, bronchoscope, choledochoscope, colonoscope, cytoscope, duodenoscope, enteroscope, esophagogastro-duodenoscope (gastroscope), endoscope, laryngoscope, nasopharyngo-neproscope, sigmoidoscope, thoracoscope, and ureteroscope.

The imaging device may employ multi-spectrum monitoring to discriminate topography and underlying structures. A multi-spectral image is one that captures image data within specific wavelength ranges across the electromagnetic spectrum. The wavelengths may be separated by filters or by the use of instruments that are sensitive to particular wavelengths, including light from frequencies beyond the visible light range, e.g., IR and ultraviolet. Spectral imaging can allow extraction of additional information that the human eye fails to capture with its receptors for red, green, and blue. The use of multi-spectral imaging is described in greater detail under the heading "Advanced Imaging Acquisition Module" in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety. Multi-spectrum monitoring can be a useful tool in relocating a surgical field after a surgical task is completed to perform one or more of the previously described tests on the treated tissue. It is axiomatic that strict sterilization of the operating room and surgical equipment is required during any surgery. The strict hygiene and sterilization conditions required in a "surgical theater," i.e., an operating or treatment room, necessitate the highest possible sterility of all medical devices and equipment. Part of that sterilization process is the need to sterilize anything that comes in contact with the patient or penetrates the sterile field, including the imaging device 20030 and its attachments and components. It will be appreciated that the sterile field may be considered a specified area, such as within a tray or on a sterile towel, that is considered free of microorganisms, or the sterile field may be considered an area, immediately around a patient, who has been prepared for a surgical procedure. The sterile field may include the scrubbed team members, who are properly attired, and all furniture and fixtures in the area.

Wearable sensing system 20011 illustrated in FIG. 1 may include one or more sensing systems, for example, HCP sensing systems 20020 as shown in FIG. 2. The HCP sensing systems 20020 may include sensing systems to monitor and detect a set of physical states and/or a set of physiological states of a healthcare personnel (HCP). An HCP may be a surgeon or one or more healthcare personnel assisting the surgeon or other healthcare service providers in general. In an example, a sensing system 20020 may measure a set of biomarkers to monitor the heart rate of an HCP. In an example, a sensing system 20020 worn on a surgeon's wrist (e.g., a watch or a wristband) may use an accelerometer to detect hand motion and/or shakes and determine the magnitude and frequency of tremors. The sensing system 20020 may send the measurement data associated with the set of biomarkers and the data associated with a physical state of the surgeon to the surgical hub 20006 for further processing. One or more environmental sensing devices may send environmental information to the surgical hub 20006. For example, the environmental sensing devices may include a camera 20021 for detecting hand/body position of an HCP. The environmental sensing devices may include microphones 20022 for measuring the ambient noise in the surgical theater. Other environmental sensing devices may include devices, for example, a thermometer to measure temperature and a hygrometer to measure humidity of the surroundings in the surgical theater, etc. The surgical hub 20006, alone or in communication with the cloud computing system, may use the surgeon biomarker measurement data and/or environmental sensing information to modify the control algorithms of hand-held instruments or the averaging delay of a robotic interface, for example, to minimize tremors. In an example, the HCP sensing systems 20020 may measure one or more surgeon biomarkers associated with an HCP and send the measurement data associated with the surgeon biomarkers to the surgical hub 20006. The HCP sensing systems 20020 may use one or more of the following RF protocols for communicating with the surgical hub 20006: Bluetooth, Bluetooth Low-Energy (BLE), Bluetooth Smart, Zigbee, Z-wave, IPv6 Low-power wireless Personal Area Network (6LoWPAN), Wi-Fi. The surgeon biomarkers may include one or more of the following: stress, heart rate, etc. The environmental measurements from the surgical theater may include ambient noise level associated with the surgeon or the patient, surgeon and/or staff movements, surgeon and/or staff attention level, etc.

The surgical hub 20006 may use the surgeon biomarker measurement data associated with an HCP to adaptively control one or more surgical instruments 20031. For example, the surgical hub 20006 may send a control program to a surgical instrument 20031 to control its actuators to limit or compensate for fatigue and use of fine motor skills. The surgical hub 20006 may send the control program based on situational awareness and/or the context on importance or criticality of a task. The control program may instruct the instrument to alter operation to provide more control when control is needed.

Figure 3:
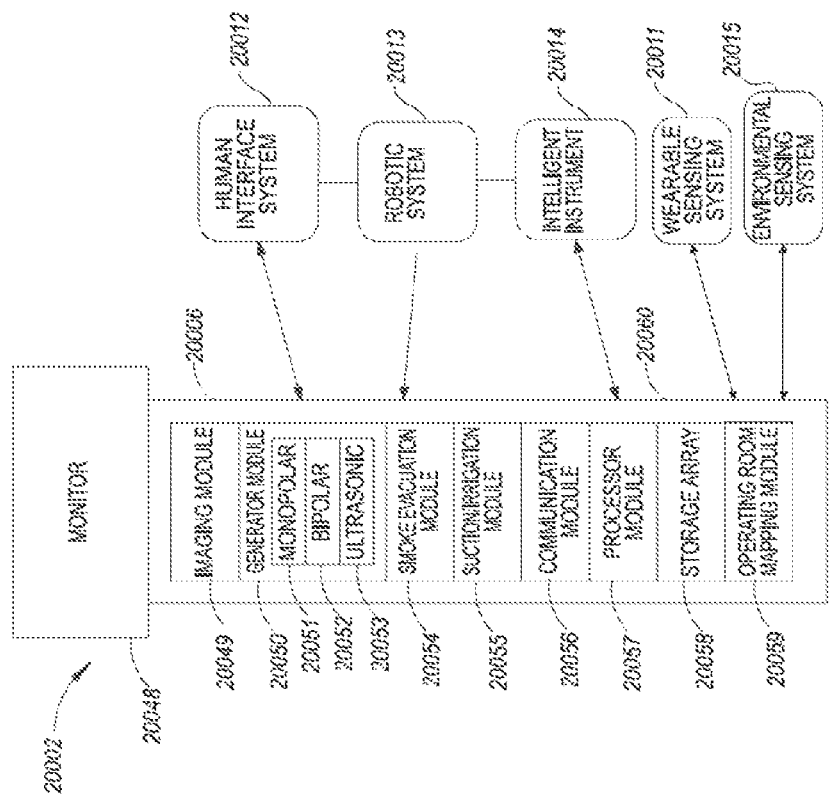
FIG. 3 illustrates an example surgical hub paired with various systems.

FIG. 3 shows an example HCP monitoring system 20002 with a surgical hub 20006 paired with a wearable sensing system 20011, an environmental sensing system 20015, a human interface system 20012, a robotic system 20013, and an intelligent instrument 20014. The hub 20006 includes a display 20048, an imaging module 20049, a generator module 20050, a communication module 20056, a processor module 20057, a storage array 20058, and an operating-room mapping module 20059. In certain aspects, as illustrated in FIG. 3, the hub 20006 further includes a smoke evacuation module 20054 and/or a suction/irrigation module 20055. During a surgical procedure, energy application to tissue, for sealing and/or cutting, is generally associated with a smoke evacuation, suction of excess fluid, and/or irrigation of the tissue. Fluid, power, and/or data lines from different sources are often entangled during the surgical procedure. Valuable time can be lost addressing this issue during a surgical procedure. Detangling the lines may necessitate disconnecting the lines from their respective modules, which may require resetting the modules. The hub modular enclosure 20060 offers a unified environment for managing the power, data, and fluid lines, which reduces the frequency of entanglement between such lines. Aspects of the present disclosure present a surgical hub 20006 for use in a surgical procedure that involves energy application to tissue at a surgical site. The surgical hub 20006 includes a hub enclosure 20060 and a combo generator module slidably receivable in a docking station of the hub enclosure 20060. The docking station includes data and power contacts. The combo generator module includes two or more of an ultrasonic energy generator component, a bipolar RF energy generator component, and a monopolar RF energy generator component that are housed in a single unit. In one aspect, the combo generator module also includes a smoke evacuation component, at least one energy delivery cable for connecting the combo generator module to a surgical instrument, at least one smoke evacuation component configured to evacuate smoke, fluid, and/or particulates generated by the application of therapeutic energy to the tissue, and a fluid line extending from the remote surgical site to the smoke evacuation component. In one aspect, the fluid line may be a first fluid line, and a second fluid line may extend from the remote surgical site to a suction and irrigation module 20055 slidably received in the hub enclosure 20060. In one aspect, the hub enclosure 20060 may include a fluid interface. Certain surgical procedures may require the application of more than one energy type to the tissue. One energy type may be more beneficial for cutting the tissue, while another different energy type may be more beneficial for sealing the tissue. For example, a bipolar generator can be used to seal the tissue while an ultrasonic generator can be used to cut the sealed tissue. Aspects of the present disclosure present a solution where a hub modular enclosure 20060 is configured to accommodate different generators and facilitate an interactive communication therebetween. One of the advantages of the hub modular enclosure 20060 is enabling the quick removal and/or replacement of various modules. Aspects of the present disclosure present a modular surgical enclosure for use in a surgical procedure that involves energy application to tissue. The modular surgical enclosure includes a first energy-generator module, configured to generate a first energy for application to the tissue, and a first docking station comprising a first docking port that includes first data and power contacts, wherein the first energy-generator module is slidably movable into an electrical engagement with the power and data contacts and wherein the first energy-generator module is slidably movable out of the electrical engagement with the first power and data contacts. Further to the above, the modular surgical enclosure also includes a second energy-generator module configured to generate a second energy, different than the first energy, for application to the tissue, and a second docking station comprising a second docking port that includes second data and power contacts, wherein the second energy generator module is slidably movable into an electrical engagement with the power and data contacts, and wherein the second energy-generator module is slidably movable out of the electrical engagement with the second power and data contacts. In addition, the modular surgical enclosure also includes a communication bus between the first docking port and the second docking port, configured to facilitate communication between the first energy-generator module and the second energy-generator module. Referring to FIG. 3, aspects of the present disclosure are presented for a hub modular enclosure 20060 that allows the modular integration of a generator module 20050, a smoke evacuation module 20054, and a suction/irrigation module 20055. The hub modular enclosure 20060 further facilitates interactive communication between the modules 20059, 20054, and 20055. The generator module 20050 can be a generator module 20050 with integrated monopolar, bipolar, and ultrasonic components supported in a single housing unit slidably insertable into the hub modular enclosure 20060. The generator module 20050 can be configured to connect to a monopolar device 20051, a bipolar device 20052, and an ultrasonic device 20053. Alternatively, the generator module 20050 may comprise a series of monopolar, bipolar, and/or ultrasonic generator modules that interact through the hub modular enclosure 20060. The hub modular enclosure 20060 can be configured to facilitate the insertion of multiple generators and interactive communication between the generators docked into the hub modular enclosure 20060 so that the generators would act as a single generator.

Figure 4:
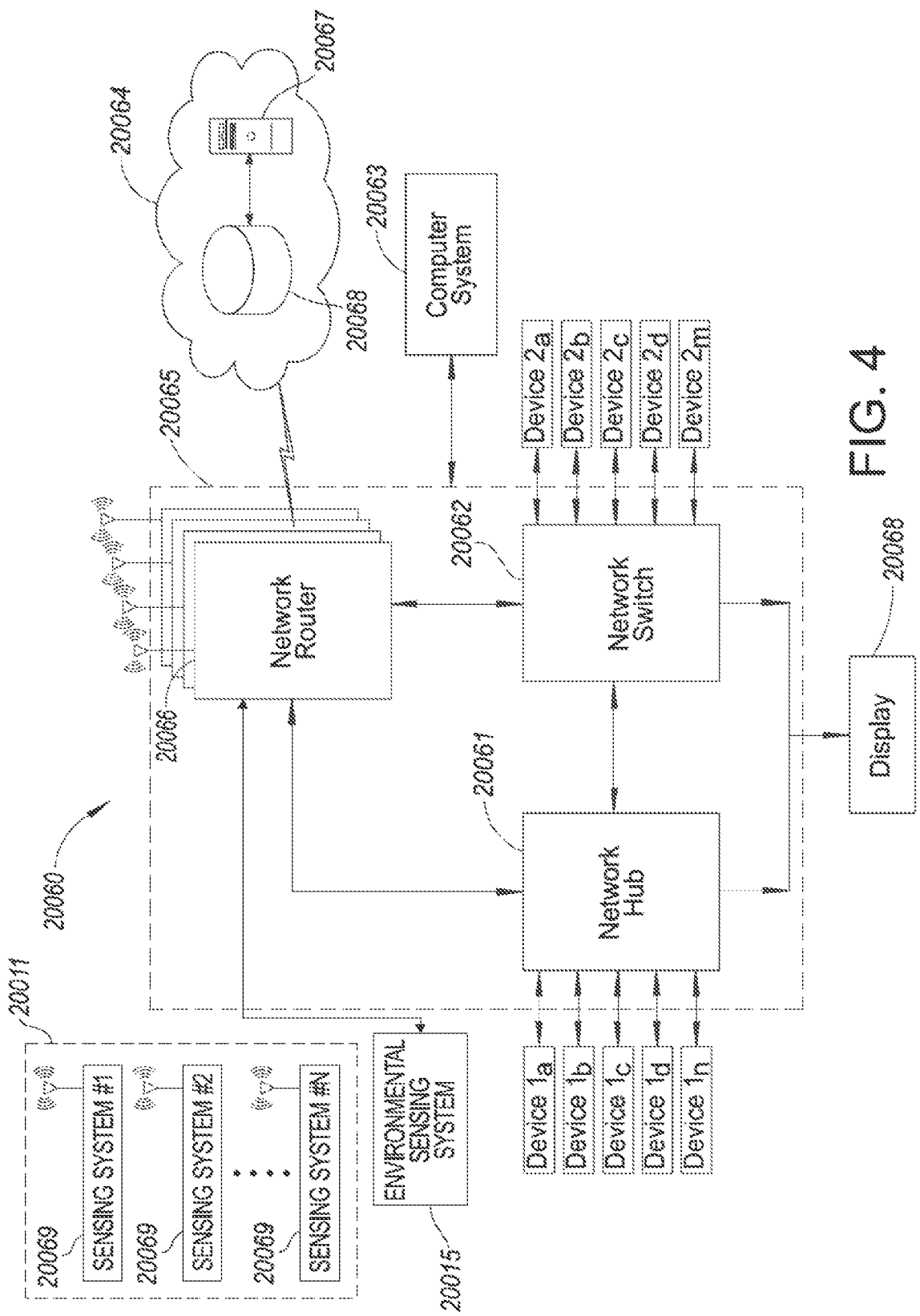
FIG. 4 illustrates a surgical data network having a set of communication surgical hubs configured to connect with a set of sensing systems, an environmental sensing system, a set of devices, etc.

FIG. 4 illustrates a surgical data network having a set of communication hubs configured to connect a set of sensing systems, environment sensing system(s), and a set of other modular devices located in one or more operating theaters of a healthcare facility, a patient recovery room, or a room in a healthcare facility specially equipped for surgical operations, to the cloud, in accordance with at least one aspect of the present disclosure.

As illustrated in FIG. 4, a surgical hub system 20060 may include a modular communication hub 20065 that is configured to connect modular devices located in a healthcare facility to a cloud-based system (e.g., a cloud computing system 20064 that may include a remote server 20067 coupled to a remote storage 20068). The modular communication hub 20065 and the devices may be connected in a room in a healthcare facility specially equipped for surgical operations. In one aspect, the modular communication hub 20065 may include a network hub 20061 and/or a network switch 20062 in communication with a network router 20066. The modular communication hub 20065 may be coupled to a local computer system 20063 to provide local computer processing and data manipulation.

The computer system 20063 may comprise a processor and a network interface 20100. The processor may be coupled to a communication module, storage, memory, non-volatile memory, and input/output (I/O) interface via a system bus. The system bus can be any of several types of bus structure(s) including the memory bus or memory controller, a peripheral bus or external bus, and or a local bus using any variety of available bus architectures including, but not limited to, 9-bit bus, Industrial Standard Architecture (ISA), Micro-Charmel Architecture (MSA), Extended ISA (EISA), Intelligent Drive Electronics (IDE), VESA Local Bus (VLB), Peripheral Component Interconnect (PCI), USB, Advanced Graphics Port (AGP), Personal Computer Memory Card International Association bus (PCMCIA), Small Computer Systems Interface (SCSI), or any other proprietary bus.

The processor may be any single-core or multicore processor such as those known under the trade name ARM Cortex by Texas Instruments. In one aspect, the processor may be an LM4F230H5QR ARM Cortex-M4F Processor Core, available from Texas Instruments, for example, comprising an on-chip memory of 256 KB single-cycle flash memory, or other non-volatile memory, up to 40 MHz, a prefetch buffer to improve performance above 40 MHz, a 32 KB single-cycle serial random access memory (SRAM), an internal read-only memory (ROM) loaded with Stellaris Ware® software, a 2 KB electrically erasable programmable read-only memory (EEPROM), and/or one or more pulse width modulation (PWMI) modules, one or more quadrature encoder inputs (QEI) analogs, one or more 12-bit analog-to-digital converters (ADCs) with 12 analog input channels, details of which are available for the product datasheet.

In an example, the processor may comprise a safety controller comprising two controller-based families such as TMS570 and RM4x, known under the trade name Hercules ARM Cortex R4, also by Texas Instruments. The safety controller may be configured specifically for IEC 61508 and ISO 26262 safety critical applications, among others, to provide advanced integrated safety features while delivering scalable performance, connectivity, and memory options.

It is to be appreciated that the computer system 20063 may include software that acts as an intermediary between users and the basic computer resources described in a suitable operating environment. Such software may include an operating system. The operating system, which can be stored on the disk storage, may act to control and allocate resources of the computer system. System applications may take advantage of the management of resources by the operating system through program modules and program data stored either in the system memory or on the disk storage. It is to be appreciated that various components described herein can be implemented with various operating systems or combinations of operating systems.

A user may enter commands or information into the computer system 20063 through input device(s) coupled to the I/O interface. The input devices may include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processor 20102 through the system bus via interface port(s). The interface port(s) include, for example, a serial port, a parallel port, a game port, and a USB. The output device(s) use some of the same types of ports as input device(s). Thus, for example, a USB port may be used to provide input to the computer system 20063 and to output information from the computer system 20063 to an output device. An output adapter may be provided to illustrate that there can be some output devices like monitors, displays, speakers, and printers, among other output devices that may require special adapters. The output adapters may include, by way of illustration and not limitation, video and sound cards that provide a means of connection between the output device and the system bus. It should be noted that other devices and/or systems of devices, such as remote computer(s), may provide both input and output capabilities.

The computer system 20063 can operate in a networked environment using logical connections to one or more remote computers, such as cloud computer(s), or local computers. The remote cloud computer(s) can be a personal computer, server, router, network PC, workstation, microprocessor-based appliance, peer device, or other common network node, and the like, and typically includes many or all of the elements described relative to the computer system. For purposes of brevity, only a memory storage device is illustrated with the remote computer(s). The remote computer(s) may be logically connected to the computer system through a network interface and then physically connected via a communication connection. The network interface may encompass communication networks such as local area networks (LANs) and wide area networks (WANs). LAN technologies may include Fiber Distributed Data Interface (FDDI), Copper Distributed Data Interface (CDDI), Ethernet/IEEE 802.3, Token Ring/IEEE 802.5, and the like. WAN technologies may include, but are not limited to, point-to-point links, circuit-switching networks like Integrated Services Digital Networks (ISDN) and variations thereon, packet-switching networks, and Digital Subscriber Lines (DSL).

In various examples, the computer system 20063 may comprise an image processor, image-processing engine, media processor, or any specialized digital signal processor (DSP) used for the processing of digital images. The image processor may employ parallel computing with single instruction, multiple data (SIMD) or multiple instruction, multiple data (MIMD) technologies to increase speed and efficiency. The digital image-processing engine can perform a range of tasks. The image processor may be a system on a chip with multicore processor architecture.

The communication connection(s) may refer to the hardware/software employed to connect the network interface to the bus. While the communication connection is shown for illustrative clarity inside the computer system 20063, it can also be external to the computer system 20063. The hardware/software necessary for connection to the network interface may include, for illustrative purposes only, internal and external technologies such as modems, including regular telephone-grade modems, cable modems, optical fiber modems, and DSL modems, ISDN adapters, and Ethernet cards. In some examples, the network interface may also be provided using an RF interface.

Surgical data network associated with the surgical hub system 20060 may be configured as passive, intelligent, or switching. A passive surgical data network serves as a conduit for the data, enabling it to go from one device (or segment) to another and to the cloud computing resources. An intelligent surgical data network includes additional features to enable the traffic passing through the surgical data network to be monitored and to configure each port in the network hub 20061 or network switch 20062. An intelligent surgical data network may be referred to as a manageable hub or switch. A switching hub reads the destination address of each packet and then forwards the packet to the correct port.

Modular devices 1a-1n located in the operating theater may be coupled to the modular communication hub 20065. The network hub 20061 and/or the network switch 20062 may be coupled to a network router 20066 to connect the devices 1a-1n to the cloud computing system 20064 or the local computer system 20063. Data associated with the devices 1a-1n may be transferred to cloud-based computers via the router for remote data processing and manipulation. Data associated with the devices 1a-1n may also be transferred to the local computer system 20063 for local data processing and manipulation. Modular devices 2a-2m located in the same operating theater also may be coupled to a network switch 20062. The network switch 20062 may be coupled to the network hub 20061 and/or the network router 20066 to connect the devices 2a-2m to the cloud 20064. Data associated with the devices 2a-2m may be transferred to the cloud computing system 20064 via the network router 20066 for data processing and manipulation. Data associated with the devices 2a-2m may also be transferred to the local computer system 20063 for local data processing and manipulation.

The wearable sensing system 20011 may include one or more sensing systems 20069. The sensing systems 20069 may include an HCP sensing system and/or a patient sensing system. The one or more sensing systems 20069 may be in communication with the computer system 20063 of a surgical hub system 20060 or the cloud server 20067 directly via one of the network routers 20066 or via a network hub 20061 or network switching 20062 that is in communication with the network routers 20066.

The sensing systems 20069 may be coupled to the network router 20066 to connect to the sensing systems 20069 to the local computer system 20063 and/or the cloud computing system 20064. Data associated with the sensing systems 20069 may be transferred to the cloud computing system 20064 via the network router 20066 for data processing and manipulation. Data associated with the sensing systems 20069 may also be transferred to the local computer system 20063 for local data processing and manipulation.

As illustrated in FIG. 4, the surgical hub system 20060 may be expanded by interconnecting multiple network hubs 20061 and/or multiple network switches 20062 with multiple network routers 20066. The modular communication hub 20065 may be contained in a modular control tower configured to receive multiple devices 1a-1n/2a-2m. The local computer system 20063 also may be contained in a modular control tower. The modular communication hub 20065 may be connected to a display 20068 to display images obtained by some of the devices 1a-1n/2a-2m, for example during surgical procedures. In various aspects, the devices 1a-1n/2a-2m may include, for example, various modules such as an imaging module coupled to an endoscope, a generator module coupled to an energy-based surgical device, a smoke evacuation module, a suction/irrigation module, a communication module, a processor module, a storage array, a surgical device coupled to a display, and/or a non-contact sensor module, among other modular devices that may be connected to the modular communication hub 20065 of the surgical data network.

In one aspect, the surgical hub system 20060 illustrated in FIG. 4 may comprise a combination of network hub(s), network switch(es), and network router(s) connecting the devices 1a-1n/2a-2m or the sensing systems 20069 to the cloud-base system 20064. One or more of the devices 1a-1n/2a-2m or the sensing systems 20069 coupled to the network hub 20061 or network switch 20062 may collect data or measurement data in real-time and transfer the data to cloud computers for data processing and manipulation. It will be appreciated that cloud computing relies on sharing computing resources rather than having local servers or personal devices to handle software applications. The word "cloud" may be used as a metaphor for "the Internet," although the term is not limited as such. Accordingly, the term "cloud computing" may be used herein to refer to "a type of Internet-based computing," where different services—such as servers, storage, and applications—are delivered to the modular communication hub 20065 and/or computer system 20063 located in the surgical theater (e.g., a fixed, mobile, temporary, or field operating room or space) and to devices connected to the modular communication hub 20065 and/or computer system 20063 through the Internet. The cloud infrastructure may be maintained by a cloud service provider. In this context, the cloud service provider may be the entity that coordinates the usage and control of the devices 1a-1n/2a-2m located in one or more operating theaters. The cloud computing services can perform a large number of calculations based on the data gathered by smart surgical instruments, robots, sensing systems, and other computerized devices located in the operating theater. The hub hardware enables multiple devices, sensing systems, and/or connections to be connected to a computer that communicates with the cloud computing resources and storage.

Applying cloud computer data processing techniques on the data collected by the devices 1a-1n/2a-2m, the surgical data network can provide improved surgical outcomes, reduced costs, and improved patient satisfaction. At least some of the devices 1a-1n/2a-2m may be employed to view tissue states to assess leaks or perfusion of sealed tissue after a tissue sealing and cutting procedure. At least some of the devices 1a-1n/2a-2m may be employed to identify pathology, such as the effects of diseases, using the cloud-based computing to examine data including images of samples of body tissue for diagnostic purposes. This may include localization and margin confirmation of tissue and phenotypes. At least some of the devices 1a-1n/2a-2m may be employed to identify anatomical structures of the body using a variety of sensors integrated with imaging devices and techniques such as overlaying images captured by multiple imaging devices.

The data gathered by the devices 1a-1n/2a-2m, including image data, may be transferred to the cloud computing system 20064 or the local computer system 20063 or both for data processing and manipulation including image processing and manipulation. The data may be analyzed to improve surgical procedure outcomes by determining if further treatment, such as the application of endoscopic intervention, emerging technologies, a targeted radiation, targeted intervention, and precise robotics to tissue-specific sites and conditions, may be pursued. Such data analysis may further employ outcome analytics processing and using standardized approaches may provide beneficial feedback to either confirm surgical treatments and the behavior of the surgeon or suggest modifications to surgical treatments and the behavior of the surgeon.

Applying cloud computer data processing techniques on the measurement data collected by the sensing systems 20069, the surgical data network can provide improved surgical outcomes, improved recovery outcomes, reduced costs, and improved patient satisfaction. At least some of the sensing systems 20069 may be employed to assess physiological conditions of a surgeon operating on a patient or a patient being prepared for a surgical procedure or a patient recovering after a surgical procedure. The cloud-based computing system 20064 may be used to monitor biomarkers associated with a surgeon or a patient in real-time and to generate surgical plans based at least on measurement data gathered prior to a surgical procedure, provide control signals to the surgical instruments during a surgical procedure, notify a patient of a complication during post-surgical period.

The operating theater devices 1a-1n may be connected to the modular communication hub 20065 over a wired channel or a wireless channel depending on the configuration of the devices 1a-1n to a network hub 20061. The network hub 20061 may be implemented, in one aspect, as a local network broadcast device that works on the physical layer of the Open System Interconnection (OSI) model. The network hub may provide connectivity to the devices 1a-1n located in the same operating theater network. The network hub 20061 may collect data in the form of packets and sends them to the router in half duplex mode. The network hub 20061 may not store any media access control/Internet Protocol (MAC/IP) to transfer the device data. Only one of the devices 1a-1n can send data at a time through the network hub 20061. The network hub 20061 may not have routing tables or intelligence regarding where to send information and broadcasts all network data across each connection and to a remote server 20067 of the cloud computing system 20064. The network hub 20061 can detect basic network errors such as collisions but having all information broadcast to multiple ports can be a security risk and cause bottlenecks.

The operating theater devices 2a-2m may be connected to a network switch 20062 over a wired channel or a wireless channel. The network switch 20062 works in the data link layer of the OSI model. The network switch 20062 may be a multicast device for connecting the devices 2a-2m located in the same operating theater to the network. The network switch 20062 may send data in the form of frames to the network router 20066 and may work in full duplex mode. Multiple devices 2a-2m can send data at the same time through the network switch 20062. The network switch 20062 stores and uses MAC addresses of the devices 2a-2m to transfer data.

The network hub 20061 and/or the network switch 20062 may be coupled to the network router 20066 for connection to the cloud computing system 20064. The network router 20066 works in the network layer of the OSI model. The network router 20066 creates a route for transmitting data packets received from the network hub 20061 and/or network switch 20062 to cloud-based computer resources for further processing and manipulation of the data collected by any one of or all the devices 1a-1n/2a-2m and wearable sensing system 20011. The network router 20066 may be employed to connect two or more different networks located in different locations, such as, for example, different operating theaters of the same healthcare facility or different networks located in different operating theaters of different healthcare facilities. The network router 20066 may send data in the form of packets to the cloud computing system 20064 and works in full duplex mode. Multiple devices can send data at the same time. The network router 20066 may use IP addresses to transfer data.

In an example, the network hub 20061 may be implemented as a USB hub, which allows multiple USB devices to be connected to a host computer. The USB hub may expand a single USB port into several tiers so that there are more ports available to connect devices to the host system computer. The network hub 20061 may include wired or wireless capabilities to receive information over a wired channel or a wireless channel. In one aspect, a wireless USB short-range, high-bandwidth wireless radio communication protocol may be employed for communication between the devices 1a-1n and devices 2a-2m located in the operating theater.

In examples, the operating theater devices 1a-1n/2a-2m and/or the sensing systems 20069 may communicate to the modular communication hub 20065 via Bluetooth wireless technology standard for exchanging data over short distances (using short-wavelength UHF radio waves in the ISM band from 2.4 to 2.485 GHz) from fixed and mobile devices and building personal area networks (PANs). The operating theater devices 1a-1n/2a-2m and/or the sensing systems 20069 may communicate to the modular communication hub 20065 via a number of wireless or wired communication standards or protocols, including but not limited to Bluetooth, Low-Energy Bluetooth, near-field communication (NFC), Wi-Fi (IEEE 802.11 family), WiMAX (IEEE 802.16 family), IEEE 802.20, new radio (NR), long-term evolution (LTE), and Ev-DO, HSPA+, HSDPA+, HSUPA+, EDGE, GSM, GPRS, CDMA, TDMA, DECT, and Ethernet derivatives thereof, as well as any other wireless and wired protocols that are designated as 3G, 4G, 5G, and beyond. The computing module may include a plurality of communication modules. For instance, a first communication module may be dedicated to shorter-range wireless communications such as Wi-Fi and Bluetooth Low-Energy Bluetooth, Bluetooth Smart, and a second communication module may be dedicated to longer-range wireless communications such as GPS, EDGE, GPRS, CDMA, WIMAX, LTE, Ev-DO, HSPA+, HSDPA+, HSUPA+, EDGE, GSM, GPRS, CDMA, TDMA, and others.

The modular communication hub 20065 may serve as a central connection for one or more of the operating theater devices 1a-1n/2a-2m and/or the sensing systems 20069 and may handle a data type known as frames. Frames may carry the data generated by the devices 1a-1n/2a-2m and/or the sensing systems 20069. When a frame is received by the modular communication hub 20065, it may be amplified and/or sent to the network router 20066, which may transfer the data to the cloud computing system 20064 or the local computer system 20063 by using a number of wireless or wired communication standards or protocols, as described herein.

The modular communication hub 20065 can be used as a standalone device or be connected to compatible network hubs 20061 and network switches 20062 to form a larger network. The modular communication hub 20065 can be generally easy to install, configure, and maintain, making it a good option for networking the operating theater devices 1*a*-1*n*/2*a*-2*m*.

Figure 5:
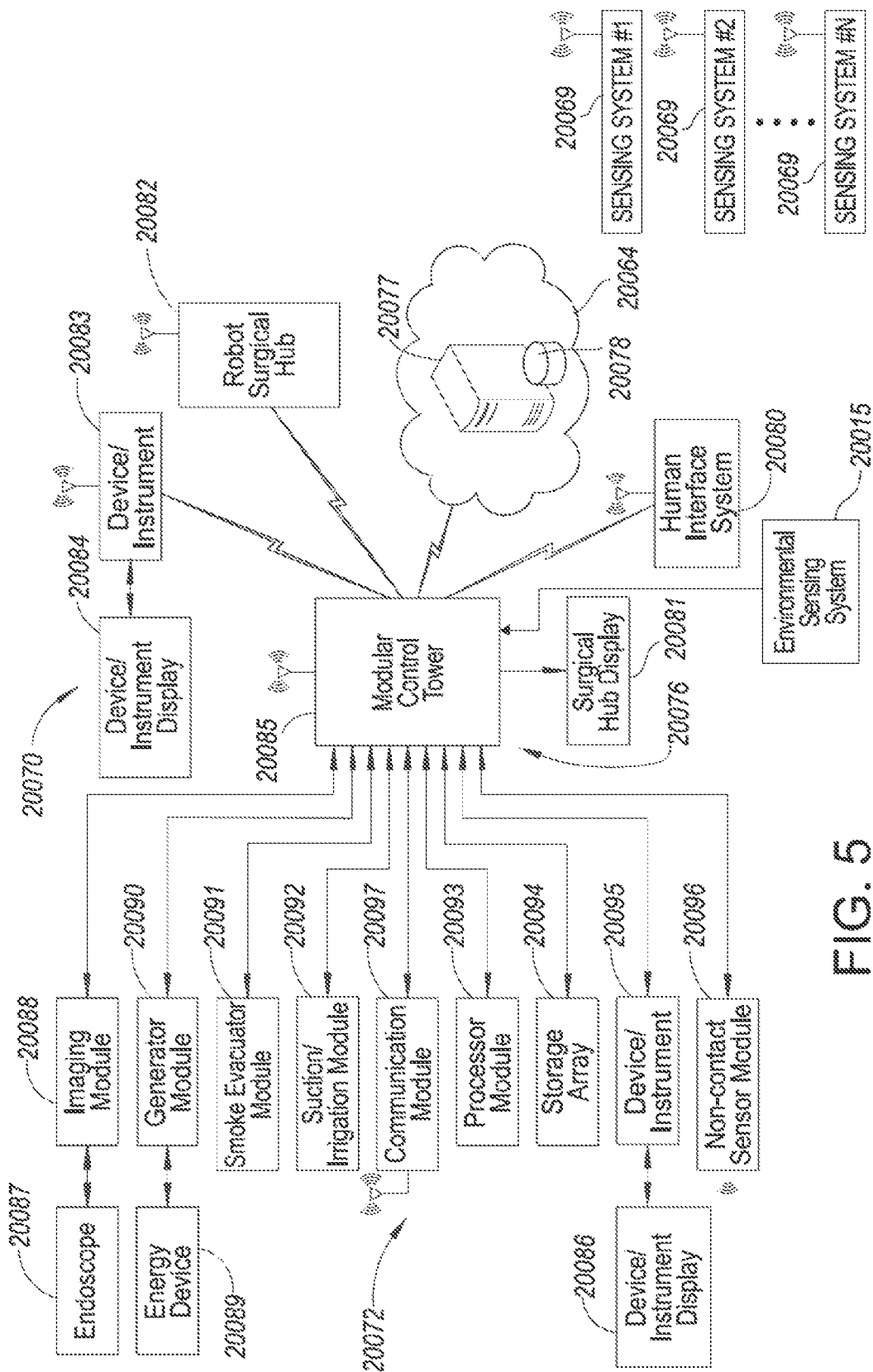
FIG. 5 illustrates an example computer-implemented interactive surgical system that may be part of an HCP monitoring system.

FIG. 5 illustrates a computer-implemented interactive surgical system 20070 that may be a part of the HCP monitoring system 20002. The computer-implemented interactive surgical system 20070 is similar in many respects to the HCP sensing system 20002. For example, the computer-implemented interactive surgical system 20070 may include one or more surgical sub-systems 20072, which are similar in many respects to the HCP monitoring systems 20002. Each sub-surgical system 20072 may include at least one surgical hub 20076 in communication with a cloud computing system 20064 that may include a remote server 20077 and a remote storage 20078. In one aspect, the computer-implemented interactive surgical system 20070 may include a modular control tower 20085 connected to multiple operating theater devices such as sensing systems 20001, intelligent surgical instruments, robots, and other computerized devices located in the operating theater.

As illustrated in the example of FIG. 5, the modular control tower 20085 may be coupled to an imaging module 20088 that may be coupled to an endoscope 20087, a generator module 20090 that may be coupled to an energy device 20089, a smoke evacuator module 20091, a suction/irrigation module 20092, a communication module 20097, a processor module 20093, a storage array 20094, a smart device/instrument 20095 optionally coupled to a display 20086 and 20084 respectively, and a non-contact sensor module 20096. The non-contact sensor module 20096 may measure the dimensions of the operating theater and generate a map of the surgical theater using, ultrasonic, laser-type, and/or the like, non-contact measurement devices. Other distance sensors can be employed to determine the bounds of an operating room. An ultrasound-based non-contact sensor module may scan the operating theater by transmitting a burst of ultrasound and receiving the echo when it bounces off the perimeter walls of an operating theater as described under the heading "Surgical Hub Spatial Awareness Within an Operating Room" in U.S. Provisional Patent Application Ser. No. 62/611,341, titled INTERACTIVE SURGICAL PLATFORM, filed Dec. 28, 2017, which is herein incorporated by reference in its entirety. The sensor module may be configured to determine the size of the operating theater and to adjust Bluetooth-pairing distance limits. A laser-based non-contact sensor module may scan the operating theater by transmitting laser light pulses, receiving laser light pulses that bounce off the perimeter walls of the operating theater, and comparing the phase of the transmitted pulse to the received pulse to determine the size of the operating theater and to adjust Bluetooth pairing distance limits, for example.

The modular control tower 20085 may also be in communication with one or more sensing systems 20069 and an environmental sensing system 20015. The sensing systems 20069 may be connected to the modular control tower 20085 either directly via a router or via the communication module 20097. The operating theater devices may be coupled to cloud computing resources and data storage via the modular control tower 20085. A robot surgical hub 20082 also may be connected to the modular control tower 20085 and to the cloud computing resources. The devices/instruments 20095 or 20084, human interface system 20080, among others, may be coupled to the modular control tower 20085 via wired or wireless communication standards or protocols, as described herein. The human interface system 20080 may include a display sub-system and a notification sub-system. The modular control tower 20085 may be coupled to a hub display 20081 (e.g., monitor, screen) to display and overlay images received from the imaging module 20088, device/instrument display 20086, and/or other human interface systems 20080. The hub display 20081 also may display data received from devices connected to the modular control tower 20085 in conjunction with images and overlaid images.

Figure 6:
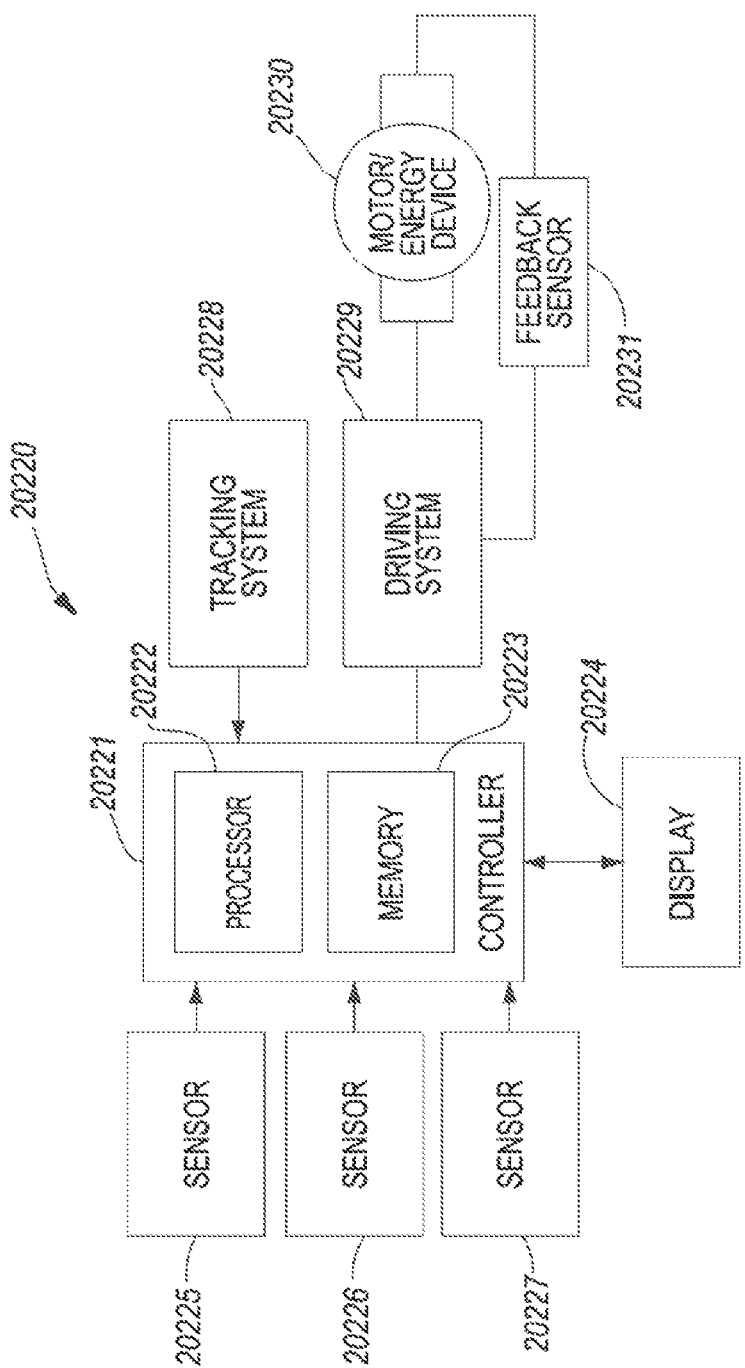
FIG. 6 illustrates a logic diagram of a control system of a surgical instrument.

FIG. 6 illustrates a logical diagram of a control system 20220 of a surgical instrument or a surgical tool in accordance with one or more aspects of the present disclosure. The surgical instrument or the surgical tool may be configurable. The surgical instrument may include surgical fixtures specific to the procedure at-hand, such as imaging devices, surgical staplers, energy devices, endocutter devices, or the like. For example, the surgical instrument may include any of a powered stapler, a powered stapler generator, an energy device, an advanced energy device, an advanced energy jaw device, an endocutter clamp, an energy device generator, an in-operating-room imaging system, a smoke evacuator, a suction-irrigation device, an insufflation system, or the like. The system 20220 may comprise a control circuit. The control circuit may include a microcontroller 20221 comprising a processor 20222 and a memory 20223. One or more of sensors 20225, 20226, 20227, for example, provide real-time feedback to the processor 20222. A motor 20230, driven by a motor driver 20229, operably couples a longitudinally movable displacement member to drive the I-beam knife element. A tracking system 20228 may be configured to determine the position of the longitudinally movable displacement member. The position information may be provided to the processor 20222, which can be programmed or configured to determine the position of the longitudinally movable drive member as well as the position of a firing member, firing bar, and I-beam knife element. Additional motors may be provided at the tool driver interface to control I-beam firing, closure tube travel, shaft rotation, and articulation. A display 20224 may display a variety of operating conditions of the instruments and may include touch screen functionality for data input. Information displayed on the display 20224 may be overlaid with images acquired via endoscopic imaging modules.

The microcontroller 20221 may be any single-core or multicore processor such as those known under the trade name ARM Cortex by Texas Instruments. In one aspect, the main microcontroller 20221 may be an LM4F230H5QR ARM Cortex-M4F Processor Core, available from Texas Instruments, for example, comprising an on-chip memory of 256 KB single-cycle flash memory, or other non-volatile memory, up to 40 MHz, a prefetch buffer to improve performance above 40 MHz, a 32 KB single-cycle SRAM, and internal ROM loaded with Stellaris Ware® software, a 2 KB EEPROM, one or more PWM modules, one or more QEI analogs, and/or one or more 12-bit ADCs with 12 analog input channels, details of which are available for the product datasheet.

The microcontroller 20221 may comprise a safety controller comprising two controller-based families such as TMS570 and RM4x, known under the trade name Hercules ARM Cortex R4, also by Texas Instruments. The safety controller may be configured specifically for IEC 61508 and ISO 26262 safety critical applications, among others, to provide advanced integrated safety features while delivering scalable performance, connectivity, and memory options.

The microcontroller 20221 may be programmed to perform various functions such as precise control over the speed and position of the knife and articulation systems. In one aspect, the microcontroller 20221 may include a processor 20222 and a memory 20223. The electric motor 20230 may be a brushed direct current (DC) motor with a gearbox and mechanical links to an articulation or knife system. In one aspect, a motor driver 20229 may be an A3941 available from Allegro Microsystems, Inc. Other motor drivers may be readily substituted for use in the tracking system 20228 comprising an absolute positioning system. A detailed description of an absolute positioning system is described in U.S. Patent Application Publication No. 2017/0296213, titled SYSTEMS AND METHODS FOR CONTROLLING A SURGICAL STAPLING AND CUTTING INSTRUMENT, which published on Oct. 19, 2017, which is herein incorporated by reference in its entirety.

The microcontroller 20221 may be programmed to provide precise control over the speed and position of displacement members and articulation systems. The microcontroller 20221 may be configured to compute a response in the software of the microcontroller 20221. The computed response may be compared to a measured response of the actual system to obtain an "observed" response, which is used for actual feedback decisions. The observed response may be a favorable, tuned value that balances the smooth, continuous nature of the simulated response with the measured response, which can detect outside influences on the system.

The motor 20230 may be controlled by the motor driver 20229 and can be employed by the firing system of the surgical instrument or tool. In various forms, the motor 20230 may be a brushed DC driving motor having a maximum rotational speed of approximately 25,000 RPM. In some examples, the motor 20230 may include a brushless motor, a cordless motor, a synchronous motor, a stepper motor, or any other suitable electric motor. The motor driver 20229 may comprise an H-bridge driver comprising field-effect transistors (FETs), for example. The motor 20230 can be powered by a power assembly releasably mounted to the handle assembly or tool housing for supplying control power to the surgical instrument or tool. The power assembly may comprise a battery which may include a number of battery cells connected in series that can be used as the power source to power the surgical instrument or tool. In certain circumstances, the battery cells of the power assembly may be replaceable and/or rechargeable. In at least one example, the battery cells can be lithium-ion batteries which can be couplable to and separable from the power assembly.

The motor driver 20229 may be an A3941 available from Allegro Microsystems, Inc. A3941 may be a full-bridge controller for use with external N-channel power metal-oxide semiconductor field-effect transistors (MOSFETs) specifically designed for inductive loads, such as brush DC motors. The driver 20229 may comprise a unique charge pump regulator that can provide full (>10 V) gate drive for battery voltages down to 7 V and can allow the A3941 to operate with a reduced gate drive, down to 5.5 V. A bootstrap capacitor may be employed to provide the above battery supply voltage required for N-channel MOSFETs. An internal charge pump for the high-side drive may allow DC (100% duty cycle) operation. The full bridge can be driven in fast or slow decay modes using diode or synchronous rectification. In the slow decay mode, current recirculation can be through the high-side or the low-side FETs. The power FETs may be protected from shoot-through by resistor-adjustable dead time. Integrated diagnostics provide indications of undervoltage, overtemperature, and power bridge faults and can be configured to protect the power MOSFETs under most short circuit conditions. Other motor drivers may be readily substituted for use in the tracking system 20228 comprising an absolute positioning system.

The tracking system 20228 may comprise a controlled motor drive circuit arrangement comprising a position sensor 20225 according to one aspect of this disclosure. The position sensor 20225 for an absolute positioning system may provide a unique position signal corresponding to the location of a displacement member. In some examples, the displacement member may represent a longitudinally movable drive member comprising a rack of drive teeth for meshing engagement with a corresponding drive gear of a gear reducer assembly. In some examples, the displacement member may represent the firing member, which could be adapted and configured to include a rack of drive teeth. In some examples, the displacement member may represent a firing bar or the I-beam, each of which can be adapted and configured to include a rack of drive teeth. Accordingly, as used herein, the term displacement member can be used generically to refer to any movable member of the surgical instrument or tool such as the drive member, the firing member, the firing bar, the I-beam, or any element that can be displaced. In one aspect, the longitudinally movable drive member can be coupled to the firing member, the firing bar, and the I-beam. Accordingly, the absolute positioning system can, in effect, track the linear displacement of the I-beam by tracking the linear displacement of the longitudinally movable drive member. In various aspects, the displacement member may be coupled to any position sensor 20225 suitable for measuring linear displacement. Thus, the longitudinally movable drive member, the firing member, the firing bar, or the I-beam, or combinations thereof, may be coupled to any suitable linear displacement sensor. Linear displacement sensors may include contact or non-contact displacement sensors. Linear displacement sensors may comprise linear variable differential transformers (LVDT), differential variable reluctance transducers (DVRT), a slide potentiometer, a magnetic sensing system comprising a movable magnet and a series of linearly arranged Hall effect sensors, a magnetic sensing system comprising a fixed magnet and a series of movable, linearly arranged Hall effect sensors, an optical sensing system comprising a movable light source and a series of linearly arranged photo diodes or photo detectors, an optical sensing system comprising a fixed light source and a series of movable linearly, arranged photodiodes or photodetectors, or any combination thereof.

The electric motor 20230 can include a rotatable shaft that operably interfaces with a gear assembly that is mounted in meshing engagement with a set, or rack, of drive teeth on the displacement member. A sensor element may be operably coupled to a gear assembly such that a single revolution of the position sensor 20225 element corresponds to some linear longitudinal translation of the displacement member. An arrangement of gearing and sensors can be connected to the linear actuator, via a rack and pinion arrangement, or a rotary actuator, via a spur gear or other connection. A power source may supply power to the absolute positioning system and an output indicator may display the output of the absolute positioning system. The displacement member may represent the longitudinally movable drive member comprising a rack of drive teeth formed thereon for meshing engagement with a corresponding drive gear of the gear reducer assembly. The displacement member may represent the longitudinally movable firing member, firing bar, I-beam, or combinations thereof.

A single revolution of the sensor element associated with the position sensor 20225 may be equivalent to a longitudinal linear displacement d1 of the of the displacement member, where d1 is the longitudinal linear distance that the displacement member moves from point "a" to point "b" after a single revolution of the sensor element coupled to the displacement member. The sensor arrangement may be connected via a gear reduction that results in the position sensor 20225 completing one or more revolutions for the full stroke of the displacement member. The position sensor 20225 may complete multiple revolutions for the full stroke of the displacement member.

A series of switches, where n is an integer greater than one, may be employed alone or in combination with a gear reduction to provide a unique position signal for more than one revolution of the position sensor 20225. The state of the switches may be fed back to the microcontroller 20221 that applies logic to determine a unique position signal corresponding to the longitudinal linear displacement d1+d2+ . . . dn of the displacement member. The output of the position sensor 20225 is provided to the microcontroller 20221. The position sensor 20225 of the sensor arrangement may comprise a magnetic sensor, an analog rotary sensor like a potentiometer, or an array of analog Hall-effect elements, which output a unique combination of position signals or values.

The position sensor 20225 may comprise any number of magnetic sensing elements, such as, for example, magnetic sensors classified according to whether they measure the total magnetic field or the vector components of the magnetic field. The techniques used to produce both types of magnetic sensors may encompass many aspects of physics and electronics. The technologies used for magnetic field sensing may include search coil, fluxgate, optically pumped, nuclear precession, SQUID, Hall-effect, anisotropic magnetoresistance, giant magnetoresistance, magnetic tunnel junctions, giant magnetoimpedance, magnetostrictive/piezoelectric composites, magnetodiode, magnetotransistor, fiber-optic, magneto-optic, and microelectromechanical systems-based magnetic sensors, among others.

The position sensor 20225 for the tracking system 20228 comprising an absolute positioning system may comprise a magnetic rotary absolute positioning system. The position sensor 20225 may be implemented as an AS5055EQFT single-chip magnetic rotary position sensor available from Austria Microsystems, AG. The position sensor 20225 is interfaced with the microcontroller 20221 to provide an absolute positioning system. The position sensor 20225 may be a low-voltage and low-power component and may include four Hall-effect elements in an area of the position sensor 20225 that may be located above a magnet. A high-resolution ADC and a smart power management controller may also be provided on the chip. A coordinate rotation digital computer (CORDIC) processor, also known as the digit-by-digit method and Volder's algorithm, may be provided to implement a simple and efficient algorithm to calculate hyperbolic and trigonometric functions that require only addition, subtraction, bit-shift, and table lookup operations. The angle position, alarm bits, and magnetic field information may be transmitted over a standard serial communication interface, such as a serial peripheral interface (SPI) interface, to the microcontroller 20221. The position sensor 20225 may provide 12 or 14 bits of resolution. The position sensor 20225 may be an AS5055 chip provided in a small QFN 16-pin 4×4×0.85 mm package.

The tracking system 20228 comprising an absolute positioning system may comprise and/or be programmed to implement a feedback controller, such as a PID, state feedback, and adaptive controller. A power source converts the signal from the feedback controller into a physical input to the system: in this case the voltage. Other examples include a PWM of the voltage, current, and force. Other sensor(s) may be provided to measure physical parameters of the physical system in addition to the position measured by the position sensor 20225. In some aspects, the other sensor(s) can include sensor arrangements such as those described in U.S. Pat. No. 9,345,481, titled STAPLE CARTRIDGE TISSUE THICKNESS SENSOR SYSTEM, which issued on May 24, 2016, which is herein incorporated by reference in its entirety; U.S. Patent Application Publication No. 2014/0263552, titled STAPLE CARTRIDGE TISSUE THICKNESS SENSOR SYSTEM, which published on Sep. 18, 2014, which is herein incorporated by reference in its entirety; and U.S. patent application Ser. No. 15/628,175, titled TECHNIQUES FOR ADAPTIVE CONTROL OF MOTOR VELOCITY OF A SURGICAL STAPLING AND CUTTING INSTRUMENT, filed Jun. 20, 2017, which is herein incorporated by reference in its entirety. In a digital signal processing system, an absolute positioning system is coupled to a digital data acquisition system where the output of the absolute positioning system will have a finite resolution and sampling frequency. The absolute positioning system may comprise a compare-and-combine circuit to combine a computed response with a measured response using algorithms, such as a weighted average and a theoretical control loop, that drive the computed response towards the measured response. The computed response of the physical system may take into account properties like mass, inertia, viscous friction, inductance resistance, etc., to predict what the states and outputs of the physical system will be by knowing the input.

The absolute positioning system may provide an absolute position of the displacement member upon power-up of the instrument, without retracting or advancing the displacement member to a reset (zero or home) position as may be required with conventional rotary encoders that merely count the number of steps forwards or backwards that the motor 20230 has taken to infer the position of a device actuator, drive bar, knife, or the like.

A sensor 20226, such as, for example, a strain gauge or a micro-strain gauge, may be configured to measure one or more parameters of the end effector, such as, for example, the amplitude of the strain exerted on the anvil during a clamping operation, which can be indicative of the closure forces applied to the anvil. The measured strain may be converted to a digital signal and provided to the processor 20222. Alternatively, or in addition to the sensor 20226, a sensor 20227, such as, for example, a load sensor, can measure the closure force applied by the closure drive system to the anvil. The sensor 20227, such as, for example, a load sensor, can measure the firing force applied to an I-beam in a firing stroke of the surgical instrument or tool. The I-beam is configured to engage a wedge sled, which is configured to upwardly cam staple drivers to force out staples into deforming contact with an anvil. The I-beam also may include a sharpened cutting edge that can be used to sever tissue as the I-beam is advanced distally by the firing bar. Alternatively, a current sensor 20231 can be employed to measure the current drawn by the motor 20230.

The force required to advance the firing member can correspond to the current drawn by the motor 20230, for example. The measured force may be converted to a digital signal and provided to the processor 20222.

For example, the strain gauge sensor 20226 can be used to measure the force applied to the tissue by the end effector. A strain gauge can be coupled to the end effector to measure the force on the tissue being treated by the end effector. A system for measuring forces applied to the tissue grasped by the end effector may comprise a strain gauge sensor 20226, such as, for example, a micro-strain gauge, that can be configured to measure one or more parameters of the end effector, for example. In one aspect, the strain gauge sensor 20226 can measure the amplitude or magnitude of the strain exerted on a jaw member of an end effector during a clamping operation, which can be indicative of the tissue compression. The measured strain can be converted to a digital signal and provided to a processor 20222 of the microcontroller 20221. A load sensor 20227 can measure the force used to operate the knife element, for example, to cut the tissue captured between the anvil and the staple cartridge. A magnetic field sensor can be employed to measure the thickness of the captured tissue. The measurement of the magnetic field sensor also may be converted to a digital signal and provided to the processor 20222.

The measurements of the tissue compression, the tissue thickness, and/or the force required to close the end effector on the tissue, as respectively measured by the sensors 20226, 20227, can be used by the microcontroller 20221 to characterize the selected position of the firing member and/or the corresponding value of the speed of the firing member. In one instance, a memory 20223 may store a technique, an equation, and/or a lookup table which can be employed by the microcontroller 20221 in the assessment.

The control system 20220 of the surgical instrument or tool also may comprise wired or wireless communication circuits to communicate with the modular communication hub 20065 as shown in FIG. 5.

Figure 7:
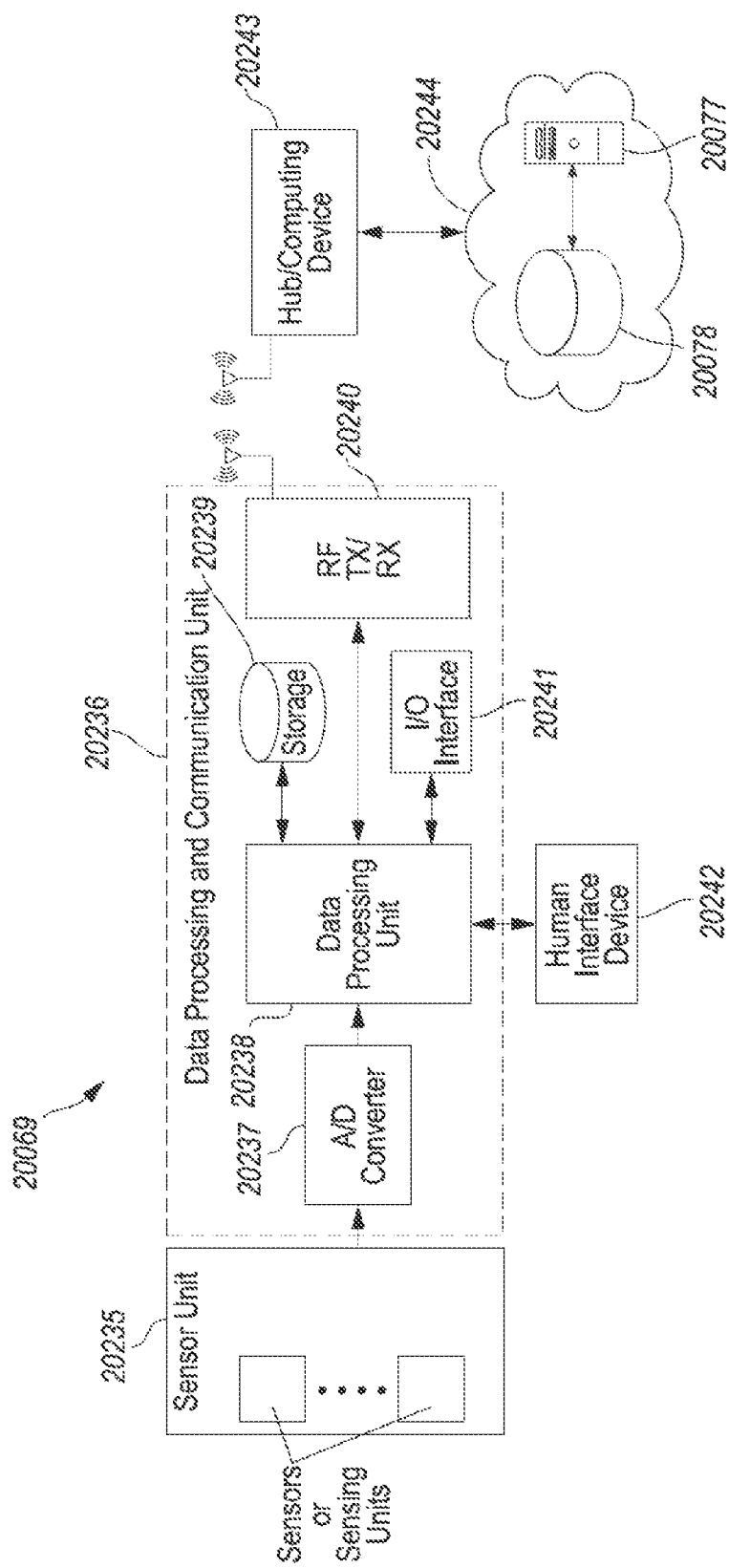
FIG. 7 shows an exemplary sensing system with a sensor unit and a data processing and communication unit.

FIG. 7 shows an example sensing system 20069. The sensing system may be an HCP sensing system or a patient sensing system. The sensing system 20069 may include a sensor unit 20235 and a human interface system 20242 that are in communication with a data processing and communication unit 20236. The data processing and communication unit 20236 may include an analog-to-digital converted 20237, a data processing unit 20238, a storage unit 20239, and an input/output interface 20241, a transceiver 20240. The sensing system 20069 may be in communication with a surgical hub or a computing device 20243, which in turn is in communication with a cloud computing system 20244. The cloud computing system 20244 may include a cloud storage system 20078 and one or more cloud servers 20077.

The sensor unit 20235 may include one or more ex vivo or in vivo sensors for measuring one or more biomarkers. The biomarkers may include, for example, blood pH, hydration state, oxygen saturation, core body temperature, heart rate, heart rate variability, sweat rate, skin conductance, blood pressure, light exposure, environmental temperature, respiratory rate, coughing and sneezing, gastrointestinal motility, gastrointestinal tract imaging, tissue perfusion pressure, bacteria in respiratory tract, alcohol consumption, lactate (sweat), peripheral temperature, positivity and optimism, adrenaline (sweat), cortisol (sweat), edema, mycotoxins, VO2 max, pre-operative pain, chemicals in the air, circulating tumor cells, stress and anxiety, confusion and delirium, physical activity, autonomic tone, circadian rhythm, menstrual cycle, sleep, etc. These biomarkers may be measured using one or more sensors, for example, photosensors (e.g., photodiodes, photoresistors), mechanical sensors (e.g., motion sensors), acoustic sensors, electrical sensors, electrochemical sensors, thermoelectric sensors, infrared sensors, etc. The sensors may measure the biomarkers as described herein using one of more of the following sensing technologies: photoplethysmography, electrocardiography, electroencephalography, colorimetry, impedimentary, potentiometry, amperometry, etc.

As illustrated in FIG. 7, a sensor in the sensor unit 20235 may measure a physiological signal (e.g., a voltage, a current, a PPG signal, etc.) associated with a biomarker to be measured. The physiological signal to be measured may depend on the sensing technology used, as described herein. The sensor unit 20235 of the sensing system 20069 may be in communication with the data processing and communication unit 20236. In an example, the sensor unit 20235 may communicate with the data processing and communication unit 20236 using a wireless interface. The data processing and communication unit 20236 may include an analog-to-digital converter (ADC) 20237, a data processing unit 20238, a storage 20239, an I/O interface 20241, and an RF transceiver 20240. The data processing unit 20238 may include a processor and a memory unit.

The sensor unit 20235 may transmit the measured physiological signal to the ADC 20237 of the data processing and communication unit 20236. In an example, the measured physiological signal may be passed through one or more filters (e.g., an RC low-pass filter) before being sent to the ADC. The ADC may convert the measured physiological signal into measurement data associated with the biomarker. The ADC may pass measurement data to the data processing unit 20238 for processing. In an example, the data processing unit 20238 may send the measurement data associated with the biomarker to a surgical hub or a computing device 20243, which in turn may send the measurement data to a cloud computing system 20244 for further processing. The data processing unit may send the measurement data to the surgical hub or the computing device 20243 using one of the wireless protocols, as described herein. In an example, the data processing unit 20238 may first process the raw measurement data received from the sensor unit and send the processed measurement data to the surgical hub or a computing device 20243.

In an example, the data processing and communication unit 20236 of the sensing system 20069 may receive a threshold value associated with a biomarker for monitoring from a surgical hub, a computing device 20243, or directly from a cloud server 20077 of the cloud computing system 20244. The data processing unit 20236 may compare the measurement data associated with the biomarker to be monitored with the corresponding threshold value received from the surgical hub, the computing device 20243, or the cloud server 20077. The data processing and communication unit 20236 may send a notification message to the HID 20242 indicating that a measurement data value has crossed the threshold value. The notification message may include the measurement data associated with the monitored biomarker. The data processing and computing unit 20236 may send a notification via a transmission to a surgical hub or a computing device 20243 using one of the following RF protocols: Bluetooth, Bluetooth Low-Energy (BLE), Bluetooth Smart, Zigbee, Z-wave, IPv6 Low-power wireless Personal Area Network (6LoWPAN), Wi-Fi. The data processing unit 20238 may send a notification (e.g., a notification for an HCP) directly to a cloud server via a transmission to a cellular transmission/reception point (TRP) or a base station using one or more of the following cellular protocols: GSM/GPRS/EDGE (2G), UMTS/HSPA (3G), long term evolution (LTE) or 4G, LTE-Advanced (LTE-A), new radio (NR) or 5G. In an example, the sensing unit may be in communication with the hub/computing device via a router.

In an example, the sensor unit may include a sensor and an analog-to-digital converted (ADC). The ADC in the sensor unit may convert a physiological signal measured by the sensor into measurement data associated with a biomarker. The sensor unit may send the measurement data to the data processing and communication unit for further processing. In an example, the sensor unit may send the measurement data to the data processing and communication unit using an inter-integrated circuit (I2C) interface.

The data processing and communication unit includes a data processing unit, a storage unit, and an RF transceiver. The sensing system may be in communication with a surgical hub or a computing device, which in turn may be in communication with a cloud computing system 20244. The cloud computing system 20244 may include a remote server 20077 and an associated remote storage 20078. The sensor unit may include one or more ex vivo or in vivo sensors for measuring one or more biomarkers, as described herein.

The data processing and communication unit after processing the measurement data received from the sensor unit may further process the measurement data and/or send the measurement data to the smart hub or the computing device 20243. In an example, the data processing and communication unit may send the measurement data received from the sensor unit to the remote server 20077 of the cloud computing system 20244 for further processing and/or monitoring.

In an example, the sensor unit may include multiple sensors to measure one or more physiological signals associated with a patient or surgeon's biomarkers and/or one or more physical state signals associated with physical state of a person. A list of biomarkers may include biomarkers such as those biomarkers disclosed herein. The ADC(s) in the sensor unit may convert each of the physiological signals and/or physical state signals measured by the multiple sensors into respective measurement data. The sensor unit may send the measurement data associated with one or more biomarkers as well as the physical state of the person being monitored to the data processing and communication unit for further processing. The sensor unit may send the measurement data to the data processing and communication unit individually for each of the sensors or combined for all the sensors. In an example, the sensor unit may send the measurement data to the data processing and communication unit via an I2C interface.

Figure 8:
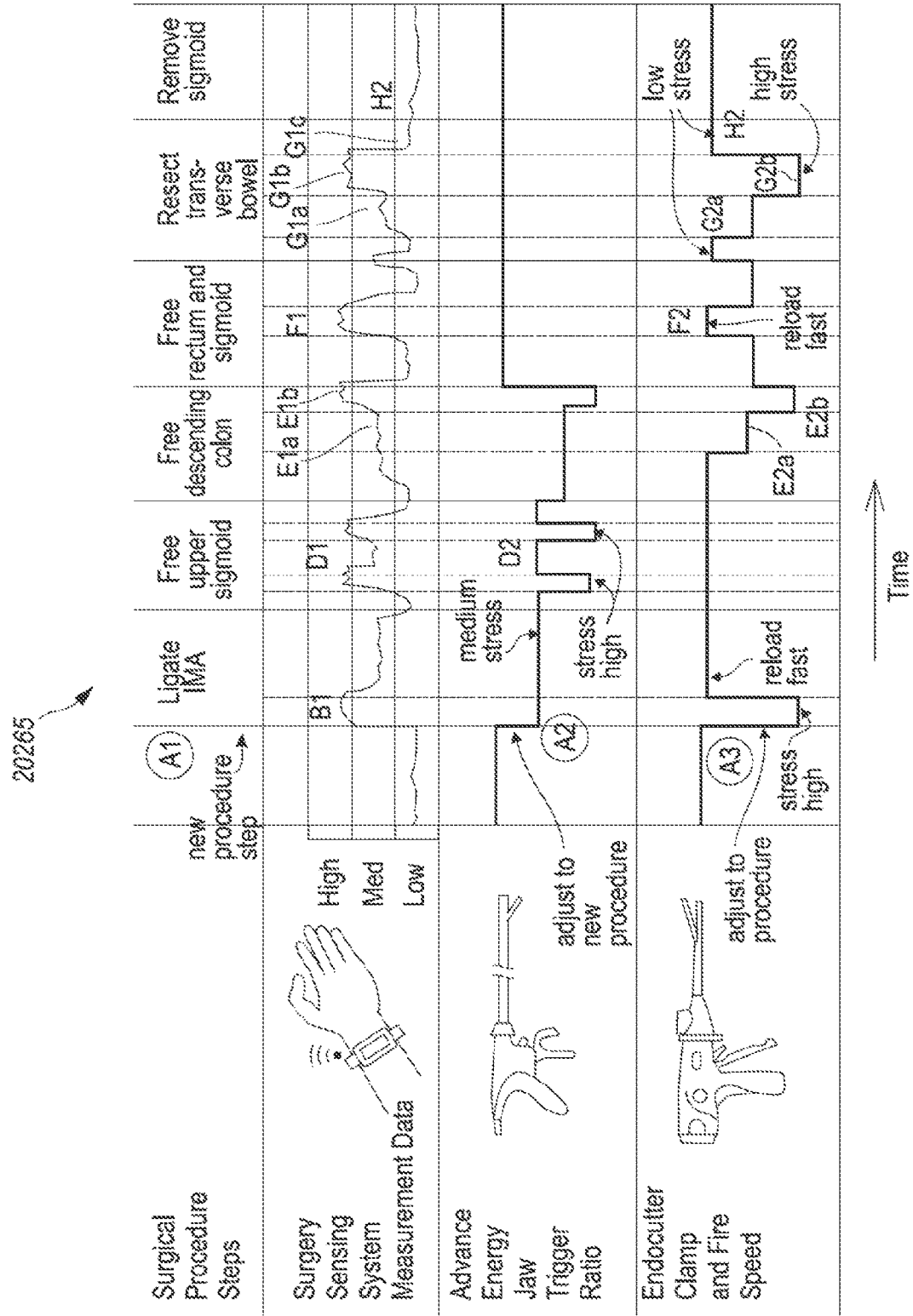
FIG. 8 illustrates an exemplary timeline of an illustrative surgical procedure indicating adjusting operational parameters of a surgical device based on a surgeon biomarker level.

FIG. 8 is an example of using a surgical task situational awareness and measurement data from one or more HCP sensing systems to adjust surgical instrument controls. FIG. 8 illustrates a timeline 20265 of an illustrative surgical procedure and the contextual information that a surgical hub can derive from data received from one or more surgical devices, one or more HCP sensing systems, and/or one or more environmental sensing systems at each step in the surgical procedure. The devices that could be controlled by a surgical hub may include advanced energy devices, endocutter clamps, etc. The HCP sensing systems may include sensing systems for measuring one or more biomarkers associated with the surgeon, for example, heart rate, sweat composition, respiratory rate, etc. The environmental sensing system may include systems for measuring one or more of the environmental attributes, for example, cameras for detecting a surgeon's position/movements/breathing pattern, spatial microphones, for example to measure ambient noise in the surgical theater and/or the tone of voice of a healthcare provider, temperature/humidity of the surroundings, etc.

In the following description of the timeline 20265 illustrated in FIG. 8, reference should also be made to FIG. 5. FIG. 5 provides various components used in a surgical procedure. The timeline 20265 depicts the steps that may be taken individually and/or collectively by the nurses, surgeons, and other medical personnel during the course of an exemplary colorectal surgical procedure. In a colorectal surgical procedure, a situationally aware surgical hub 20076 may receive data from various data sources throughout the course of the surgical procedure, including data generated each time an HCP utilizes a modular device/instrument 20095 that is paired with the surgical hub 20076. The surgical hub 20076 may receive this data from the paired modular devices 20095. The surgical hub may receive measurement data from sensing systems 20069. The surgical hub may use the data from the modular device/instruments 20095 and/or measurement data from the sensing systems 20069 to continually derive inferences (i.e., contextual information) about an HCP's stress level and the ongoing procedure as new data is received, such that the stress level of the surgeon relative to the step of the procedure that is being performed is obtained. The situational awareness system of the surgical hub 20076 may perform one or more of the following: record data pertaining to the procedure for generating reports, verify the steps being taken by the medical personnel, provide data or prompts (e.g., via a display screen) that may be pertinent for the particular procedural step, adjust modular devices based on the context (e.g., activate monitors, adjust the FOV of the medical imaging device, change the energy level of an ultrasonic surgical instrument or RF electrosurgical instrument), or take any other such action described herein. In an example, these steps may be performed by a remote server 20077 of a cloud system 20064 and communicated with the surgical hub 20076.

As a first step (not shown in FIG. 8 for brevity), the hospital staff members may retrieve the patient's EMR from the hospital's EMR database. Based on select patient data in the EMR, the surgical hub 20076 may determine that the procedure to be performed is a colorectal procedure. The staff members may scan the incoming medical supplies for the procedure. The surgical hub 20076 may cross-reference the scanned supplies with a list of supplies that can be utilized in various types of procedures and confirms that the mix of supplies corresponds to a colorectal procedure. The surgical hub 20076 may pair each of the sensing systems 20069 worn by different HCPs.

Once each of the devices is ready and pre-surgical preparation is complete, the surgical team may begin by making incisions and place trocars. The surgical team may perform access and prep by dissecting adhesions, if any, and identifying inferior mesenteric artery (IMA) branches. The surgical hub 20076 can infer that the surgeon is in the process of dissecting adhesions, at least based on the data it may receive from the RF or ultrasonic generator indicating that an energy instrument is being fired. The surgical hub 20076 may cross-reference the received data with the retrieved steps of the surgical procedure to determine that an energy instrument being fired at this point in the process (e.g., after the completion of the previously discussed steps of the procedure) corresponds to the dissection step.

After dissection, the HCP may proceed to the ligation step (e.g., indicated by A1) of the procedure. As illustrated in FIG. 8, the HCP may begin by ligating the IMA. The surgical hub 20076 may infer that the surgeon is ligating arteries and veins because it may receive data from the advanced energy jaw device and/or the endocutter indicating that the instrument is being fired. The surgical hub may also receive measurement data from one of the HCP's sensing systems indicating higher stress level of the HCP (e.g., indicated by B1 mark on the time axis). For example, higher stress level may be indicated by change in the HCP's heart rate from a base value. The surgical hub 20076, like the prior step, may derive this inference by cross-referencing the receipt of data from the surgical stapling and cutting instrument with the retrieved steps in the process (e.g., as indicated by A2 and A3). The surgical hub 20076 may monitor the advance energy jaw trigger ratio and/or the endocutter clamp and firing speed during the high stress time periods. In an example, the surgical hub 20076 may send an assistance control signal to the advanced energy jaw device and/or the endocutter device to control the device in operation. The surgical hub may send the assistance signal based on the stress level of the HCP that is operating the surgical device and/or situational awareness known to the surgical hub. For example, the surgical hub 20076 may send control assistance signals to an advanced energy device or an endocutter clamp, as indicated in FIG. 8 by A2 and A3.

The HCP may proceed to the next step of freeing the upper sigmoid followed by freeing descending colon, rectum, and sigmoid. The surgical hub 20076 may continue to monitor the high stress markers of the HCP (e.g., as indicated by D1, E1a, E1b, F1). The surgical hub 20076 may send assistance signals to the advanced energy jaw device and/or the endocutter device during the high stress time periods, as illustrated in FIG. 8.

After mobilizing the colon, the HCP may proceed with the segmentectomy portion of the procedure. For example, the surgical hub 20076 may infer that the HCP is transecting the bowel and sigmoid removal based on data from the surgical stapling and cutting instrument, including data from its cartridge. The cartridge data can correspond to the size or type of staple being fired by the instrument, for example. As different types of staples are utilized for different types of tissues, the cartridge data can thus indicate the type of tissue being stapled and/or transected. It should be noted that surgeons regularly switch back and forth between surgical stapling/cutting instruments and surgical energy (e.g., RF or ultrasonic) instruments depending upon the step in the procedure because different instruments are better adapted for particular tasks. Therefore, the sequence in which the stapling/cutting instruments and surgical energy instruments are used can indicate what step of the procedure the surgeon is performing.

The surgical hub may determine and send a control signal to surgical device based on the stress level of the HCP. For example, during time period G1b, a control signal G2b may be sent to an endocutter clamp. Upon removal of the sigmoid, the incisions are closed, and the post-operative portion of the procedure may begin. The patient's anesthesia can be reversed. The surgical hub 20076 may infer that the patient is emerging from the anesthesia based on one or more sensing systems attached to the patient.

Figure 9:
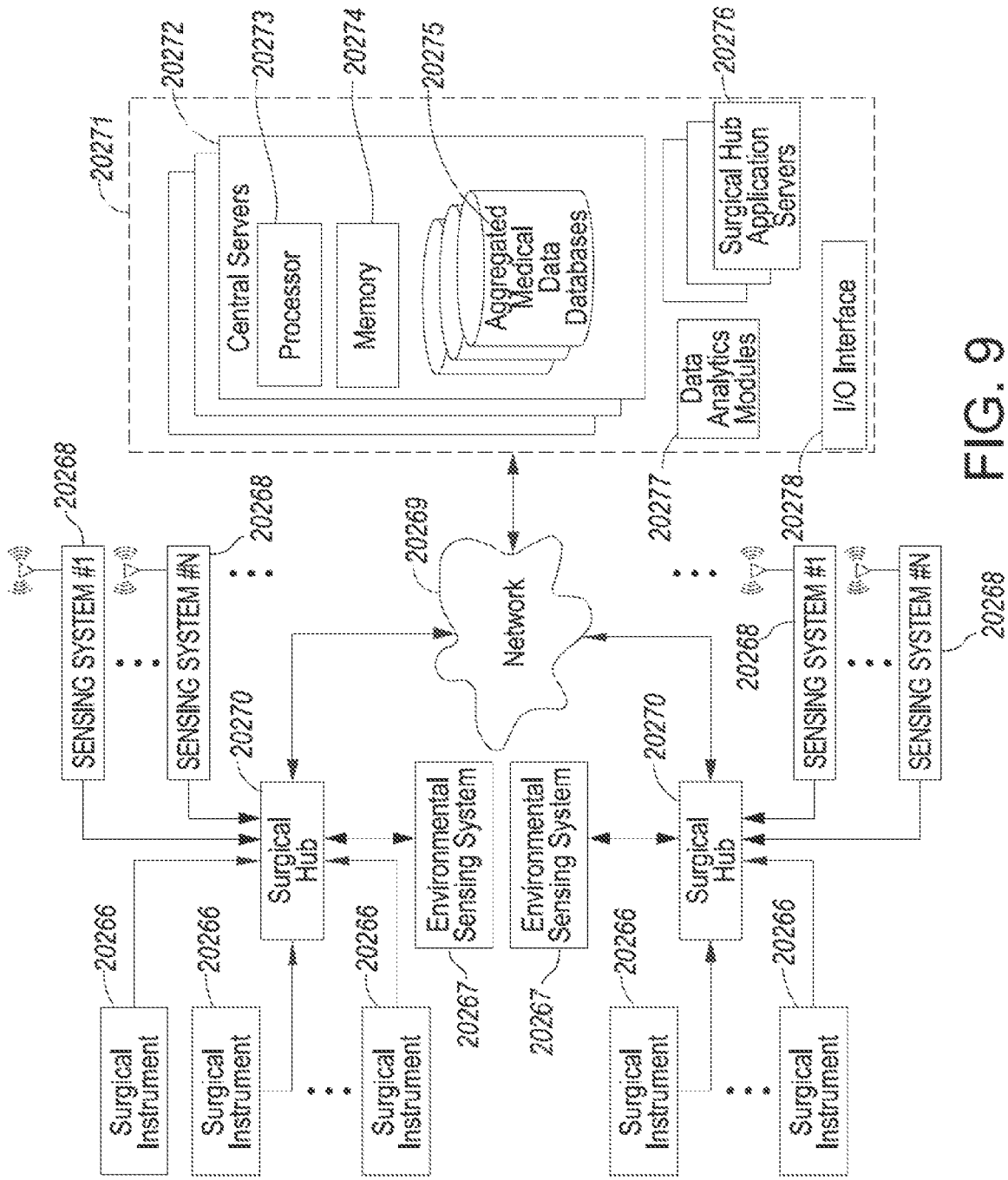
FIG. 9 is a block diagram of the computer-implemented interactive HCP monitoring system.

FIG. 9 shows an example computer-implemented interactive surgical system may be configured to monitor HCP biomarkers using one or more sensing systems 20001. The computer-implemented interactive surgical system may be configured to monitor HCP biomarkers using one or more sensing systems 20069. The HCP biomarkers and/or the patient biomarkers may be measured before, after, and/or during a surgical procedure. In one aspect, the computer-implemented interactive surgical system may be configured to monitor and analyze data related to the operation of various surgical systems 20069 that include surgical hubs, surgical instruments, robotic devices and operating theaters or healthcare facilities. The computer-implemented interactive surgical system may include a cloud-based analytics system. The computer-implemented interactive surgical system may include a local analytics system. The cloud-based analytics system may include one or more analytics servers.

A monitoring and analytics system may include a plurality of sensing systems 20268 (may be the same or similar to the sensing systems 20069), surgical instruments 20266 (may be the same or similar to instruments 20031), and/or a plurality of surgical hubs 20270 (may be the same or similar to hubs 20006). A surgical data network 20269 (may be the same or similar to the surgical data network described in FIG. 4) may couple the surgical hubs 20270 to the computing system 20271 (may be a local computing system, an edge computing system, or may be a cloud computing system such as cloud computing system 20064). The surgical hubs 20270 may be communicatively coupled to one or more surgical instruments 20266. The surgical hubs 20270 may also be communicatively coupled to the one or more sensing systems 20268, and the cloud 20271 of the computer-implemented interactive surgical system via the network 20269. The surgical hubs 20270 and the sensing systems 20268 may be communicatively coupled using wireless protocols as described herein. The computing system 20271 may be a local or remote centralized source of hardware and software for storing, processing, manipulating, and communicating measurement data from the sensing systems 20268 and data generated based on the operation of various surgical instruments 20266.

As shown in FIG. 9, access to the computing system 20271 may be achieved via the network 20269. The network 20269 may be the Internet or some other suitable computer network. Surgical hubs 20270 that may be coupled to the computing system 20271 can be considered the client side of the computing system (e.g., cloud-based analytics system). Surgical instruments 20266 may be paired with the surgical hubs 20270 for control and implementation of various surgical procedures and/or operations, as described herein. Sensing systems 20268 may be paired with surgical hubs 20270 for in-surgical HCP monitoring of surgeon related biomarkers, pre-surgical HCP monitoring, monitoring, or post-surgical HCP monitoring. Environmental sensing systems 20267 may be paired with surgical hubs 20270 measuring environmental attributes associated with an HCP.

Surgical instruments 20266, environmental sensing systems 20267, and sensing systems 20268 may comprise wired or wireless transceivers for data transmission to and from their corresponding surgical hubs 20270 (which may also comprise transceivers). Combinations of one or more of surgical instruments 20266, sensing systems 20268, or surgical hubs 20270 may indicate particular locations, such as operating theaters, intensive care unit (ICU) rooms, or recovery rooms in healthcare facilities (e.g., hospitals), for providing medical operations, pre-surgical preparation, and/or post-surgical recovery. For example, the memory of a surgical hub 20270 may store location data.

As shown in FIG. 9, the computing system 20271 may include one or more central servers 20272 (may be same or similar to remote server 20067), surgical hub application servers 20276, data analytics modules 20277, and an input/output ("I/O") interface 20278. The central servers 20272 of the computing system 20271 may collectively administer the cloud computing system, which includes monitoring requests by client surgical hubs 20270 and managing the processing capacity of the computing system 20271 for executing the requests. Each of the central servers 20272 may comprise one or more processors 20273 coupled to suitable memory devices 20274 which can include volatile memory such as random-access memory (RAM) and non-volatile memory such as magnetic storage devices. The memory devices 20274 may comprise machine executable instructions that when executed cause the processors 20273 to execute the data analytics modules 20277 for the cloud-based data analysis, real-time monitoring of measurement data received from the sensing systems 20268, operations, recommendations, and other operations as described herein. The processors 20273 can execute the data analytics modules 20277 independently or in conjunction with hub applications independently executed by the hubs 20270. The central servers 20272 also may include aggregated medical data databases 20275, which can reside in the memory 20274.

Based on connections to various surgical hubs 20270 via the network 20269, the computing system 20271 can aggregate data from specific data generated by various surgical instruments 20266, real-time data from sensing systems 20268, and/or the surgical hubs 20270. Such aggregated data may be stored within the aggregated medical databases 20275 associated with the computing system 20271. The computing system 20271 may track real-time measurement data from the sensing systems 20268 and/or perform data analysis and operations on the measurement data and/or the aggregated data to yield insights and/or perform functions that individual hubs 20270 could not achieve on their own.

As shown in FIG. 9, the computing system 20271 and the surgical hubs 20270 may be communicatively coupled to send and receive information. The I/O interface 20278 is connected to the plurality of surgical hubs 20270 via the network 20269. The I/O interface 20278 can be configured to transfer information between the surgical hubs 20270 and the aggregated medical data databases 20275. The I/O interface 20278 may facilitate read/write operations of the cloud-based analytics system. Such read/write operations may be executed in response to requests from hubs 20270. These requests could be transmitted to the surgical hubs 20270 through the hub applications. The I/O interface 20278 may include one or more high speed data ports, which may include universal serial bus (USB) ports, IEEE 1394 ports, as well as Wi-Fi and Bluetooth I/O interfaces for connecting the computing system 20271 to surgical hubs 20270. The hub application servers 20276 of the computing system 20271 may be configured to host and supply shared capabilities to software applications (e.g., hub applications) executed by surgical hubs 20270. For example, the hub application servers 20276 may manage requests made by the hub applications through the hubs 20270, control access to the aggregated medical data databases 20275, and perform load balancing.

The computing system may address various issues arising in the context of medical operations (e.g., pre-surgical monitoring, in-surgical monitoring, and post-surgical monitoring) and procedures performed using medical devices, such as the surgical instruments 20266, 20031. The surgical instruments 20266 may be digital surgical devices configured to interact with the computing system 20271 for implementing techniques to improve the performance of surgical operations. The computing system may address various issues arising in the context of monitoring one or more biomarkers associated with HCP(s) or a patient in pre-surgical, in-surgical, and post-surgical procedures using sensing systems 20268. Sensing systems 20268 may interact with the surgical hub 20270 and/or with the computing system 20271 for implementing techniques to monitor surgeon biomarkers and/or patient biomarkers. The sensing systems 20268 may include systems with one or more sensors that are configured to measure one or more biomarkers associated with an HCP participating in a medical operation and/or a patient on whom a medical operation is planned to be performed, is being performed or has been performed. Various surgical instruments 20266, sensing systems 20268, and/or surgical hubs 20270 may include human interface systems (e.g., having a touch-controlled user interfaces) such that HCPS and/or patients may control aspects of interaction between the surgical instruments 20266 or the sensing system 20268 and the computing system 20271. Other suitable user interfaces for control such as auditory controlled user interfaces may also be used.

Figure 10:
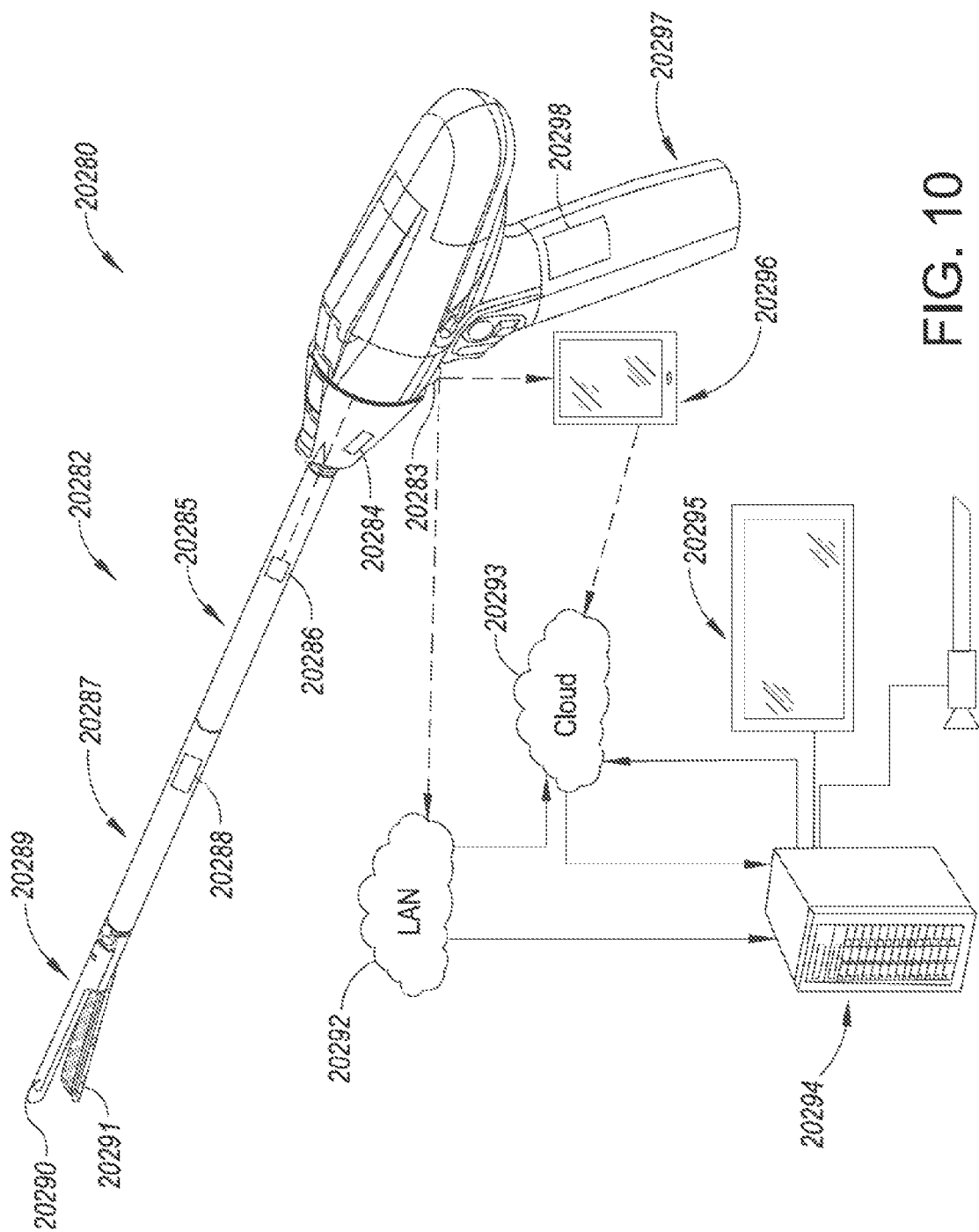
FIG. 10 shows an example surgical system that includes a handle having a controller and a motor, an adapter releasably coupled to the handle, and a loading unit releasably coupled to the adapter.

FIG. 10 illustrates an example surgical system 20280 in accordance with the present disclosure and may include a surgical instrument 20282 that can be in communication with a console 20294 or a portable device 20296 through a local area network 20292 and/or a cloud network 20293 via a wired and/or wireless connection. The console 20294 and the portable device 20296 may be any suitable computing device. The surgical instrument 20282 may include a handle 20297, an adapter 20285, and a loading unit 20287. The adapter 20285 releasably couples to the handle 20297 and the loading unit 20287 releasably couples to the adapter 20285 such that the adapter 20285 transmits a force from a drive shaft to the loading unit 20287. The adapter 20285 or the loading unit 20287 may include a force gauge (not explicitly shown) disposed therein to measure a force exerted on the loading unit 20287. The loading unit 20287 may include an end effector 20289 having a first jaw 20291 and a second jaw 20290. The loading unit 20287 may be an in-situ loaded or multi-firing loading unit (MFLU) that allows a clinician to fire a plurality of fasteners multiple times without requiring the loading unit 20287 to be removed from a surgical site to reload the loading unit 20287.

The first and second jaws 20291, 20290 may be configured to clamp tissue therebetween, fire fasteners through the clamped tissue, and sever the clamped tissue. The first jaw 20291 may be configured to fire at least one fastener a plurality of times or may be configured to include a replaceable multi-fire fastener cartridge including a plurality of fasteners (e.g., staples, clips, etc.) that may be fired more than one time prior to being replaced. The second jaw 20290 may include an anvil that deforms or otherwise secures the fasteners, as the fasteners are ejected from the multi-fire fastener cartridge.

The handle 20297 may include a motor that is coupled to the drive shaft to affect rotation of the drive shaft. The handle 20297 may include a control interface to selectively activate the motor. The control interface may include buttons, switches, levers, sliders, touchscreen, and any other suitable input mechanisms or user interfaces, which can be engaged by a clinician to activate the motor.

The control interface of the handle 20297 may be in communication with a controller 20298 of the handle 20297 to selectively activate the motor to affect rotation of the drive shafts. The controller 20298 may be disposed within the handle 20297 and may be configured to receive input from the control interface and adapter data from the adapter 20285 or loading unit data from the loading unit 20287. The controller 20298 may analyze the input from the control interface and the data received from the adapter 20285 and/or loading unit 20287 to selectively activate the motor. The handle 20297 may also include a display that is viewable by a clinician during use of the handle 20297. The display may be configured to display portions of the adapter or loading unit data before, during, or after firing of the instrument 20282.

The adapter 20285 may include an adapter identification device 20284 disposed therein and the loading unit 20287 may include a loading unit identification device 20288 disposed therein. The adapter identification device 20284 may be in communication with the controller 20298, and the loading unit identification device 20288 may be in communication with the controller 20298. It will be appreciated that the loading unit identification device 20288 may be in communication with the adapter identification device 20284, which relays or passes communication from the loading unit identification device 20288 to the controller 20298.

The adapter 20285 may also include a plurality of sensors 20286 (one shown) disposed thereabout to detect various conditions of the adapter 20285 or of the environment (e.g., if the adapter 20285 is connected to a loading unit, if the adapter 20285 is connected to a handle, if the drive shafts are rotating, the torque of the drive shafts, the strain of the drive shafts, the temperature within the adapter 20285, a number of firings of the adapter 20285, a peak force of the adapter 20285 during firing, a total amount of force applied to the adapter 20285, a peak retraction force of the adapter 20285, a number of pauses of the adapter 20285 during firing, etc.). The plurality of sensors 20286 may provide an input to the adapter identification device 20284 in the form of data signals. The data signals of the plurality of sensors 20286 may be stored within or be used to update the adapter data stored within the adapter identification device 20284. The data signals of the plurality of sensors 20286 may be analog or digital. The plurality of sensors 20286 may include a force gauge to measure a force exerted on the loading unit 20287 during firing.

The handle 20297 and the adapter 20285 can be configured to interconnect the adapter identification device 20284 and the loading unit identification device 20288 with the controller 20298 via an electrical interface. The electrical interface may be a direct electrical interface (i.e., include electrical contacts that engage one another to transmit energy and signals therebetween). Additionally, or alternatively, the electrical interface may be a non-contact electrical interface to wirelessly transmit energy and signals therebetween (e.g., inductively transfer). It is also contemplated that the adapter identification device 20284 and the controller 20298 may be in wireless communication with one another via a wireless connection separate from the electrical interface.

The handle 20297 may include a transceiver 20283 that is configured to transmit instrument data from the controller 20298 to other components of the system 20280 (e.g., the LAN 20292, the cloud 20293, the console 20294, or the portable device 20296). The controller 20298 may also transmit instrument data and/or measurement data associated with one or more sensors 20286 to a surgical hub 20270, as illustrated in FIG. 9. The transceiver 20283 may receive data (e.g., cartridge data, loading unit data, adapter data, or other notifications) from the surgical hub 20270. The transceiver 20283 may receive data (e.g., cartridge data, loading unit data, or adapter data) from the other components of the system 20280. For example, the controller 20298 may transmit instrument data including a serial number of an attached adapter (e.g., adapter 20285) attached to the handle 20297, a serial number of a loading unit (e.g., loading unit 20287) attached to the adapter 20285, and a serial number of a multi-fire fastener cartridge loaded into the loading unit to the console 20294. Thereafter, the console 20294 may transmit data (e.g., cartridge data, loading unit data, or adapter data) associated with the attached cartridge, loading unit, and adapter, respectively, back to the controller 20298. The controller 20298 can display messages on the local instrument display or transmit the message, via transceiver 20283, to the console 20294 or the portable device 20296 to display the message on the display 20295 or portable device screen, respectively.

Figure 11:
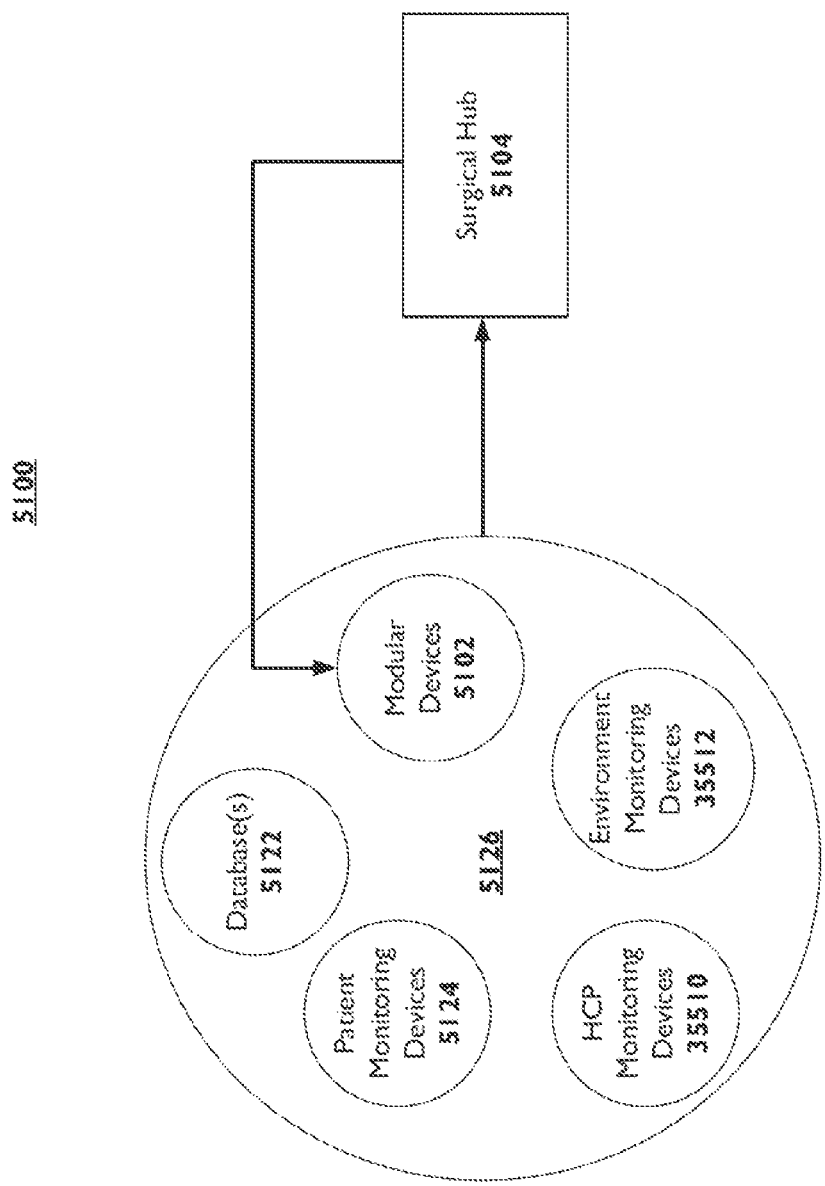
FIG. 11 is a diagram of an example situationally aware surgical system.

FIG. 11 illustrates a diagram of a situationally aware surgical system 5100, in accordance with at least one aspect of the present disclosure. The data sources 5126 may include, for example, the modular devices 5102 (which can include sensors configured to detect parameters associated with the patient, HCPs and environment and/or the modular device itself), databases 5122 (e.g., an EMR database containing patient records), and patient monitoring devices 5124 (e.g., a blood pressure (BP) monitor and an electrocardiography, (EKG) monitor), HCP monitoring devices 35510, and/or environment monitoring devices 35512. The surgical hub 5104 can be configured to derive the contextual information pertaining to the surgical procedure from the data based upon, for example, the particular combination(s) of received data or the particular order in which the data is received from the data sources 5126. The contextual information inferred from the received data can include, for example, the type of surgical procedure being performed, the particular step of the surgical procedure that the surgeon is performing, the type of tissue being operated on, or the body cavity that is the subject of the procedure. This ability by some aspects of the surgical hub 5104 to derive or infer information related to the surgical procedure from received data can be referred to as "situational awareness." For example, the surgical hub 5104 can incorporate a situational awareness system, which is the hardware and/or programming associated with the surgical hub 5104 that derives contextual information pertaining to the surgical procedure from the received data.

The situational awareness system of the surgical hub 5104 can be configured to derive the contextual information from the data received from the data sources 5126 in a variety of different ways. For example, the situational awareness system can include a pattern recognition system, or machine learning system (e.g., an artificial neural network), that has been trained on training data to correlate various inputs (e.g., data from database(s) 5122, patient monitoring devices 5124, modular devices 5102, HCP monitoring devices 35510, and/or environment monitoring devices 35512) to corresponding contextual information regarding a surgical procedure. A machine learning system can be trained to accurately derive contextual information regarding a surgical procedure from the provided inputs. In examples, the situational awareness system can include a lookup table storing pre-characterized contextual information regarding a surgical procedure in association with one or more inputs (or ranges of inputs) corresponding to the contextual information. In response to a query with one or more inputs, the lookup table can return the corresponding contextual information for the situational awareness system for controlling the modular devices 5102. In examples, the contextual information received by the situational awareness system of the surgical hub 5104 can be associated with a particular control adjustment or set of control adjustments for one or more modular devices 5102. In examples, the situational awareness system can include a further machine learning system, lookup table, or other such system, which generates or retrieves one or more control adjustments for one or more modular devices 5102 when provided the contextual information as input.

A surgical hub 5104 incorporating a situational awareness system can provide a number of benefits for the surgical system 5100. One benefit may include improving the interpretation of sensed and collected data, which would in turn improve the processing accuracy and/or the usage of the data during the course of a surgical procedure. To return to a previous example, a situationally aware surgical hub 5104 could determine what type of tissue was being operated on; therefore, when an unexpectedly high force to close the surgical instrument's end effector is detected, the situationally aware surgical hub 5104 could correctly ramp up or ramp down the motor of the surgical instrument for the type of tissue.

The type of tissue being operated can affect the adjustments that are made to the compression rate and load thresholds of a surgical stapling and cutting instrument for a particular tissue gap measurement. A situationally aware surgical hub 5104 could infer whether a surgical procedure being performed is a thoracic or an abdominal procedure, allowing the surgical hub 5104 to determine whether the tissue clamped by an end effector of the surgical stapling and cutting instrument is lung (for a thoracic procedure) or stomach (for an abdominal procedure) tissue. The surgical hub 5104 could then adjust the compression rate and load thresholds of the surgical stapling and cutting instrument appropriately for the type of tissue.

The type of body cavity being operated in during an insufflation procedure can affect the function of a smoke evacuator. A situationally aware surgical hub 5104 could determine whether the surgical site is under pressure (by determining that the surgical procedure is utilizing insufflation) and determine the procedure type. As a procedure type can be generally performed in a specific body cavity, the surgical hub 5104 could then control the motor rate of the smoke evacuator appropriately for the body cavity being operated in. Thus, a situationally aware surgical hub 5104 could provide a consistent amount of smoke evacuation for both thoracic and abdominal procedures.

The type of procedure being performed can affect the optimal energy level for an ultrasonic surgical instrument or radio frequency (RF) electrosurgical instrument to operate at. Arthroscopic procedures, for example, may require higher energy levels because the end effector of the ultrasonic surgical instrument or RF electrosurgical instrument is immersed in fluid. A situationally aware surgical hub 5104 could determine whether the surgical procedure is an arthroscopic procedure. The surgical hub 5104 could then adjust the RF power level or the ultrasonic amplitude of the generator (e.g., "energy level") to compensate for the fluid filled environment. Relatedly, the type of tissue being operated on can affect the optimal energy level for an ultrasonic surgical instrument or RF electrosurgical instrument to operate at. A situationally aware surgical hub 5104 could determine what type of surgical procedure is being performed and then customize the energy level for the ultrasonic surgical instrument or RF electrosurgical instrument, respectively, according to the expected tissue profile for the surgical procedure. Furthermore, a situationally aware surgical hub 5104 can be configured to adjust the energy level for the ultrasonic surgical instrument or RF electrosurgical instrument throughout the course of a surgical procedure, rather than just on a procedure-by-procedure basis. A situationally aware surgical hub 5104 could determine what step of the surgical procedure is being performed or will subsequently be performed and then update the control algorithms for the generator and/or ultrasonic surgical instrument or RF electrosurgical instrument to set the energy level at a value appropriate for the expected tissue type according to the surgical procedure step.

In examples, data can be drawn from additional data sources 5126 to improve the conclusions that the surgical hub 5104 draws from one data source 5126. A situationally aware surgical hub 5104 could augment data that it receives from the modular devices 5102 with contextual information that it has built up regarding the surgical procedure from other data sources 5126. For example, a situationally aware surgical hub 5104 can be configured to determine whether hemostasis has occurred (e.g., whether bleeding at a surgical site has stopped) according to video or image data received from a medical imaging device. The surgical hub 5104 can be further configured to compare a physiologic measurement (e.g., blood pressure sensed by a BP monitor communicably connected to the surgical hub 5104) with the visual or image data of hemostasis (e.g., from a medical imaging device communicably coupled to the surgical hub 5104) to make a determination on the integrity of the staple line or tissue weld. The situational awareness system of the surgical hub 5104 can consider the physiological measurement data to provide additional context in analyzing the visualization data. The additional context can be useful when the visualization data may be inconclusive or incomplete on its own.

For example, a situationally aware surgical hub 5104 could proactively activate the generator to which an RF electrosurgical instrument is connected if it determines that a subsequent step of the procedure requires the use of the instrument. Proactively activating the energy source can allow the instrument to be ready for use a soon as the preceding step of the procedure is completed.

The situationally aware surgical hub 5104 could determine whether the current or subsequent step of the surgical procedure requires a different view or degree of magnification on the display according to the feature(s) at the surgical site that the surgeon is expected to need to view. The surgical hub 5104 could proactively change the displayed view (supplied by, e.g., a medical imaging device for the visualization system 108) accordingly so that the display automatically adjusts throughout the surgical procedure.

The situationally aware surgical hub 5104 could determine which step of the surgical procedure is being performed or will subsequently be performed and whether particular data or comparisons between data will be required for that step of the surgical procedure. The surgical hub 5104 can be configured to automatically call up data screens based upon the step of the surgical procedure being performed, without waiting for the surgeon to ask for the particular information.

Errors may be checked during the setup of the surgical procedure or during the course of the surgical procedure. For example, the situationally aware surgical hub 5104 could determine whether the operating theater is setup properly or optimally for the surgical procedure to be performed. The surgical hub 5104 can be configured to determine the type of surgical procedure being performed, retrieve the corresponding checklists, product location, or setup needs (e.g., from a memory), and then compare the current operating theater layout to the standard layout for the type of surgical procedure that the surgical hub 5104 determines is being performed. In some exemplifications, the surgical hub 5104 can compare the list of items for the procedure and/or a list of devices paired with the surgical hub 5104 to a recommended or anticipated manifest of items and/or devices for the given surgical procedure. If there are any discontinuities between the lists, the surgical hub 5104 can provide an alert indicating that a particular modular device 5102, patient monitoring device 5124, HCP monitoring devices 35510, environment monitoring devices 35512, and/or other surgical item is missing. In some examples, the surgical hub 5104 can determine the relative distance or position of the modular devices 5102 and patient monitoring devices 5124 via proximity sensors, for example. The surgical hub 5104 can compare the relative positions of the devices to a recommended or anticipated layout for the particular surgical procedure. If there are any discontinuities between the layouts, the surgical hub 5104 can be configured to provide an alert indicating that the current layout for the surgical procedure deviates from the recommended layout.

The situationally aware surgical hub 5104 could determine whether the surgeon (or other HCP(s)) was making an error or otherwise deviating from the expected course of action during the course of a surgical procedure. For example, the surgical hub 5104 can be configured to determine the type of surgical procedure being performed, retrieve the corresponding list of steps or order of equipment usage (e.g., from a memory), and then compare the steps being performed or the equipment being used during the course of the surgical procedure to the expected steps or equipment for the type of surgical procedure that the surgical hub 5104 determined is being performed. The surgical hub 5104 can provide an alert indicating that an unexpected action is being performed or an unexpected device is being utilized at the particular step in the surgical procedure.

The surgical instruments (and other modular devices 5102) may be adjusted for the particular context of each surgical procedure (such as adjusting to different tissue types) and validating actions during a surgical procedure. Next steps, data, and display adjustments may be provided to surgical instruments (and other modular devices 5102) in the surgical theater according to the specific context of the procedure.

Object detection can be performed via computer vision and image processing that deals with detecting instances of semantic objects of a certain class (such as humans, equipment, or objects) in digital images and videos. Object detection is used in computer vision tasks such as image annotation, activity recognition, face detection, face recognition, video object co-segmentation. Object detection is used in tracking objects, for example tracking a ball during a football match, tracking movement of a cricket bat, or tracking a person in a video. Object detection may be performed via neural network-based approach(es), and/or non-neural approaches. For example, features may be defined and classification may be performed based on the defined features, for example, via support vector machine (SVM). Neural techniques may perform object detection without specifically defining features, and may be based on convolutional neural networks (CNN).

Moving object detection may be performed to recognize the physical movement of a person or an object in a given place or region. By acting segmentation among moving objects and stationary area or region, the moving objects motion could be tracked and thus could be analyzed later. Moving object detection may be performed via background subtraction, frame differencing, temporal differencing, and or optical flow analysis.

Smart and self-identifying RF systems may be used to locate HCPs and equipment in the OR. HCPs, instruments, equipment and/or boundaries may be located using spatial identifying sensors. The locations of HCPs, equipment and/or boundaries may be tracked with respect to the room and/or with respect to the patient, via wireless sensors and beacons.

A wearable monitoring system may be coupled to a person, such as an HCP or a patient. Ultra-wide band monitoring may be performed to identify the location of the person within the OR, and/or the person's relative position to an equipment, a surgical instrument, another person, a boundary, and/or the like.

RF element identification and boundary monitoring may be performed. RF beacons may be placed on equipment or instruments. BLE beacons may be placed in physical OR's. For example, beacons may be placed in corners of the OR, outlining the boundaries of the room. BLE beacons may be place on structures, such as large structures within the OR. BLE beacons may be placed on device for monitoring the device location relative to one or more boundaries.

For example, RFID tags may be affixed onto instruments and/or HCPs. Electromagnetic gates may be placed in the OR to prevent or to minimize violation of boundaries.

Boundary violations may be detected by tracking beacon movements. For example, the surgical hub may detect a boundary violation upon determining that the beacon has moved across a boundary. If the boundary violation is associated with a device crossing a boundary, the surgical hub may deactivate the device and alert an HCP of change of status. If the boundary violation is a larger structure, an urgent message can be displayed to indicate the equipment is of concern.

RF beacons may be used to locate HCPS in the OR theater. The location of an HCP may be tracked via their identification badge. The identification badge may have an imbedded RF beacon. The RF beacon may be high frequency (HF) or ultra-high frequency (UHF). The read range may not be affected by fluids or the need to penetrate structures. Since the size of the OR's can vary, the HF or UHF can provide sufficient coverage to accommodate potential distance from the surgical hub.

A surgical instrument may be associated with a unique RFID identification. The location of the surgical instrument may be tracked. The current use and/or the previous history of the surgical instrument may be determined based on location tracking. An external reader from the surgical hub may be positioned around the patient. The external reader may be used to track surgical instruments that enter the OR field. A low frequency or an HF chip may be used on instruments. The low or high frequencies may enable the reader to penetrate body fluids.

Instrument use can be determined and tracked based on its location. For example, the number of times a surgical instrument has been used, the length of time a device was in the patient, and/or a level of security that the device had been through a sterilization cycle prior to being introduced into the OR may be determined via location tracking. Whether an instrument has been left in the patient may be detected via location tracking of the instrument.

OR room imaging may be performed by multiple sources via various technologies to determine HCP, instrument, and/or equipment locations and their aspects. More than one imaging device can be used through different energy types to locate objects and people within the OR, the walls of the OR, and/or their proximity. The location and/or proximity information may be used to identify and/or control their interactions. Instruments and/or equipment may be configured based on the identified interactions.

For example, ultrasonic echo location may be used to determine object motion and measurements of location. OR visual or multi-spectral imaging may be used to monitor user location, interaction, and communication. Audio monitoring may be used to determine and record noise generating monitoring and tracking.

Infrared (IR) thermographic monitoring may be used to monitor the core temperate and the changes of temperature of HCPs and patient to adjust systems, monitor for infection, and/or understand situational awareness. As an HCP enters into the OR, an IR signature may be created for the HCP. An initial IR association response may be logged, for example, via the surgical hub. During a procedure, if the stress levels of the HCP increases, the IR signature may display or register the increased stress levels.

The various imaging systems may be used in concert. For example, the surgical hub may be positioned in the OR. Once powered up, the surgical hub may use an ultrasonic echo to determine the OR boundaries (e.g., walls) and large equipment locations to map room. A grid map may be established with all required boundaries.

When an HCP enters into OR theater, the HCP may be identified as entering via a BLE beacon associated with HCP. The surgical hub may check the HCP into theater. The surgical hub may begin tracking the HCP via an optical camera. The IR camera may perform the initial scan of the identified HCP for base line stress level(s). Once procedure begins, the audio monitoring system may monitor and record sounds. The surgical hub may monitor for voice inflections and/or raised nervous voices. The audio monitoring system can be synchronized with the IR camera, for example, for verifying an increase in stress levels. This process may be performed for multiple HCPs.

The HCPs in the OR may be recognized and tracked via an ID badge having an RFID, NFC, and/or a wearable device. For example, as an HCP move in and out of a room, as they come close to another wearable device, as they come close to a surgical hub, the identity of the HCP may be determined. The surgical hub may request HCP identifying information from an RFID reader, NFC reader, or a wearable device, upon detecting an HCP entering the OR. The surgical hub may confirm the identity of an HCP based on other source(s) of information. The surgical hub may assume that the identity of the HCP associated with an ID badge or a wearable device until the ID badge or wearable device is off. Details related to identifying an HCP and/or a user role via a wearable device may be found in U.S. application Ser. No. 17/156,324, entitled ACTIVE RECOGNITION AND PAIRING SENSING SYSTEMS, which is herein incorporated by reference in its entirety.

The HCPs in the OR may be recognized and tracked via video processing from video captured by one or more cameras in the OR. Various known image or video processing technologies, such as keypoint detection and analysis, bounding box annotation, polygon mesh processing, image segmentation, facial recognition, gesture recognition, point cloud, lines and splines, and/or the like may be used to analyze the video feeds.

The location, movement, and/or orientation of various surgical products and instruments in the operating room may be identified and tracked. For example, a gyroscope or 3 axis accelerometers may be used to determine device orientation and position.

For example, a surgical instrument may be identified via one or more spatial registration markers located thereon. For example, visible fiducial markers could be placed on the instrument. The surgical hub may monitor the location, movement, and/or orientation of the surgical instrument via one or more camera in the OR. The fiducial marks may be in a predefined pattern. The surgical hub may associate a surgical instrument with particular fiducial mark(s) and may use the mark(s) to identify and model the instrument with the 3D computer environment it creates and records. The registration allows for the compensation for translation, rotation, scale, skew, and perspective. This may enable the surgical hub to detect and monitor the instruments even once a portion of the instrument is obscured.

For visible monitoring, camera calibration may be conducted when the system starts up. A predefined set of calibration markers within the hub camera view that may be fixed, such that the surgical hub may calibrate the camera for distance and focal length. The surgical hub may determine the exact length from itself to another calibration preset scale in the OR, and may use the measurement and the scale to calibrate the camera and focal distance.

For example, the surgical hub may determine the exact distance via a measurement system. For example, measurement system(s) that employ laser Doppler, ultrasonic pinging, RF and/or other energy digital communication may be perform distance measurement and send the measurements to the surgical hub. The measurement system may be included in the surgical hub.

Distance may be inferred from active and/or passive electronic signal processing. For example, by monitoring the signal strength and compensating for emission power, emitting device antenna path, fight path, receiving device antenna path, and/or receiver sensitivity the communication between two paired systems or devices, the distance between the two systems or devices may be determined. For example, UHF or HF RFID tagged object may be tracked through a combination of predefined tag and distances in combination with unknown tags. The tags may be used to identify a product, device or instrument, and may allow the product, device or instrument tracked within the OR once identified. The tags may provide further information about the identified product, device or instrument. A RFID map may be generated from passive or active references tags with known locations (e.g., landmarks) to locate any unknown tag detected by the RFID reader antennas. The distances between the readers and the common detected tags may be measured using a large-scale path loss propagation model. The distance between the unknown tag and the detected landmarks (e.g., inter-tags distance) may be calculated.

A millimeter-wave radar may be used to track objects. Millimeter-wave radar may achieve an accuracy of around a few micrometers. With the radar operating using frequency-modulated continuous waves (FMCW), frequency and/and phase of radar beat signal may be used to determine the distance between the radar sensor and the object from which the radar signal is reflected.

A mapping or evaluation of the bounds of the operating room may be performed. For example, the surgical hub 20006 may maintain spatial awareness during operation by periodically mapping its operating room, which can be helpful in determining if the surgical hub 20006 has been moved. The reevaluation can be performed periodically or it can be triggered by an event such as observing a change in the devices of the HCP monitoring system 20002 that are deemed within the operating room. The change may be the detection of a new device that was not previously deemed as within the bounds of the operating room. The change may be a disappearance, disconnection, or un-pairing of a paired device that was previously deemed as residing within the operating room. The surgical hub 20006 may continuously monitor the connection with paired devices to detect the disappearance, disconnection, or un-pairing of a paired device.

An operating-room mapping module may contain a compass and integrated Bluetooth transceiver. Other communication mechanisms, which are not significantly affected by the hospital environment or geographical location, can be employed. Bluetooth Low Energy (BLE) beacon technology may achieve indoor distance measurements with accuracy of about 1-2 meters, with improved accuracy in closer proximities (within 0-6 meters). To improve the accuracy of the distance measurements, a compass is used with the BLE. The operating-room mapping module may the BLE and/or the compass to determine where modules are located in relation to the patient. For example, two modules facing each other (detected by compass) with greater than one meter distance between them may clearly indicate that the modules are on opposite sides of the patient. The more "hub"-enabled modules that reside in the operating room, the greater the achievable accuracy becomes due to triangulation techniques. The operating-room mapping module may be included in the surgical hub 20006 as described herein. The operating-room mapping module may be in operative communication with the surgical hub 20006 as described herein.

The operating-room mapping module may map the physical location of device(s) and/or surgical modules that resides within the operating room. This information could be used by the user interface to display a virtual map of the room, enabling the user to more easily identify which modules are present and enabled, as well as their current status. The mapping data collected by surgical hub 20006 may be analyzed for identifying how an operating room is physically setup, for example.

For example, the surgical hub 20006 may determine a device's location by assessing transmission radio signal strength and direction. For Bluetooth protocols, the Received Signal Strength Indication (RSSI) is a measurement of the received radio signal strength. In one aspect, the devices of the HCP monitoring system 20002 can be equipped with USB Bluetooth dongles. The surgical hub 20006 may scan the USB Bluetooth beacons to get distance information. For example, multiple high-gain antennas on a Bluetooth access point with variable attenuators can produce more accurate results than RSSI measurements. The hub surgical hub 20006 may determine the location of a device by measuring the signal strength from multiple antennas.

The surgical hub 20006 can identify components of the HCP monitoring system 20002 as they are brought into an operating room. For example, the devices of the HCP monitoring system 20002 can be equipped with an identifier recognizable by the surgical hub 20006, such as, for example, a bar code or an RFID tag. NFC can also be employed. The surgical hub 20006 can be equipped with a suitable reader or scanner for detecting the devices brought into the operating room. Details related to Spatial awareness of surgical hubs in operating rooms, can be found in U.S. patent application Ser. No. 15/940,666, titled SPATIAL AWARENESS OF SURGICAL HUBS IN OPERATING ROOMS, filed Mar. 29, 2018, which is herein incorporated by reference in its entirety.

The computing system may be or may include an HCP monitoring system such as the HCP monitoring system 20000, 20002, 20003, or 20004 as described herein with respect to FIGS. 1-3. The computing system may be a computing system operatively connected to the HCP monitoring system(s) 20000, 20002, 20003, and/or 20004. The computing system may be or may include the computing system 20271 described herein with respect to FIG. 9. The computing system may be or may include the computer system 20063 described herein, for example, with respect to FIG. 4. The computing system may be or may include the computer system 20064 described herein, for example, with respect to FIG. 4. The computing system may be or may include the surgical hub 20006 as described herein with respect to FIGS. 1-3, surgical hub system 20060 in FIG. 4, the computer-implemented interactive surgical system 20070, in FIG. 5, the surgical hub or computing device 20243 in FIG. 7, the surgical hub 20270 in FIG. 9, the console 20294 in FIG. 10, and/or the surgical hub 5104 in FIG. 11. For example, the computing system may obtain surgical monitoring data associated with one or more surgical procedures. The surgical procedures may take place in an OR or multiple ORs.

The surgical monitoring data may be obtained via the surgical hubs. For example, a surgical hub may obtain surgical monitoring data from various sensing systems such as the wearable sensing system(s) 20011, and/or environmental sensing system(s) 20015 described herein with respect to FIG. 1. The surgical hub may obtain surgical monitoring data from HCP monitoring devices 35510, environmental monitoring devices 35512, patient monitoring devices 5124, and/or modular devices 5102 as described herein with respect to FIG. 11.

The computing system may obtain the surgical monitoring data from various sensing systems such as the wearable sensing system(s) 20011, and/or environmental sensing system(s) 20015 described herein with respect to FIG. 1. The surgical monitoring data may be obtained from HCP monitoring devices 35510, environmental monitoring devices 35512, patient monitoring devices 5124, and/or modular devices 5102 as described herein with respect to FIG. 11.

The computing system may obtain surgical resource monitoring data associated with multiple surgical procedures, determine surgical resource efficiency based on the surgical resource monitoring data, and generate an output based on the determined surgical resource efficiency. The output may include but not limited to, a control signal for improving efficiency. For example, the computing system may aggregate surgical resource monitoring data associated with multiple surgical procedures and determine the surgical resource efficiency based on the aggregated surgical resource monitoring data.

Systems, methods, and instrumentalities are disclosed for adaptive control of operating room systems based upon monitored data associated with the operating room. Monitoring systems within the operating room may be configured to collect data regarding, for example, the patient being treated in the operating room, the healthcare professionals participating in the surgical procedure, and the environment in the operating room. The collected data, which may be referred to as monitored data, may be communicated to a surgical computing system. The surgical computing system may receive the monitored data and may determine, based upon the monitored data, parameters for controlling various systems associated with the operating room. The surgical computing system may evaluate received monitored data in view of the surgical tasks that are ongoing in the operating room. For example, the relative importance or significance of an ongoing surgical task may be considered by the surgical computing system in determining parameters for control of operating room systems. The surgical computing system may communicate the parameters to the operating room systems. The parameters may be received, for example, at lighting (e.g., ambient and focus) systems, air filtration and extraction systems, smoke evacuation systems, sound systems, video systems, and/or display monitor systems. The systems may modify their operation based upon the received parameters.

A surgical computing system that may evaluate monitored data may include a surgical hub 20002 as described herein with respect to FIG. 2. The surgical computing system may include, for example, a surgical hub 20006 in communication with a cloud computing system 20008 as described in FIG. 2. The cloud computing system 20008 may include at least one remote cloud server 20009 and at least one remote cloud storage unit 20010. The computing system may be or may include an HCP monitoring system such as the HCP monitoring system 20000, 20002, 20003, or 20004 as described herein with respect to FIGS. 1-3. The computing system may be a computing system operatively connected to the HCP monitoring system(s) 20000, 20002, 20003, and/or 20004. The computing system may be or may include the computing system 20271 described herein with respect to FIG. 9. The computing system may be or may include the computer system 20063 described herein, for example, with respect to FIG. 4.

Surgical monitoring data may be obtained via the surgical hubs. For example, a surgical hub may obtain surgical monitoring data from various sensing systems such as the wearable sensing system(s) 20011, and/or environmental sensing system(s) 20015 described herein with respect to FIG. 1. The surgical hub may obtain surgical monitoring data from HCP monitoring devices 35510, environmental monitoring devices 35512, patient monitoring devices 5124, and/or modular devices 5102 as described herein with respect to FIG. 11.

Figure 12:
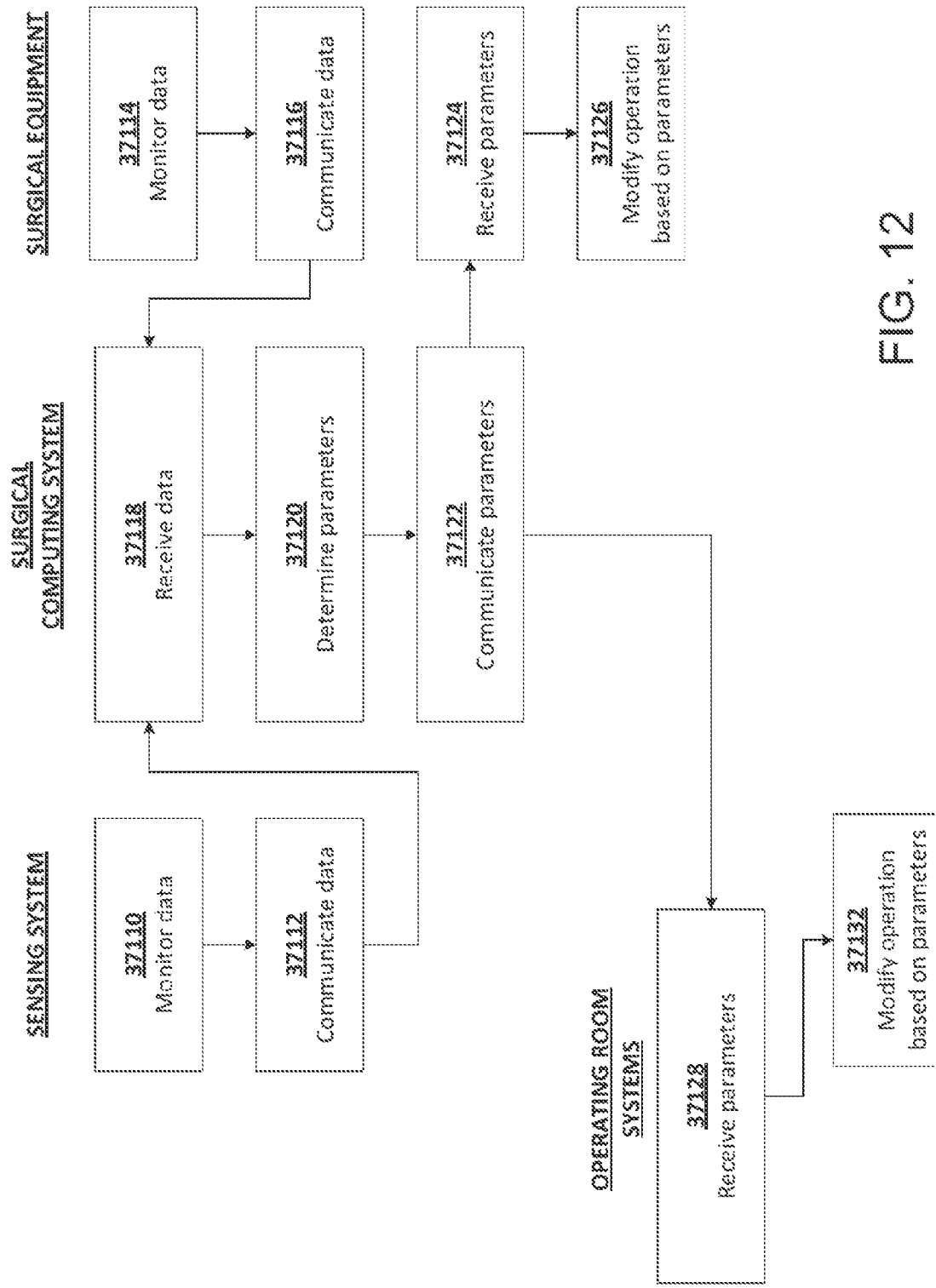
FIG. 12 is a flow diagram of example processing associated with monitoring an operating room and determining parameters.

FIG. 12 illustrates a flow diagram of example processing associated with monitoring an operating room and determining parameters associated operating room systems. As shown, at 37110, an HCP monitoring system, which may be an HCP monitoring system 20002, 20003, or 20004 as described herein with respect to FIGS. 1-3, may monitor data. The HCP monitoring system may monitor data associated with an OR. The monitored data may include data associated with one or more surgical procedures. The surgical procedures may take place in an OR or multiple ORs. The monitored data may include data associated with a HCP, a patient, a surgical instrument, surgical equipment, and/or a surgical device. The surgical device may include a surgical access device. The monitored data may include data associated with positioning.

The HCP monitoring system may include an OR room imaging system. The HCP monitoring system may include one or more sensing systems. The one or more sensing systems may be surgeon sensing systems 20020 as described herein with respect to FIG. 2. The surgeon sensing systems may be worn by HCPs. The surgeon sensing systems may monitor biomarkers associated with the HCPs. The one or more sensing systems may include a patient sensing system. The patient sensing system may be worn by the patient, for example. The patient sensing systems may monitor biomarkers associated with the patient.

The HCP monitoring system may comprise one or more environmental sensing systems for sensing one or more environments such as, for example, the environment in an OR. The environmental sensing systems may comprise one or more environmental sensing systems 20015 such as, for example, those described above in connection with FIGS. 1-10. The environmental sensing system may include a camera, which may be the set of cameras 20021 as described herein in FIG. 2. The environmental sensing system may include a microphone, which may be the set of microphones 20022 as described herein in FIG. 2. The environmental sensing system may include other sensors that may be deployed in the operating room. For example, the environmental sensing systems may include one or more of a camera, a microphone, and other sensors that may be deployed in the operating room. For example, the HCP monitoring system may include one or more OR room imaging systems, surgeon sensing systems, patient sensing systems, or environmental sensing systems.

The HCP monitoring system may include RF systems. The RF systems may be smart and self-identifying. For example, RFID tags may be used. RFID tags may be used to identify HCPs. RFID tags may be used to determine an HCP location. RFID tags may be used to identify a surgical instrument. RFID tags may be used to identify a surgical instrument location.

The HCP monitoring system may monitor data associated with an HCP within an OR. The HCP monitoring system may monitor data associated with an HCP positioning within an OR. The monitored data associated with an HCP positioning may include a location of an HCP within the OR. The monitored data associated with an HCP positioning may include a posture of an HCP. The monitored data associated with an HCP positioning may include a characteristic of an HCP, such as a height, an arm length, a hand shape, a hand length, a waist width, a shoulder width, an age, and the like, for example. The monitored data associated with an HCP positioning may include a head or eye position of an HCP. The head or eye position of an HCP may include an angle of viewing, such as the direction an HCP is looking, for example.

The HCP monitoring system may monitor data associated with a patient within an OR. The HCP monitoring system may monitor data associated with a patient positioning within an OR. The monitored data associated with a patient positioning may include a characteristic of a patient, such as a height, a weight, a waist height, a shoulder height, and the like, for example. The monitored data associated with a patient positioning may include a patient position on a bed in the OR. The monitored data associated with a patient positioning may include a patient location within the OR. The monitored data associated with a patient positioning may include a patient location relative to an HCP location within the OR. The monitored data associated with a patient positioning may include a trocar location.

The HCP monitoring system may monitor data associated with surgical equipment within an OR. The surgical equipment may include surgical instruments, surgical devices, robotic surgical equipment, and the like. The surgical devices may include surgical access devices. The HCP monitoring system may monitor data associated with surgical equipment positioning within the OR. The HCP monitoring system may monitor data associated with an operating table, which may be the operating table 20024 as described herein with respect to FIG. 2. The HCP monitoring system may monitor data associated with surgical tables and/or surgical trays, such as mayo stands, for example. For example, the HCP monitoring system may monitor data associated with movement of surgical instruments.

The HCP monitoring system may monitor data associated with a visual display. The HCP monitoring system may monitor data associated with a surgical display. For example, the monitored data may include data associated with visual display positioning. The data associated with visual display positioning may include a visual display location. The data associated with the visual display positioning may include a visual display angle. The data associated with the visual display positioning may include a visual display location and angle. The monitored data may include a display setting associated with the visual display. The display setting may include one or more of a brightness, color temperature, color contrast, or font associated with the visual display.

The HCP monitoring system may be adapted to perform object detection. The HCP monitoring system may perform object detection to track objects, for example, within an OR. Moving object detection may be performed to recognize the physical movement of a person or an object in a given place or region. By acting segmentation among moving objects and stationary area or region, the moving objects motion could be tracked and thus could be analyzed later. Moving object detection may be performed via background subtraction, frame differencing, temporal differencing, and or optical flow analysis.

The HCP monitoring system may use RF systems to locate HCPs and surgical equipment in the OR. The RF systems may be smart and self-identifying RF systems. HCPs, instruments, equipment, and/or boundaries may be located using spatial identifying sensors. The locations of HCPs, equipment and/or boundaries may be tracked with respect to the room and/or with respect to the patient, via wireless sensors and beacons. RFID tags may be affixed onto instruments and/or HCPs. A surgical instrument or HCP may be associated with a unique RFID identification. Based on the RFID tags, the location of surgical instruments and HCPs may be monitored and/or tracked.

The HCP monitoring system may monitor data associated with an OR before a surgical procedure. The HCP monitoring system may monitor location, movement, and/or orientation of various surgical equipment and HCPs in the OR. For example, a gyroscope or 3 axis accelerometers may be used to determine orientation and position.

The HCP monitoring system may record a surgical procedure, such as a laparoscopic procedure, for example. The HCP monitoring system may record a surgical procedure using a camera and/or a microphone.

At 37112, the HCP monitoring system may communicate the monitored data. The HCP monitoring system may communicate the monitored data to a surgical computing system, which may be, for example, a surgical hub 20006. The monitored data may be continuously gathered and communicated prior to and during a surgical procedure.

As shown at 37114, surgical equipment may monitor data. The surgical equipment may be a surgical instrument 20282 as described in connection with FIG. 10. The surgical instrument 20282 may monitor data, such as user inputs associated with movement and positioning of the surgical instrument, for example. The surgical instrument 20282 may use an acceleration sensor to monitor the movement and positioning of the surgical instrument 20282. The surgical instrument 20282 may monitor the orientation of the surgical instrument 20282. The surgical instrument 20282 may monitor a length of time the surgical instrument 20282 is maintained in a particular positioning.

The surgical equipment may be or comprise a visual display. For example, the surgical equipment may be the primary display 20023 as described in connection with FIG. 2. The primary display 20023 may monitor data, such as positioning, for example.

At 37116, the surgical equipment may communicate the monitored data. The surgical equipment may communicate the monitored data to a surgical computing system, which may be, for example, a surgical hub 20006. The monitored data may be continuously gathered and communicated prior to and during a surgical procedure.

At 37118, the surgical computing system may obtain monitored data which may comprise receiving monitored data. The surgical computing system may receive monitored data from the HCP monitoring system. The surgical computing system may receive monitored data from surgical equipment. The surgical computing system may receive monitored data from the HCP monitoring system and surgical equipment.

At 37120, the surgical computing system may process the received monitored data. The surgical computing system may determine one or more parameters based on the monitored data. The surgical computing system may receive monitored data associated with noise occurring in the operating room. The surgical computing system may determine, based on the monitored data associated with noise in the operating room, one or more parameters for controlling the operation of a display system or display monitor. The parameters may control the display to prioritize particular data on the display.

The surgical computing system may receive monitored data associated with the movements and/or positioning of a healthcare professional. The surgical computing system may determine, based on the monitored data associated with the movements and/or positioning of the healthcare professional, one or more parameters for controlling operation of a lighting system. The parameters may control the lighting system to direct light to an area that is a focus of the healthcare professional.

The surgical computing system may receive monitored data associated with air composition in the operating room. The surgical computing system may determine, based on the monitored data associated with air composition, one or more parameters for one or more air handling systems in the operating room. The parameters may control the air handling systems to adjust air flow, air pressure, and/or air filtration in the operating room.

The surgical computing system may receive monitored data associated with temperature of an individual or space in the operating room. The surgical computing system may determine, based on the monitored data associated with temperature, one or more parameters for one or more temperature control systems. The parameters may control the temperature control system to increase or decrease temperature at a particular location in the operating room.

The surgical computing system may receive monitored data associated with the noise occurring in the operating room. The surgical computing system may determine, based on the monitored data associated with noise in the operating room, a significance of a surgical process being undertaken. The surgical computing system may determine, based the monitored data and the significance of the surgical process being undertaken, one or more parameters for prioritizing display of information on a display.

At 37122, the surgical computing system may communicate the parameters to the appropriate systems associated with the operating room. For example, if the parameters are associated with control of a surgical device or surgical equipment, the parameters are communicated to that device. If the parameters are associated with an operating room system such as, for example, an operating room lighting system, or display system, the parameters are communicated to the appropriate operating room system.

At 37124, a surgical device or surgical equipment may receive parameters from the surgical computing system. The surgical device or surgical equipment may be any that may be controlled to modify operation. For example, the surgical equipment may be a surgical knife, a surgical robot, a surgical table, an operating bed, and the like.

At 37126, surgical equipment may modify its operation consistent with the received parameters. For example, a surgical table may have lighting capacity comprised therein. The received parameters may instruct the surgical table to modify the intensity of the lighting generated by the table. A surgical knife may have a vacuum feature comprised therein. The received parameters may instruction the surgical knife to increase the vacuum operation.

At 37128, an operating room system may receive parameters from the surgical computing system. For example, a lighting system within the operating room may receive parameters associated with modifying lighting in the operating room. An air handling system may receive parameters associated with modifying movement of air in the operating room. A display system may receive parameters associated with modifying the brightness of the display or the warmth of the color used on the display. The display system may be a surgical display and may comprise a monitor.

At 37132, the operating room system may modify its operation consistent with the received parameters. For example, a lighting system may modify lighting intensity consistent with the received parameters. A lighting system may generate a light path to direct movement of a healthcare provider consistent with the parameters. An air handling system may modify the flow of air in the operating room constituent with the received parameters. A display system may modify the brightness of the display or modify the warmth of color used by the display.

A surgical computing system may be configured to monitor for particular surgical events, and to control one or more systems based upon detection that a surgical event has taken place. For example, the surgical computing system may be configured to monitor for particular, e.g., significant or critical, surgical events and, based on the detection of the event, may determine parameters for systems in order to prioritize particular data. The surgical computing system may be configured to monitor operating room noise levels and/or staff movements to identify one or more surgical events and, if the one or more surgical events are identified, determine parameters for controlling one or more systems. For example, the surgical computing system may determine parameters to control systems to control the display of monitored biomarkers and/or video. The parameters may control systems so that particular biomarkers are highlighted or are displayed in a prioritized manner.

Referring back to FIG. 12, in connection with monitoring for occurrence of a surgical event, at 37118, the surgical computing system may be configured to obtain or receive monitored data associated with an operating room. The monitored data may comprise, for example, data associated with noise and/or movement in the operating room. The surgical computing system may receive and evaluate monitored data associated with staff activities and/or urgency of motion to identify patient critical events within the operating room. The surgical computing system may obtain and evaluate monitored data associated with surgeon biomarker data as described, for example, in U.S. patent application Ser. No. 17/156,300 filed Jan. 22, 2021, titled "Situation Adaptable Surgical Instrument Control", the contents of which are hereby incorporated herein by reference in their entirety. The surgical computing system may evaluate the monitored data associated with surgeon biomarker data and may determine based at least in part on the biomarker data that a particular task or event in a surgical procedure has been performed or is being performed.

At 37120, the surgical computing system may determine, based at least in part on the monitored data, one or more parameters for an operating room system such as, for example, a display system. The surgical computing system may determine, based at least in part on the monitored data, that a particular event in a surgical procedure has taken or is taking place in the operating room.

If the surgical computing system determines one or more surgical events has or is taking place, the surgical computing system may determine one or more parameters for one or more operating room systems. For example, the surgical computing system may determine one or more parameters associated with prioritizing display of data such as, for example, biomarker data on the display data. The biomarker data may be associated with, for example, the patient and/or one or more of the healthcare professionals in the operating room.

At 37122, the surgical computing system may communicate the one or more parameters to operating room systems which may include, for example, one or more display systems. At 37128, the parameters may be received at the operating room systems and at 37132 the parameters may be used to modify operation of the systems. For example, the parameters may be used by a display system to modify aspects of a display. Biomarker data associated with the patient may be prioritized on the display system.

The surgical computing system may analyze monitored data associated with staff activities and/or urgency of motion to identify patient critical surgical events and may initiate an identification of monitored biomarkers, surgical video events, etc., that may be a cause of the critical up tick of activity. The surgical computing system may utilize the identification of a particular step in a surgical procedure and/or identification of an issue relative to a patient. The surgical computing system may determine system parameters to prioritize display of associated biomarkers and/or video. The parameters may instruct a display system to include increased focus on a particular surgical site location. The parameters may instruct a display system to increase focus and/or center a camera on the surgical site issue. The parameters may configure one or more systems to display related biomarkers. The parameters may instruct a display system to have their particular video feeds prioritized on a display system. The parameters may instruct a display system to increase a screen size and/or other visibility aspects.

A surgical computing system may be configured to monitor operating room data and may determine, based upon the monitored data, parameters for controlling lighting systems in the operating room. The surgical computing system may receive monitored data associated with one or more healthcare professionals in the operating room. The monitored data may comprise data associated with the focus of a healthcare professional, the location of the healthcare professional, and/or the activity of the healthcare professional. The monitored data may further comprise data relating to the surgical task that is being undertaken. The surgical computing system may determine, based on the monitored data, parameters for controlling or adjusting lighting systems in the operating room. The surgical computing system may generate and communicate parameters to improve operating room lighting and visualization based on the monitored data associated with the healthcare professionals and the surgical tasks being undertaken.

Referring to FIG. 12, at 37118, the surgical computing system may obtain or receive monitored data associated with an operating room. The monitored data may comprise data associated with a healthcare professional in the operating room. The data associated with the healthcare professional may comprise data relating, for example, to the activity, positioning, and/or bio-measurements associated with the healthcare professional. The data associated with the healthcare professional may comprise, for example, data associated with one or more of visual focus, a task being performed, or position associated with the healthcare professional.

At 37120, the surgical computing system may determine, based at least in part on the monitored data, one or more parameters for one or more lighting systems associated with the operating room. If the monitored data comprises data associated with a visual focus of the healthcare professional, the surgical computing system may determine based at least on the data associated with the visual focus, one or more parameters for one or more lighting systems to adjust lighting consistent with the visual focus of the healthcare professional. If the monitored data comprises data associated with a task being performed by the healthcare professional, the surgical computing system may determine based at least on the data associated with the task being performed, one or more parameters for one or more lighting systems to adjust lighting consistent with the task being performed. If the monitored data comprises data associated with location of the healthcare professional, the surgical computing system may determine based at least on the data associated with location of the healthcare professional, one or more parameters for one or more lighting systems to adjust lighting consistent with the location of the healthcare professional. The parameters generated by the surgical computing system may be parameters for one or more lighting systems including, for example, overhead lights, Bovie lights, lights associated with an instrument tray, floor lights, laser lights, and ambient lights.

At 37122, the surgical computing system may communicate the one or more parameters to systems associated with the OR. The surgical computing system may communication one or more parameters, for example, to one or more lighting systems associated with the operating room.

At 37128, one or more systems associated with the operating room may receive the parameters. At 37132, the one or more systems may modify their operations based upon the received parameters. For example, one or more lighting control systems may modify operation consistent with the received parameters. For example, one or more lighting control systems may modify operation to focus light consistent with the visual focus of the healthcare professional, the task being performed, and/or the location of the healthcare professional.

Monitoring systems located in the operating room may track the motions of healthcare professionals including tracking eye motions and locations to determine the focus of attention of a healthcare professional. The surgical computing system may receive monitored data associated with the motions and visual focus and determine parameters to adjust ambient and focal light sources that may enable the healthcare professional to see more easily. The parameters may be directed at modifying the visual display of display monitors to improve visualization. The parameters may modify the white balance and/or contrast of a display monitor. The parameters may be directed to lighting systems within the operating room to improve visualization of the surgical site including the display monitors being used. The parameters may instruct lighting systems to reduce potential glare and/or to lower lighting to improve monitor color and contrast.

The surgical computing system may generate parameters for controlling lighting systems to minimize collisions and tripping hazards. During laparoscopic surgery, the operating room lights may be turned off or minimized, which may result in healthcare professionals other than those performing the surgery working in relative darkness. The lack of lighting may increase the risk of a collision, tripping, and/or selecting the incorrect instrument. The surgical computing system may receive monitored data indicating the status of a surgical procedure and data associated with motion of healthcare professionals in the operating room. The surgical computing system may determine, based on the monitored data, to generate parameters instructing a lighting system to indicate with lighting a path having reduced risk of collision. The parameters may instruct an LED lighting system to illuminate a path for the healthcare professional.

The surgical computing system may generate parameters for controlling lighting systems to facilitate instrument exchange and handling of instruments relative to a Mayo stand. During surgery, an incorrect instrument for a task may inadvertently be retrieved due to poor lighting. Performing surgery in inadequately lighted areas may cause delays or distract focus. The monitoring system may identify and communicate monitored data associated with instruments that are in use as well as the current step in a surgical procedure. The surgical computing system may determine, based on the received monitored data, parameters for an operating room lighting system to provide visual cues to a healthcare professional. The parameters may instruct an LED lighting system to generate light to suggest to the healthcare professional one or more surgical instruments that may be appropriate for a next step. A spotlight, an LED indicator, or some other visual cue may be focused on the appropriate instrument. The surgical computing system may also generate parameters to control one or more lighting systems to indicate a return location for a surgical instrument. The parameters may cause a lighting system to generate an LED indication or spotlight to where an instrument may be placed. The indicated location may be one that is relatively safe to avoid falling to the floor and/or one that is ergonomically efficient for the healthcare professional.

The surgical computing system may generate parameters that control lighting systems in the operating room so as to minimize distraction and saturation of screens and visual imaging.

Human cortisol levels may drop significantly under artificial or poor lighting conditions. Humans may be stressed and have less ability to stabilize energy levels. Exposure to dim light as well as too much artificial light may cause a person to become sleepy and/or to become stressed. The surgical computing system may receive monitored data associated with visual cues of healthcare professionals and may generate parameters for controlling the lighting systems in a manner to increase focus. The parameters may adjust the intensity and/or color temperature of the light to enhance alertness of the healthcare professionals.

Figure 13:
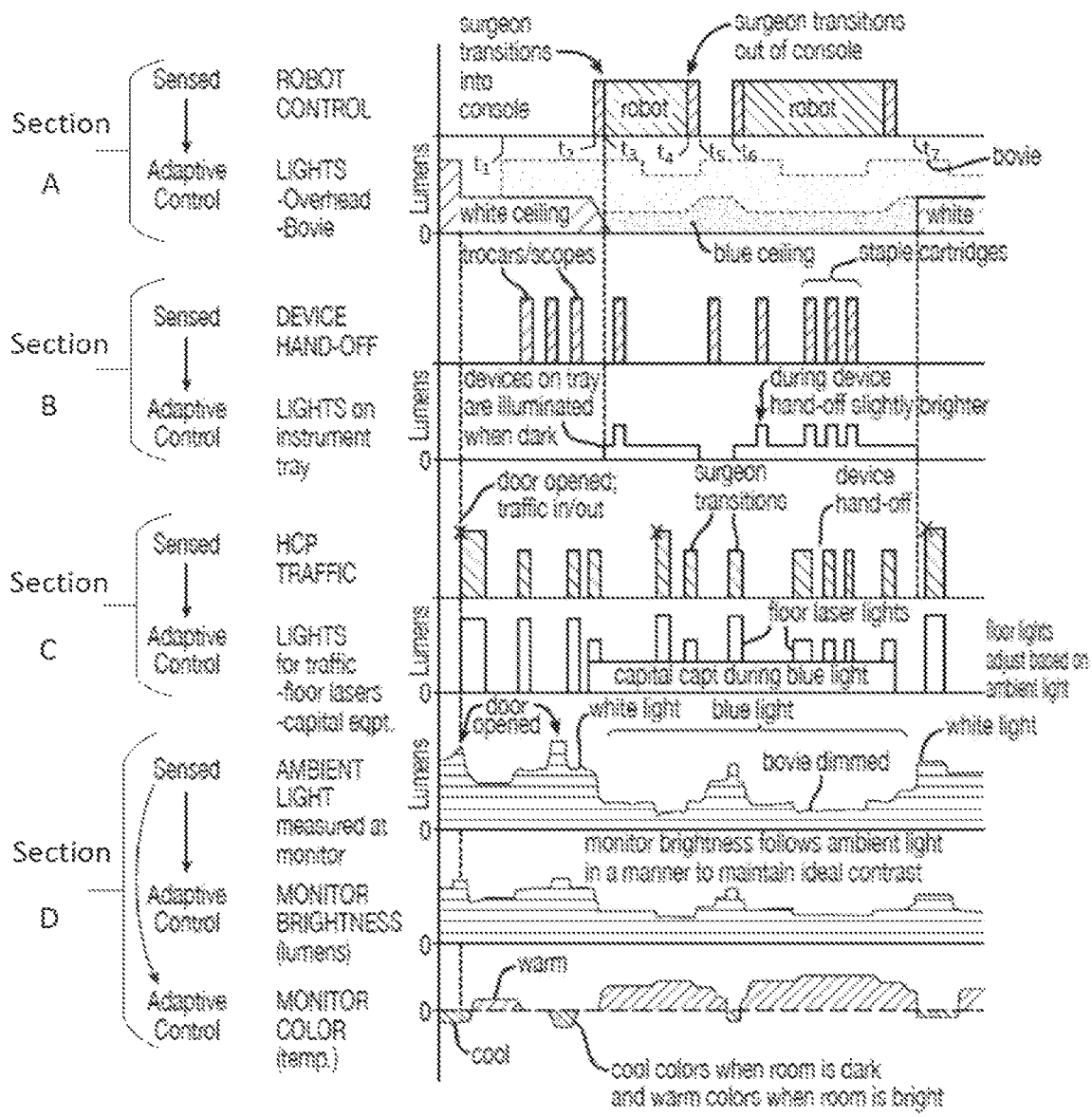
FIG. 13 illustrates example timing charts of example adaptive control of lighting systems based on monitored operating room data.

FIG. 13 depicts example timing charts illustrating example adaptive control of lighting systems based on monitored aspects of the operating room during a surgical procedure. The surgical computing system may receive monitored data associated with the operating room and may generate parameters for controlling lighting systems based on the received monitored data. Referring to FIG. 13, at section A, example adaptive control of lighting systems in response to robotic control activities is depicted. In a top graph portion of section A, use of robotic surgical controls over time is depicted, with time extending from left to right. In the bottom graph portion of section A, operation of lighting systems, which may be measured in lumens, across time and in response to parameters received from the surgical computing system is depicted. As shown in the top graph portion of section A, initially the robotic controls are not in use. During this period of non-use, the overhead lighting system may receive parameters from the surgical computing system that may cause a ceiling lighting system to generate white light. The surgical computing system may receive monitored data indicating a surgical procedure may soon take place. For example, the surgical computing system may receive data indicating movements of healthcare professionals and/or instruments consistent with commencing a surgical procedure. The surgical computing system may generate and communicate parameters to illuminate surgical lighting, which may be referred to as Bovie lighting. In response, and as indicated in the lower graph portion of section A, the surgical lighting or Bovie lighting may commence at time t1 (indicated on the upper graph portion of section A).

As shown in the upper graph in section A, at time t2, the healthcare professional, e.g., surgeon, may transition into a console for controlling a surgical robot. The surgical computing system may receive monitored data indicating the healthcare professional has transitioned into the console. In response, the surgical computing system may generate parameters to control lighting systems in the operating room. For example, the surgical computing system may generate parameters to transition overhead lighting from white ceiling lighting to blue ceiling lighting and to reduce the intensity of the lighting. As shown, at time t3 (indicated on the upper graph portion of section A), the overhead lighting system may reduce intensity, e.g., lumens, and change color to blue. At time t4 (indicated on the upper graph portion of section A), the healthcare professional may begin transitioning out of the robot control console. In response to receiving monitored data indicating a transition out of robot control, the surgical computing system may generate and communicate parameters to the overhead lighting system to increase intensity as illustrated in the lower graph portion of the section A. The surgical computing system may communicate parameters to the Bovie lighting system to increase intensity upon the transition of the healthcare professional out of the robot at time t5 (indicated in the upper graph portion of section A). At time t6 (indicated in the upper graph portion of section A), when the healthcare professional begins to again transition into the robot console, the surgical computing system may generate parameters to modify the overhead and Bovie lighting in a similar manner as previously described.

The surgical computing system may receive monitored data indicating the healthcare professional has again transitioned out of the robot and may have begun other surgical steps. In response to the received monitored data indicating the robotic surgical steps are finished, the surgical computing system may generate and communicate parameters to modify operation of lighting systems in the operating room. The surgical computing system may generate parameters to cause a ceiling lighting system to generate white light as indicated at time t7.

Referring to FIG. 13, at section B, example adaptive control of lighting systems in response to handling of surgical devices in the operating room is depicted. In a top graph portion of section B, hand off of surgical instruments is represented by impulses. As shown, numerous instrument handoffs are performed across time depicted left to right. In the bottom graph portion of section B, operation of lighting systems, which may be measured in lumens, across time and in response to parameters received from the surgical computing system is depicted. In the example of section B, operation of lighting systems associated with an instrument tray is depicted.

As shown in the upper portion of section B, during the period before time t2 (shown in the upper graph of section A) which corresponds to a period before the surgeon enters the robotic surgical control, several handoffs of surgical instruments which may be trocars and/or scopes may take place. During this period before time t2, as noted in section A, white ceiling lighting may be in use in the operating room. Lighting systems associated with the instrument tray may not be needed during the time that white ceiling lighting is employed. At time t3, when as indicated in section A, the healthcare professional begins using the robotic surgery system and the overhead lighting is reduced and takes on a blue tint, the surgical computing device may communicate parameters to lighting systems associated with illuminating an instrument tray as indicated beginning at time t3 in the lower portion of section B. During the period between time t3 and t4, representing the initial period that the surgeon is using the robotic surgical device, the instrument tray is illuminated. When an instrument handoff takes place during this period as indicated by an impulse in the upper portion of section B, the surgical computing system communicates parameters to increase the instrument tray lighting as noted by an impulse in lumens in order to provide additional light during the handling of the surgical instrument. During the period between time t4 and time t5 when the healthcare professional is not using the robot control and the overhead blue lighting is elevated (as noted in the bottom portion of section A), the instrument tray may not be illuminated even in the instance a surgical device handover is made. Beginning at time t6 when the healthcare professional again operates the robotic surgical device, the surgical computing system communicates parameters for the lighting systems to illuminate the surgical tray. When instrument handoffs take place during this period as indicated by impulses in the upper graph in section B, the surgical computing system communicates parameters to the lighting system to increase the intensity of lighting provided to the instrument tray as indicated by the impulses in lumens in the lower graph depicted in section B. After time t7, corresponding to the end of reduced blue ceiling lighting and the reengaging of the white ceiling lighting as depicted in the bottom graph of section A, the lighting systems may cease applying light to the instrument tray.

Referring to FIG. 13, at section C, example adaptive control of lighting systems in response to healthcare professional traffic in the operating room is depicted. In a top graph portion of section C, periods of movement within the operating room associated with healthcare providers are represented by impulses. As shown, numerous movements by healthcare providers occur across time. For example, movements within the operating room may correspond to traffic into and out of the operating room, movement of a surgeon into and out of the position to use the robotic surgical instrument, handing off of surgical instruments, etc. The bottom graph of section C depicts activation of floor lighting systems. The floor lighting systems may comprise, for example, laser or LED lights that direct persons and movements in the operating room, and lights associated with equipment in the operating room such as the surgical table that provide lighting of the floor in the area of the equipment. As shown in section C, when healthcare provider movements and traffic occur, as indicated by impulses shown in the top graph of section C, floor lighting systems are activated as indicated by the corresponding impulses in the bottom graph of section C. The surgical computing system may receive monitored data associated with the movements of the healthcare professionals and may generate and communicate parameters to the floor lighting systems. During the period that blue ceiling lighting is activated during control of the robotic surgical system as indicated in section A, lighting such as, for example, underbed lighting may be activated as noted in the lower graph of section C. The amplitude of the floor lighting may vary at different points in time to adjust for ambient light.

Referring to FIG. 13, at section D, example adaptive control of display monitor features in response to or based on ambient light is depicted. In the top graph of section D, ambient light levels measured near a display monitor are graphed over time. As shown, measured ambient light may vary over time and may reflect activities in the operating room such as, for example, doors opening and closing, adjustments to ceiling lighting systems, implementation of blue lighting during use of robotic surgery, etc. As illustrated, the ambient light at the monitor may be relatively higher when ceiling lighting systems generate white lighting and the ambient light at the monitor may be relatively lower when the blue ceiling lighting may be employed during robotic surgery.

The middle graph of section D depicts the brightness, which may be measured in lumens, that is applied to the display monitor over time. The surgical computing system may control the display monitor brightness in response to the ambient light in the operating room. As illustrated, as the ambient light increases, the brightness of the monitor may be adjusted upward to maintain visibility during periods of increase ambient light. During periods of relatively low ambient light such as may correspond to periods of robotic surgery, the brightness of the monitor may be adjusted downward. The monitor brightness may follow the ambient light in a manner to maintain preferred contrast at the display monitor.

The bottom graph of section D depicts the color that may be employed at the display monitor over time. Values above zero may be referred to as warm colors, while values below zero may be referred to as cool colors. As illustrated, during periods of relatively high ambient light and corresponding relatively high monitor brightness, the monitor display color may be adjusted to a relatively cool temperature. During periods of relatively lower ambient light and correspondingly relatively lower monitor brightness, the monitor display color may be adjusted to a relatively warm temperature. As illustrated, during the period that robotic surgery may be taking place, corresponding to a period of relatively low ambient light, the surgical computing system may communicate parameters to the display monitor to adjust to using warmer colors for display.

A surgical computing system may be configured to monitor operating room data and may determine, based upon the monitored data, to instruct air handling control systems associated with the operating room to modify air flow and/or filtration in the operating room. The surgical computing system may receive monitored data that may be associated with, for example, air quality and/or air particulates in the air in the operating room. The surgical computing system may determine, based on the monitored data, parameters for controlling or adjusting operation of air handling and filtration systems. The parameters may adjust operating room systems that perform surgical insulation, smoke evacuation, and/or air filtration.

Referring to FIG. 12, at 37118, the surgical computing system may obtain or receive monitored data associated with an operating room. The monitored data may comprise data associated with air composition in the operating room. The data associated with air composition in the operating room may comprise data associated with particulates in the air.

At 37120, the surgical computing system may determine, based at least in part on the monitored data, one or more parameters for one or air handling systems in the operating room. The one or more air handling systems may comprise, for example, one or more of an air filtration system, a smoke evaluation system, an air handler system, or an air pressure system. If the monitored data comprises data associated with particulates in the air in the operating room, the surgical computing system may determine one or more parameters for one or more air duct controls to adjust air flow in the operating room. The surgical computing system may determine one or more parameters for one or more air pressure controls to adjust air flow in the operating room. The surgical computing system may determine one or more parameters for one or more smoke evacuation controls to adjust smoke in the operating room.

At 37122, the surgical computing system may communicate the one or more parameters to systems associated with the operating room. The surgical computing system may communicate one or more parameters, for example, to one or more air handling systems associated with the operating room.

At 37128, one or more systems associated with the operating room may receive the parameters. At 37132, the one or more systems may modify their operations based upon the received parameters. For example, one or more air handling systems may increase intensity of operation to evacuate air from a particular portion of the operating room, to increase the volume of air being processed by an air filtration system, and/or to increase pressure of air flow in particular portion of the operating room in response to the received parameters.

The operating room environment has been thought to contribute to surgical site infection rates. The quality of operating room air, disruption of airflow, and other factors may increase contamination risks. Air particulate counts (APCs) may be impacted by increases in foot traffic, opening of doors to the operating room, movement of equipment as well as other activities that may take place in the operating room. These activities have the potential of elevating bacteria spread. A surgical computing system may receive monitored data associated with air particles as well as video or RFID tags and may identify a location of activity in the operating room. The surgical computing system may determine parameters for controlling duct and/or air control valves to alter the flow of air and direct the flow of clean air toward the area of movement. The surgical computing system may monitor video data to identify a piece of equipment is about to be moved and may respond with parameters to impact the flow of air. For example, if a monitor or surgical display is to be moved, the surgical computing system may communicate parameters that cause air handling systems to direct air flow from the direction of the surgeon and/or other staff towards the monitor or surgical display in order to direct air away from the surgical site until monitored data of the air particulates are acceptable. The surgical monitoring system may receive data associated with video and RFID tags and may determine based on the data a staff member is either entering or leaving the operating room. The surgical monitoring system may determine and communicate parameters that cause air handling systems to alter the direction of air flow and/or the velocity of air flow from the direction of the surgeon and/or staff towards the door. The additional flow may direct particulates from the surgical site and may continue until the air particulate monitoring indicates the readings are acceptable.

An operating room environment may have one or more air handling systems that are adapted to generate positive and negative pressure in the operating room to control air flow, control air pressure, and filter air. To counter potential bacteria spread associated with increased traffic, door openings and/or equipment movement, the surgical computing system may determine parameters for controlling an air handling system to create negative air pressure to pull air away from the surgical site until the air particulate monitoring indicates the readings are acceptable.

Surgical smoke evacuation systems may be high-flow vacuum sources that may be used to capture at the surgical site smoke aerosols and gasses that may have been generated during the use of lasers and electrosurgical units. The American Occupational Safety and Health Administration has estimated that 500,000 workers may be exposed to laser and electrosurgical smoke each year. The use of surgical masks alone may not provide adequate protection from surgical smoke. A surgical computing system may receive monitored data associated with particulates in the operating room air and video data may identify when smoke evacuation may be needed. The surgical computing system may determine based upon the monitored data to generate and communicate parameters to one or more smoke evacuation systems to lessen the amount of smoke in the surgical area. The parameters may control a level of operation of a vacuum pump which removes smoke from the surgical area.

A surgical computing system may be configured to monitor operating room data and may determine, based upon the monitored data, to instruct heating and/or cooling control systems associated with the operating room to either lower or increase room temperature. The surgical computing system may receive monitored data that may be associated with, for example, patient and/or healthcare professional's biomarkers. The surgical computing system may determine, based on the monitored data, parameters for controlling the heating and/or cooling systems associated with the operating room. The heating and/or cooling systems may be ambient and/or local control systems. The room temperature control may be based on patient or healthcare professional biomarker tracking.

Referring to FIG. 12, at 37118, the surgical computing system may obtain or receive monitored data associated with the operating room. The monitored data may comprise biomarker data associated with one or more of a patient and/or a healthcare professional located in the operating room. The biomarker data may comprise, for example, data associated with a body temperature associated with one or more of the patient or the healthcare professional.

At 37120, the surgical computing system may determine, based at least in part on the monitored data, one or more parameters for one or more temperature control systems in the operating room. If the monitored data associated with body temperature associated with one or more of the patient or the healthcare professional is determined by the surgical computing system to be below a threshold, the surgical computing system may determine one or more parameters associated with the one or more temperature control systems increasing air temperature. If the monitored data associated with body temperature associated with one or more of the patient or the healthcare professional is determined by the surgical computing system to be above a threshold, the surgical computing system may determine one or more parameters associated with the one or more temperature control systems decreasing air temperature.

At 37122, the surgical computing system may communicate the one or more parameters to systems associated with the operating room. The surgical computing system may communication one or more parameters, for example, to one or more temperature control systems associated with the operating room.

At 37128, one or more systems associated with the operating room may receive the parameters. At 37132, the one or more systems may modify their operations based upon the received parameters. For example, one or more temperature control systems may modify operation to either increase or decrease air temperature consistent with the received parameters.

The surgical computing system may receive biomarker data associated with a patient and/or healthcare provider in the operating room. The surgical computing system may generate parameters for controlling temperature control systems based on monitored data associated with biomarker data for the patient and/or healthcare provider. The surgical computing system may further evaluate criticality of biomarker level, procedure type, and/or procedure step in determining parameters for controlling temperature. The surgical computing system may determine to override what may be considered comfortable or normal room temperature settings as a means for controlling biofunctions critical to surgical procedures. For example, for heart surgery or other circulatory procedures, it may be beneficial to lower the patient heart rate or pain sensitivity by lowering the room temperature to lower than normal in order to slow physiologic functions. In order to offset the hypothermic effects of large volume $CO_2$ insulation usage on room temperature, the surgical computing system may generate parameters to control temperature control systems to create an equilibrium of patient temperature regardless of gas introduction and expulsion.

The surgical computing system may determine and communicate parameters based on the body temperature of healthcare professionals and/or the patient. The surgical computing system may receive data associated with body temperature, e.g., core body temperature, of healthcare professionals and/or the patient. Studies show that high/low temperatures may affect the ability to learn and or function. When temperatures are too hot or too cold, the brain may constantly remind the body to do something about the condition. Due to the constant interruption, it is difficult to stay focused. In addition to being uncomfortable, an individual may be distracted. If a person feels cold, they may use a substantial amount of energy attempting to keep warm. This leaves less energy for concentration, inspiration, and focus. Core body temperature may rise due to physical exertion or stress, both of which may impact performance. Thermal imaging systems and thermometers may be used to gather temperature data for healthcare professionals which may be communicated to the surgical computing system. The surgical computing system may receive the data and may determine parameters for adjusting the volume and/or temperature of the room air and possibly directing air at a particular individual to maintain optimal body temperature.

Human performance may be negatively affected when core body temperatures are not between 36.5 and 37.5 degrees Celsius. A surgeon that has elevated body temperatures may begin sweating which may distract his focus. It may also lead to time delays as sweating may necessitate stopping to wipe away sweat. Sweat may contaminate the site. A sweating surgeon may be more likely to contaminate a surgical field than the non-sweating surgeon. Monitoring physical signs and core temperature and employing monitored data to generate parameters for controlling the environment may mitigate sweating by the surgeon and/or other professionals.

Cold or hot core temperature may lead to shivers or tremors in healthcare professionals. Shaky hands or tremors may impact grasping of instruments which may lead to less control with the surgical site and increased distractions.

The surgical computing system may determine parameters for controlling temperature control systems based on monitored data associated with patient temperature. During and post-surgery, the patient's body temperature may drop, sometimes as much as 6 degrees Fahrenheit. The patient may be only partly covered, may receive cold intravenous fluids, and cold air may be pumped into the patient's lungs. Anesthetics received by a patient may upset the body's ability to regulate its internal body temperature. These factors may increase the metabolic rate and strain the patient's heart. It may also result in pulling apart of incisions, damage delicate surgical repairs, and even result in broken teeth. Accordingly, the surgical computing system may generate, based on monitored data associated with a patient, parameters for controlling temperature proximate the patient.

A surgical computing system may be configured to monitor operating room data and may determine, based upon the monitored data, to implement room conditions associated with a particular healthcare provider who may be participating in an ongoing surgical procedure. The surgical computing system may determine the monitored data indicate or are associated with a particular step, e.g., critical step, of a surgical procedure. If the surgical computing system determines the monitored data indicate a particular step in a surgical procedure is being performed, the surgical computing system may determine parameters for operating room systems associated with preferred room conditions. The surgical computing system may be configured to determine parameters that implement hierarchical priority based adjustments to equipment based on situational awareness and importance of a step in a surgical procedure.

Referring to FIG. 12, at 37118, the surgical computing system may receive monitored data associated with the operating room. The monitored data may comprise data associated with a step in a surgical procedure being performed in the operating room.

The surgical computing system may be configured to determine parameters associated with a healthcare professional who is participating in the surgical procedure being performed in the operating room. At 37120, the surgical computing system may determine, based at least in part on the monitored data and operational parameters associated with a healthcare professional participating the surgical procedure, one or more parameters for one or more systems in the operating room. The parameters associated with the healthcare professional may comprise parameters associated with preferences for the operating room. The received monitored data may be associated with a step in the surgical procedure. The surgical computing system may determine, based on the parameters associated with preferences for the operating room and the data associated with the step in the surgical procedure, one or more parameters associated with adjustments to the systems in the operating room. The one or more parameters associated with adjustments to the systems in the operating room may comprise parameters associated with increasing volume of speech associated with the healthcare professional. The one or more parameters associated with adjustments to the systems in the operating room may comprise parameters associated with increasing noise cancellation in the operating room. The one or more parameters associated with adjustments to the systems in the operating room may comprise parameters associated with augmenting audible cues associated with the surgical procedure.

At 37122, the surgical computing system may communicate the one or more parameters to systems associated with the operating room. The surgical computing system may communicate the one or more parameters, for example, to one or more audio/visual system associated with the operating room.

At 37128, one or more systems associated with the OR may receive the parameters. At 37132, the one or more systems may modify their operations based upon the received parameters. For example, one or more audio/visual systems may modify operation to increase or decrease volume of speech reproduction, increase or decrease noise cancellation, and/or augment audible cues.

The surgical computing system may determine, based on the received monitored data, parameters for operating room systems and associated with augmenting or increasing speech or volume for particular healthcare providers in the operating room. The surgical computing system may determine, based on the received monitored data, parameters for operating room systems and associated with adjustable segmented active noise cancellation. The surgical computing system, in determining the parameters, may balance noise cancellation with interactive activity associated with a surgical procedure. The surgical computing system may generate parameters associated with quadrant noise cancellation which may apply for an audio system with speakers that are split within four quadrants of a room. The surgical computing system may determine parameters that causes the audio system to direct anti-noise in a particular quadrant and direct audio into a separate quadrant. The surgical computing system may generate parameters for an operating room audio system comprising speakers that follow a healthcare professional in the operating room. The surgical computing system may determine parameters for such an audio system whereby the parameters control the speakers to direct audio to particular healthcare professionals. Directing audio to particular individuals assists healthcare professionals in maintaining focus on a task or job while avoiding distractions or interruptions.

The surgical computing system may determine, based on the received monitored data, parameters that result in restricting operating room entry or movement within the operating room. For example, the surgical computing system may determine parameters for systems that open and control doors to the operating room.

The surgical computing system may determine, based on the received monitored data, parameters that result in quieting extraneous sounds. For example, the surgical computing system may determine parameters to reduce volume on audio systems and silence phone calls.

An operating room may make use of augmented reality systems such as, for example, systems and implementations described in U.S. patent application Ser. No. 17/156,329 filed on Jan. 22, 2021 and titled "Audio Augmented Reality Cues to Focus on Audible Information", the contents of which are hereby incorporated herein by reference in their entirety. The surgical computing system may be configured to determine parameters for an augmented reality system to control and moderate audible reality cues to center focus on key audible feedback.

The surgical computing system may be configured to determine parameters for control of operating room systems based on awareness of the step being performed in a surgical procedure, situational awareness of the task, and the surrounding monitored environmental cues, where the parameters are selected to adjust operation of systems to be consistent with a healthcare professional's preferences. For example, as the surgical computing system determines the monitored data indicates particular surgical tasks are being performed and indicate an ambient audible level is above a threshold, the surgical computing system may determine parameters to adjust systems within the operating room lower the noise level based on a prioritized or criticality list of the equipment and their associated contributions to the elevated levels.

A surgical computing system may be configured to monitor OR data and, based upon the monitored data, may determine to generate parameters associated with the environmental control devices. The surgical computing system may determine to generate parameters associated with adjusting, for example, one or more of the intensity, duration, and/or rapidity of operation of environmental control devices. For example, the surgical computing system may determine to generate parameters associated with the intensity that an air flow control system may operate. The surgical computing system may apply thresholds to considering the monitored data and may adjust the thresholds that the surgical computing system may apply over time based on the importance of the measure to the patient or a healthcare professional.

Referring to FIG. 12, at 37118, the surgical computing system may obtain or receive monitored data associated with an operating room. The monitored data may be associated, for example, with air-born particles in the OR. The monitored data may comprise data associated with an occurrence of exhaling by an infectious patient. The monitored data may comprise data associated with an occurrence of an exhaust or smoke plume associated with a cancerous patient.

At 37120, the surgical computing system may determine, based on the monitored data, a risk level to a healthcare professional in the OR. The surgical computing system may determine based on monitored data associated with air-born particles in the OR that the risk level is an elevated risk level. The surgical computing system may determine, based on one or more determine risk levels, one or more parameters for operating one or more systems in the OR. If the surgical computing system determines that the monitored data indicates an elevated risk, the surgical computing system may determine one or more parameters for an air filtration system associated with the OR. The parameters may be associated with increasing the intensity of operation of the air filtration system.

At 37122, the surgical computing system may communicate the one or more parameters to systems associated with the OR. The surgical computing system may communication one or more parameters, for example, to one or more air handling systems associated with the OR.

At 37128, one or more systems associated with the OR may receive the parameters. At 37132, the one or more systems may modify their operations based upon the received parameters. For example, one or more air handling systems may increase intensity of operation to evacuate air from a particular portion of the OR in response to the received parameters.

A surgeon performing a surgical procedure may use an advanced energy device on near cancerous tissue which may create a relatively large smoke plume. Monitoring data associated with the air plume may be received at the surgical computing system which may determine, based on the received data associated with the plume, to modify the rate of smoke or air evacuation, increase the efficiency of the filtration system, and/or increase room filtration. The surgical computing system may communicate parameters associated with the modified operations to the corresponding air and filtration systems in the OR.

An anesthesiologist or bronchologist may introduce a ventilation tube to a patient who is known to be infectious. The patient may sneeze or otherwise exhale. Monitoring data associated with the sneezing and/or the placement of the ventilation tube may be received at the surgical computing system. The surgical computing system may detect a cough or sneeze by the patient based on monitored biomarkers of the patient and/or may receive data indicating a level of danger associated with infective droplets. The surgical computing system may determine, based on the detected cough or sneeze as indicated by the monitored data, to increase the speed and/or capacity of one or more filtration and/or extractions systems. The surgical computing system may determine to rapidly increase the intake and filtration due to a detected particle count and anticipating the increase in particles in route and the potential impact of failure to catch the particles. The surgical computing system may determine parameters associated with modifying the operation of the air handling systems and communicate those parameters to the systems.

Accordingly, systems, methods, and instrumentalities are disclosed for adaptive control of operating room systems based upon monitored data associated with the operating room. Monitoring systems within the operating room may be configured to collect data regarding, for example, the patient being treated in the operating room, the healthcare professionals participating in the surgical procedure, and the environment in the operating room. The monitored data may be communicated to a surgical computing system. The surgical computing system may receive the monitored data and may determine, based upon the monitored data, parameters for controlling various systems associated with the operating room. The surgical computing system may evaluate received monitored data in view of the surgical tasks that are ongoing in the operating room. The surgical computing system may communicate the parameters to the operating room systems. The parameters may be received, for example, at lighting (e.g., ambient and focus) systems, air filtration and extraction systems, smoke evacuation systems, sound systems, video systems, and/or display monitor systems. The systems may modify their operation based upon the received parameters.

The computing system may monitor healthcare professionals (HCPs) in an operating room (OR) and provide parameters associated with improving performance for surgical procedure(s) and/or maintenance of operating room(s). The parameters associated with improving performance for surgical procedure(s) and/or maintenance of operating room(s) may be included in recommendations, adjustments, and/or feedback. The parameters may be associated with movement of HCPs, activities of surgical staff members, equipment location and/or usage, and/or the like.

For example, the computing system may monitor HCP motion, interactions, and movement within the OR and generate parameters and/or recommendations to improve the performance of surgical procedures and/or maintenance of ORs. The motions, interactions, and movement of the HCPs monitored throughout surgical procedure(s) may be analyzed. Improvements for OR layout, surgical instrument mix, and/or surgical site access may be identified, for example, to improve efficiency of motion and/or performance of the surgical procedure.

The computing system may obtain and analyze surgical monitoring data associated with a surgical procedure. The surgical monitoring data may include the activities of HCPs, equipment location, equipment usage, downtime and/or wait times, and/or the like associated with a surgical procedure. The computing system may, based on the analysis, for example, generate one or more adjustment parameters. The adjustment parameters may improve performance associated with a surgical procedure, for example, such as unnecessary staffing members of HCPs for the surgical procedure. The adjustment parameters may include one or more of surgical instrument mix selection, surgical site access location, OR layout, HCP staffing for a surgical procedure and/or procedural step, surgical equipment placement, surgical instrument usage, HCP positioning, surgical instrument preparation, audio and/or display outputs, and/or the like.

For example, the computing system may receive monitored data associated with an OR and/or surgical procedure. The monitored data may include data associated with one or more of OR layout, HCP positioning, HCP movement, surgical equipment location, surgical instrument mix, surgical site access locations, HCP staffing, trocar placement, HCP activities, HCP behavior and/or emotions, and/or the like.

The computing system may obtain a surgical procedure plan. The procedure plan may include steps for a surgical procedure, staffing, OR layout, surgical instrument mix, and/or the like. The computing system may determine procedure data associated with a surgical procedure (e.g., ongoing surgical procedure, an upcoming surgical procedure, and/or a past procedure). The surgical computing system may determine procedure data using a situationally aware surgical system. The surgical computing system may include a situationally aware surgical system 5100 as described herein with respect to FIG. 11. The surgical computing system may derive or infer information related to the surgical procedure, for example, based on the monitored data. The procedure data may include data associated with consistency of HCP actions relative to the procedure plan, for example, such as whether steps of a procedure plan have been performed and/or have been performed timely. For example, the surgical computing system may determine the current procedural step in a surgical procedure based on monitored data.

The surgical computing system may determine one or more adjustment parameters associated with improving performance of a surgical procedure and/or maintenance of the OR, for example, based on the monitored data, procedure plan, and/or procedure data. The adjustment parameter(s) may include adjustments to one or more of OR layout, HCP positioning, HCP movement, surgical equipment positioning, surgical instrument positioning, surgical site access positioning, HCP activities, HCP staffing, surgical instrument usage, and/or the like. The surgical computing system may send an indication of the adjustment parameter(s). The computing system may communicate the adjustment parameter(s) to one or more systems associated with the OR. For example, the computing system may communicate the adjustment parameter(s) to a system configured to control communication system(s) in the OR. The communication system may include a surgical display or speaker system. For example, the surgical display may present the adjustment parameter(s).

The computing system (e.g., a surgical computing system) may include a surgical hub 20002 as described herein with respect to FIG. 2. For example, the surgical computing system may include at least one of the following: a surgical hub 20006 in communication with a cloud computing system 20008, for example, as described in FIG. 2. The surgical computing system may include at least one of the following: a surgical hub 20006 or a computing device 20016 in communication with a could computing system 20008. The cloud computing system 20008 may include at least one remote cloud server 20009 and at least one remote cloud storage unit 20010. The computing system may be or may include an HCP monitoring system such as the HCP monitoring system 20000, 20002, 20003, or 20004 as described herein with respect to FIGS. 1-3. The computing system may be a computing system operatively connected to the HCP monitoring system(s) 20000, 20002, 20003, and/or 20004. The computing system may be or may include the computing system 20271 described herein with respect to FIG. 9. The computing system may be or may include the computer system 20063 described herein, for example, with respect to FIG. 4.

The surgical monitoring data may be obtained via the surgical hubs. For example, a surgical hub may obtain surgical monitoring data from various sensing systems such as the wearable sensing system(s) 20011, and/or environmental sensing system(s) 20015 described herein with respect to FIG. 1. The surgical hub may obtain monitored data from HCP monitoring devices 35510, environmental monitoring devices 35512, patient monitoring devices 5124, and/or modular devices 5102 as described herein with respect to FIG. 11.

Figure 14:
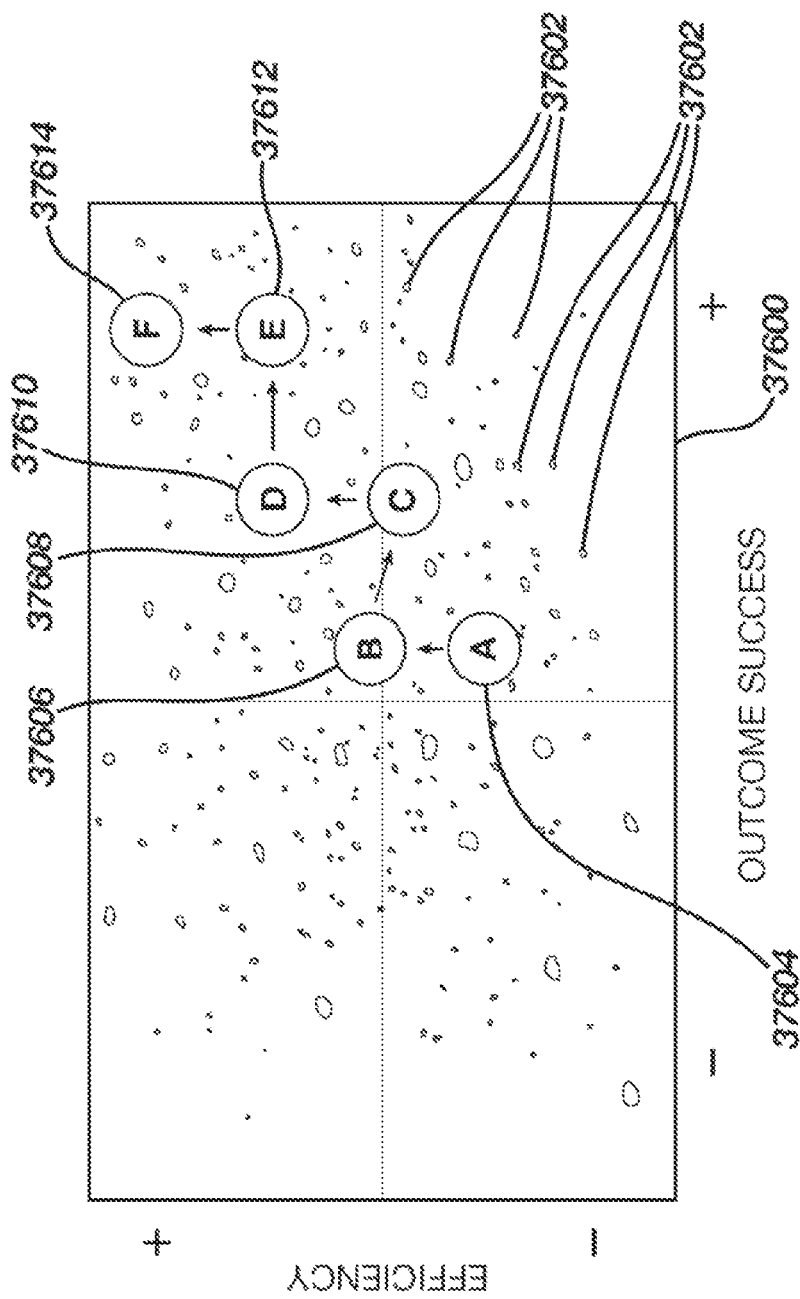
FIG. 14 illustrates an example graph of performed surgical procedures plotted based on outcome success and efficiency.

FIG. 14 illustrates an example analysis associated with surgical procedures. Surgical procedures may be plotted on a graph 37600 based on outcome success and efficiency. Data collected and analyzed from previous procedures 37602 may be plotted based on outcome success and efficiency. For example, the computing system may determine outcome success and efficiency of the surgical procedures based on monitored data, surgical procedure plan, and/or surgical procedure data. Outcome success may be determined based on whether a surgical procedure was successful, whether surgical complications occurred, and/or the like. Efficiency may be determined based on duration of the surgical procedure, number of HCPs present for the surgical procedure, number of instruments used for a surgical procedure, and/or the like.

As shown in FIG. 14, a surgical procedure may be plotted based on the outcome success and efficiency. The surgical computing system may determine adjustment parameters that may improve efficiency for a surgical procedure, for example, such as an improved OR layout and/or instrument mix. As shown at 37604, the surgical computing system may indicate on graph 37600 the improved efficiency associated with the determined adjustment parameters.

The surgical computing system may determine adjustment parameters that may improve efficiency for surgical procedure 37604, for example, such as improved movement of people and/or instruments. As shown at 37606, the surgical computing system may indicate on graph 37600 the improved efficiency (e.g., over surgical procedure 37604) associated with the determined adjustment parameters.

The surgical computing system may determine adjustment parameters that may improve outcome success for surgical procedure 37606, for example, such as reduction in door and/or air movements and traffic. As shown at 37608, the surgical computing system may indicate on graph 37600 the improved outcome success (e.g., over surgical procedure 37606) associated with the determined adjustment parameters.

The surgical computing system may determine adjustment parameters that may improve efficiency for surgical procedure 37608, for example, such as improved trocar tracking, angle, location, exchanges, and the like. As shown at 37610, the surgical computing system may indicate on graph 37600 the improved efficiency (e.g., over surgical procedure 37608) associated with the determined adjustment parameters.

The surgical computing system may determine adjustment parameters that may improve outcome success for surgical procedure 37610, for example, such as indications or notifications to avoid missed procedural steps based on tracking the OR. As shown at 37612, the surgical computing system may indicate on graph 37600 the improved outcome success (e.g., over surgical procedure 37610) associated with the determined adjustment parameters.

The surgical computing system may determine adjustment parameters that may improve efficiency for surgical procedure 37612, for example, such as improved instrument mix and/or instrument utilization based on monitoring data. As shown at 37614, the surgical computing system may indicate on graph 37600 the improved outcome success (e.g., over surgical procedure 37612) associated with the determined adjustment parameters.

In an example, the surgical computing system may receive monitored data associated with the current surgical procedure. Based on the monitored data, the surgical computing system may determine adjustment parameters for the current surgical procedure, for example, that may improve the efficiency and/or outcome success. For example, the surgical computing system may determine adjustment parameters, which may include one or more of modifying an OR layout, modifying an instrument mix, reducing movement of people, reducing movement of surgical instruments, reducing door/air movements and traffic, modifying trocar tracking, angle, location, and exchanges, notifying staff to avoid missed procedural steps, adjusting surgical instrument mix, adjusting surgical instrument utilization, and/or the like.

The computing system may generate an adjusted OR layout based on the monitor data, the procedure plan, and/or the procedure data.

Figure 15:
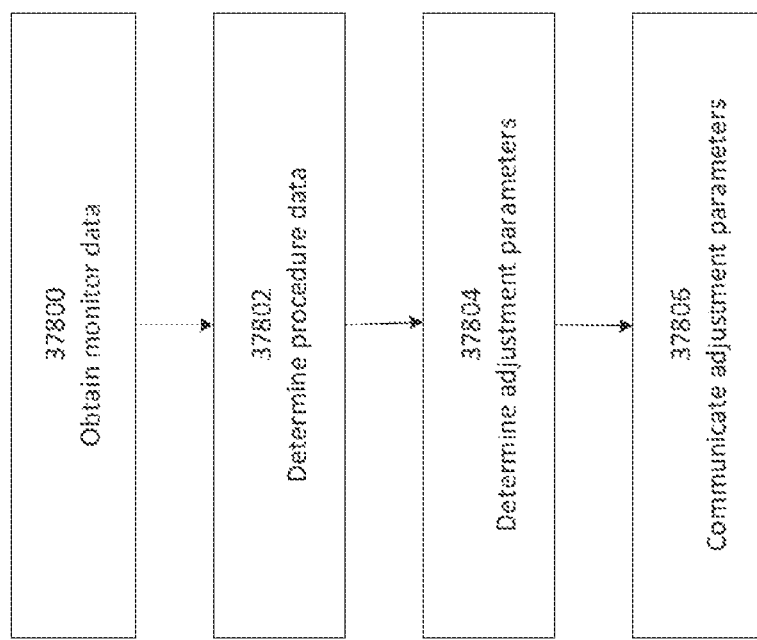
FIG. 15 illustrates example processing associated with monitoring an operating room and determining parameters associated with improving performance of surgical procedure(s) and/or maintenance of the OR FIG. 16 illustrates an example OR layout and HCP activity during a surgical procedure.

FIG. 15 illustrates example processing associated with monitoring an OR and determining parameters associated with improving performance of surgical procedure(s) and/or maintenance of the OR. As shown, at 37800, monitored data may be obtained. Surgical data may be monitored by a monitoring system, a surgical computing system, a surveillance system, and/or the like. For example, the monitoring system may include an HCP monitoring system 20002, 20003, or 20004 as described herein with respect to FIGS. 1-3. The monitoring system may be included in the surgical computing system. The monitoring system may monitor data associated with an OR. The monitored data may include data associated with one or more surgical procedures. The surgical procedures may take place in an OR or multiple ORs. The monitored data may include data associated with HCP, the patient, surgical instruments, surgical equipment, and/or surgical devices. The monitored data may include data associated with positioning. The monitoring system may monitor data associated with the surgical procedure, such as, for example, surgical access location(s) and/or trocar placement(s). The monitored data may be continuously gathered and communicated prior to, during, and/or after a surgical procedure.

The monitoring system may include an OR room imaging system. The monitoring system may include one or more sensing systems, for example, such as the surgeon sensing systems 20020 as described herein with respect to FIG. 2. The surgeon sensing systems may be worn by HCPs. The surgeon sensing systems may monitor biomarkers associated with the HCPs. The sensing system(s) may include a patient sensing system. The patient sensing system may be worn by the patient, for example. The patient sensing systems may monitor biomarkers associated with the patient.

An environment, such as the environment in an OR, may be monitored. The one or more sensing systems may include an environmental sensing system. The environmental sensing system may include a camera, which may be the set of cameras 20021 as described herein in FIG. 2. The environmental sensing system may include a microphone, which may be the set of microphones 20022 as described herein in FIG. 2. The environmental sensing system may include other sensors that may be deployed in the operating room. For example, the environmental sensing system may include camera(s), microphone(s), and/or other sensors that may be deployed in the OR. For example, the monitoring system may include OR room imaging systems, surgeon sensing systems, patient sensing systems, and/or environmental sensing systems. For example, the monitoring system may include RF systems. The RF systems may be smart and self-identifying. For example, RFID tags may be used. RFID tags may be used to identify HCPs. RFID tags may be used to determine an HCP location. RFID tags may be used to identify a surgical instrument. RFID tags may be used to identify a surgical instrument location.

The monitoring system may monitor data associated with HCPs within an OR. The HCP monitored data may include data associated with HCP motions and movement, positioning, activities, emotions, staffing, biomarkers and/or the like. For example, the HCP monitored data associated with HCP motions and movement may include peripheral movement of the body, such as the HCP(s) arms and torso, and/or gross movement throughout the OR. The monitored HCP data associated with gross movement throughout the OR may include movement around the OR and/or entering or exiting an OR. For example, the HCP monitored data associated with HCP activities may include HCP activity intensity and/or activities performed. For example, the HCP monitored data associated with HCP emotions may include emotional behaviors in an OR, such as HCP expressions and/or HCP interactions. For example, the HCP monitored data associated with staffing may include the number of HCPs and/or surgical staff within an OR for a surgical procedure and/or procedural step. The HCP monitored data may include data associated with the flow of product and activities throughout the surgical procedure.

The HCP monitoring system may monitor data associated with an HCP within the OR. The HCP monitoring system may monitor data associated with the HCP's positioning within the OR. The monitored data associated with HCP positioning may include the location of the HCP within the OR. The monitored data associated with HCP positioning may include the posture of the HCP. The monitored data associated with HCP positioning may include characteristic(s) of the HCP, such as height, arm length, hand shape, hand length, waist width, shoulder width, age, and/or the like, for example. The monitored data associated with HCP positioning may include head or eye position of the HCP. The head or eye position of the HCP may include angle(s) of viewing, such as the direction the HCP is looking, for example.

The HCP monitoring system may monitor data associated with a patient, such as patient positioning within the OR. The monitored data associated with patient positioning may include characteristic(s) of the patient, such as height, weight, waist height, shoulder height, and/or the like, for example. The monitored patient positioning data may include the patient's position on a bed in the OR. The monitored patient positioning data may include the patient's location within the OR. The monitored patient positioning data include the patient's location relative to an HCP's location within the OR. The monitored patient positioning data may include the location of a trocar place on the patient.

The HCP monitoring system may monitor data associated with surgical equipment within the OR. The surgical equipment may include surgical instruments, surgical devices, robotic surgical equipment, and/or the like. The surgical devices may include surgical access device(s). The HCP monitoring system may monitor data associated with surgical equipment positioning within the OR. The HCP monitoring system may monitor data associated with an operating table, such as the operating table 20024 as described herein with respect to FIG. 2. The HCP monitoring system may monitor data associated with surgical tables and/or surgical trays, such as mayo stands, for example. For example, the HCP monitoring system may monitor data associated with movement of surgical instruments.

The HCP monitoring system may monitor data associated with a visual display, such as a surgical display. For example, the monitored data may include data associated with visual display positioning. The visual display positioning data may include visual display location and/or visual display angle. The monitored visual display positioning data may include display setting(s) associated with the visual display, such as one or more of brightness, color temperature, color contrast, and/or font associated with the visual display.

For example, the HCP monitoring system may perform object detection. The HCP monitoring system may perform object detection to track objects, for example, within an OR. Moving object detection may be performed to recognize the physical movement of a person or an object in a given place or region. By acting segmentation among moving objects and stationary area or region, the moving objects motion could be tracked and thus could be analyzed later. Moving object detection may be performed via background subtraction, frame differencing, temporal differencing, and/or optical flow analysis.

For example, the HCP monitoring system may use RF systems to locate HCPs and surgical equipment in the OR. The RF systems may be smart and self-identifying RF systems. HCPs, instruments, equipment, and/or boundaries may be located using spatial identifying sensors. The locations of HCPs, equipment and/or boundaries may be tracked with respect to the room and/or with respect to the patient, via wireless sensors and beacons. RFID tags may be affixed onto instruments and/or HCPs. A surgical instrument or HCP may be associated with a unique RFID identification. Based on the RFID tags, the location of surgical instruments and HCPs may be monitored and/or tracked.

For example, the HCP monitoring system may monitor data associated with an OR before a surgical procedure. The HCP monitoring system may monitor location, movement, and/or orientation of various surgical equipment and HCPs in the OR. For example, a gyroscope or 3 axis accelerometers may be used to determine orientation and position.

For example, the HCP monitoring system may record a surgical procedure, such as a laparoscopic procedure, for example. The HCP monitoring system may record a surgical procedure using camera(s) and/or microphone(s).

The monitoring system may monitor data associated with the OR layout. For example, the OR layout monitored data may include data associated with surgical equipment, surgical instrument, HCP station(s), camera(s), display(s), and/or the like.

For example, the OR layout monitored data may include data associated with surgical equipment, such as positioning data. Surgical equipment positioning data may include surgical table positioning, operating bed positioning, camera positioning, display positioning, and/or the like. The operating bed may be the operating table 20024 as described herein with respect to FIG. 2. The OR layout monitored data associated with surgical instrument positioning may include the mix of surgical instruments located in the OR, which may include replacement surgical instruments.

For example, the OR layout monitored data may include data associated with surgical instrument(s). Data associated with surgical instruments may include surgical instrument mix, surgical instrument replacements, surgical instrument positioning, surgical instrument exchanges, surgical instrument usage, and/or the like. For example, surgical instrument mix may be the types and/or number of surgical instruments available for use in the OR and/or for a surgical procedure. For example, surgical instrument positioning may include the location of the surgical instruments within the OR. Surgical instrument positioning may include the orientation of the surgical instrument, for example, during use. For example, surgical instrument exchanges may be monitored, such as the handing off of surgical instruments between HCPs. In examples, the number of surgical instrument handoffs between HCPs may be monitored. For example, a surgical instrument usage may be monitored, such as the duration of use. Surgical instrument readiness may be monitored. For example, surgical instrument readiness may include whether the surgical instrument is within the OR for use and/or prepared for use (e.g., removed from packaging, sterilized).

Figure 16:
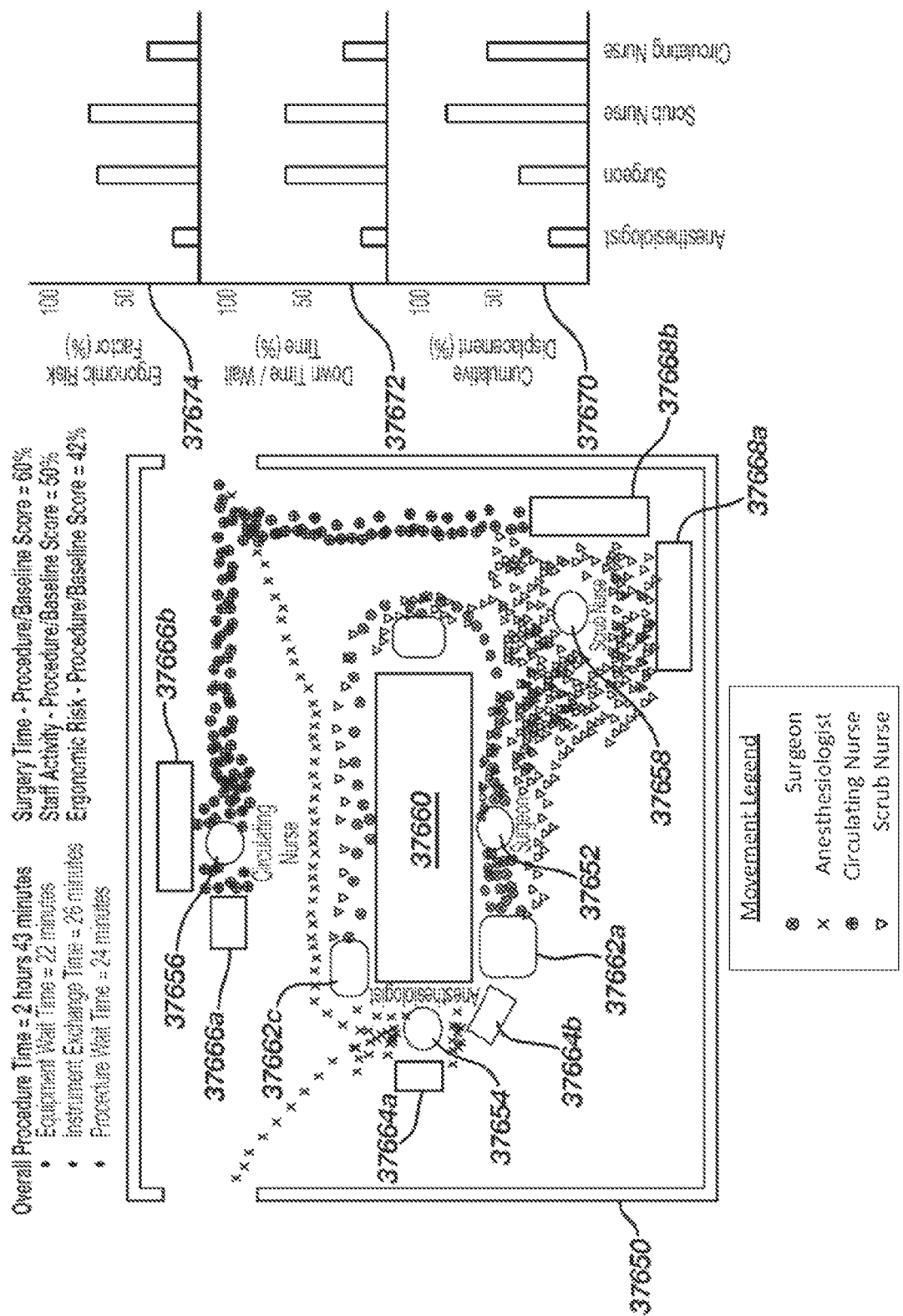

FIG. 16 shows an example OR layout and HCP activity during surgical procedure that may be generated based on the monitored data. As shown in FIG. 16, the OR 37650 may include HCPs, surgical equipment, and/or the like. The HCPs in OR 37650 may include a surgeon 37652, anesthesiologist 37654, circulating nurse 37656, and/or scrub nurse 37658. The OR 37650 may include surgical equipment such as an operating table 37660 and/or HCP equipment tables. The HCP equipment tables may include surgeon equipment table(s) 37662*a*, 37662*b*, and 37662*c*, anesthesiologist equipment table(s) 37664*a* and 37664*b*, circulating nurse equipment table(s) 37666*a* and 37666*b*, and/or scrub nurse equipment table(s) 37668*a* and 37668*b*.

The computing system may obtain HCP gross movement data throughout the surgery, for example, as shown in FIG. 16. During a surgical procedure, the HCPs may travel between equipment stations and the surgical access site, which may be on the patient on the operating table 37660, for example. As shown at 37670, the cumulative displacement for the HCPs during the procedure may be calculated based on the monitored data. The cumulative displacement graph 37670 may illustrate the total gross movement of HCPs throughout the procedure. The computing system may determine downtime and/or wait times during a surgical procedure based on monitored data. Downtime and/or wait times may be experienced, for example, if the HCPs are delayed waiting on test results. For example, delays may be experienced based on pathology wait times checking biopsies and/or margins to determine whether resection is required in a procedure. For example, downtime and/or wait times may be experienced based on equipment failure. For example, the surgical computing system may determine downtime and/or wait times based on delays inconsistent with the surgical procedure plan. For example, as shown at 37672, downtime and/or wait times may be indicated for the HCPs during the surgical procedure. The downtime and/or wait time may be indicated, for example, based on one or more of equipment wait time, procedure wait time, delay time, and/or the like. Graph 37674 shows the calculated ergonomic risk factor for the HCPs during a surgical procedure. The monitored data may include data associated with HCP positioning. The computing system may determine ergonomic risk based on the data associated with HCP positioning. For example, the computing system may calculate a high ergonomic risk factor where the monitored data indicated awkward HCP positioning.

A procedure plan for a surgical procedure may be obtained. The surgical procedure plan may include details associated with the surgical procedure, such as, for example, recommendations for steps for the surgical procedure, instrument mix, number of HCPs for the procedure, duration for the procedure and/or procedure steps, surgical access locations, trocar placements, and/or the like.

Monitored data may be obtained (e.g., received, generated, or the like), for example, by the surgical computing system (e.g., as shown at 37800 in FIG. 15). Monitored data from previous surgical procedure(s) may be obtained. The previous surgical procedure(s) monitored data may include data associated with instrument mix, surgical site access locations, OR layout, staffing, trocar placement, and/or the like, from the previous surgical procedure(s).

Referring back to FIG. 15, at 37802, the surgical computing system may determine procedure data. The procedure data may be associated with the surgical procedure plan. For example, the surgical computing system may determine procedure data such as the duration of the surgical procedure and/or procedure steps, procedure steps performed, inactivity and/or downtime during the procedure, and/or the like. For example, the surgical computing system may determine whether the HCP(s) have acted consistent with the surgical procedure plan based on one or more of the monitored data, surgical procedure data, and/or surgical procedure plan. For example, the surgical computing system may determine that a procedure step was skipped. For example, the surgical computing system may determine that a procedure step was performed untimely. For example, the surgical computing system may determine that a procedure step was performed improperly. For example, the surgical computing system may determine that a procedure step was repeated.

At 37804, adjustment parameter(s) may be determined. The surgical computing system may determine adjustment parameter(s), for example, based on the monitored data and/or procedure plan data. The adjustment parameters may be associated with adjustments to positioning, HCP movement, HCP activity, HCP emotions, surgical instruments, and/or the like. The surgical computing system may determine adjustment parameters(s), for example, to improve the flow of activities performed during the surgical procedure, reduce movement throughout a surgical procedure, reduce possible contamination within an OR, reduce OR turnaround time between procedures, improve efficiency for a surgical procedure, increase HCP focus during the surgical procedure, and/or the like. As those skilled in art may appreciate, various optimization models, simulation models and/or process models may be used in the determination. For example, the surgical computing system may determine adjustments parameters for a surgical instrument mix, surgical access location, OR layout, and/or HCP staffing based on data and/or metadata associated with previous procedures.

As described herein with respect to FIG. 14, a surgical procedure may be evaluated, for example, based on efficiency and/or outcome success. Efficiency may be associated with the duration a surgical procedure takes for completion, which may include equipment wait times, instrument exchange times, procedure wait times, and/or the like. For example, surgical procedures may be more efficient if there are lower equipment wait times, instrument exchange times, and/or procedure wait times. Efficiency may be associated with gross movement throughout a procedure. For example, less cumulative displacement may result in a more efficient surgical procedure. Surgical procedures may be compared with historic surgical data to determine a comparison with a baseline score.

For example, the surgical computing system may determine adjustment parameter(s) associated with positioning, such as adjustments for OR layout, surgical equipment positioning, surgical instrument positioning, surgical site access, trocar positioning, and/or the like. Adjustments for OR layout may include adjusted positioning for surgical equipment, surgical instruments, cameras, displays, and/or the like. Surgical equipment may include surgical tables, which may be designated to specific HCPs.

Figure 17:
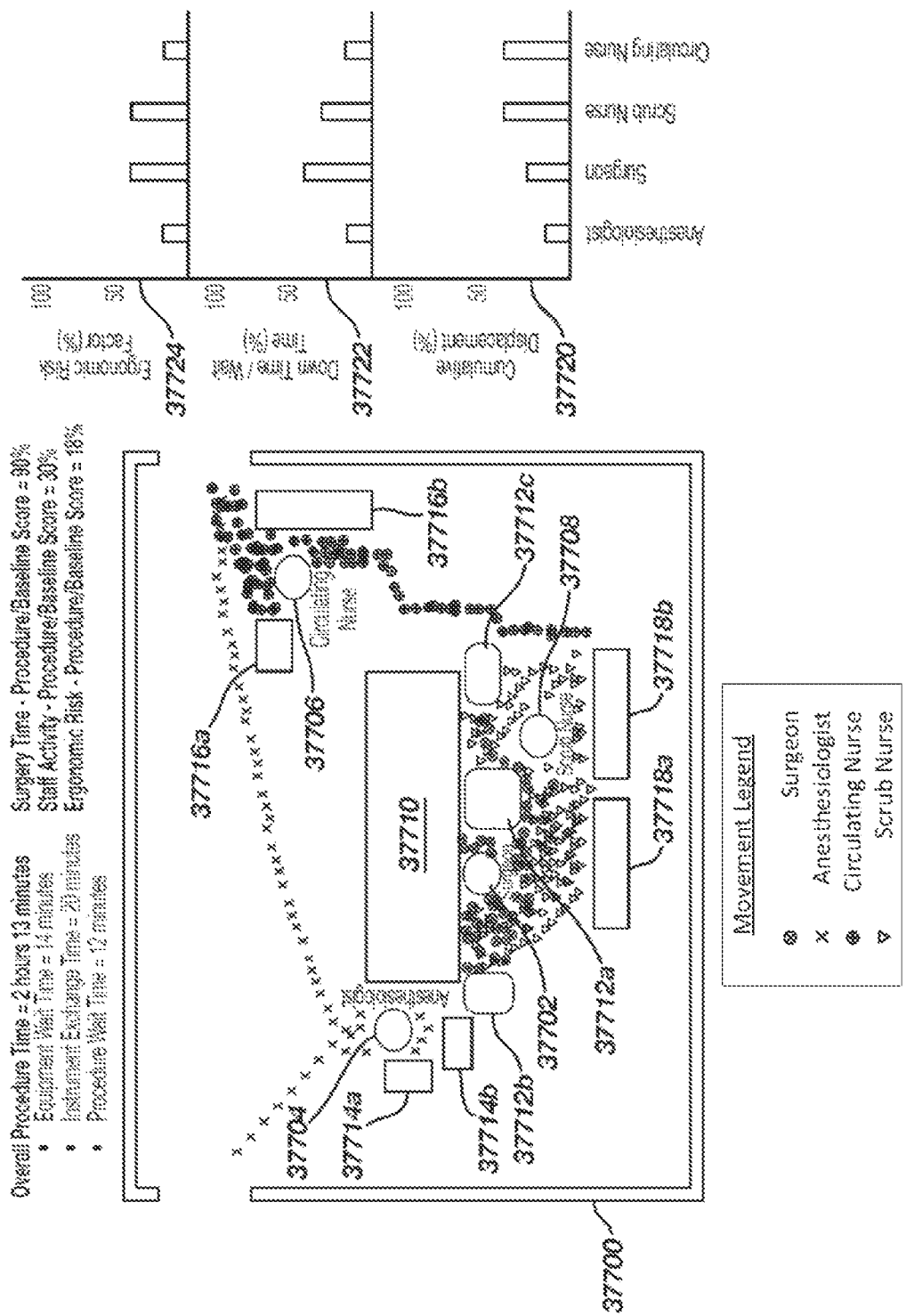
FIG. 17 illustrates an example OR layout and HCP activity during a surgical procedure.

FIG. 17 illustrates an adjusted OR layout for the surgical procedure that may be generated by the surgical computing system. As shown in FIG. 17, the modified OR layout may include HCPs, surgical equipment, and/or the like. The HCPs in OR 37700 may include a surgeon 37702, anesthesiologist 37704, circulating nurse 37706, and/or scrub nurse 37708. The OR 37650 may include surgical equipment such as an operating table 37710 and/or HCP equipment tables. The HCP equipment tables may include surgeon equipment table(s) 37712a, 37712b, and 37712c, anesthesiologist equipment table(s) 37714a and 37714b, circulating nurse equipment table(s) 37716a and 37716b, and/or scrub nurse equipment table(s) 37718a and 37718b.

For example, the surgical computing system may determine adjustment parameters associated with surgical equipment positioning. The surgical computing system may receive monitored data associated with HCP movement throughout the OR. As shown in FIG. 16, HCP(s) may travel between a surgical equipment table and the surgical access site multiple times throughout a procedure. Based on the monitored data, the surgical computing system may determine an adjusted HCP equipment table position, which may be located closer to the surgical access site.

For example, the surgical computing system may determine an adjusted positioning for the scrub nurse equipment tables 37718a and 37718b. The adjusted position may be closer in location to the surgeon, the surgeon equipment tables, and/or the surgical access site. The adjusted HCP equipment positioning, based on the proximity to the surgical access site, may reduce movement throughout the procedure. Improvements to equipment placement may reduce inefficient movement of HCPs and instruments, which may improve the movement flow of the OR.

For example, the surgical computing system may determine adjustment parameters for surgical equipment positioning such that HCP movement paths do not intersect. As shown in FIG. 17, the surgical computing system may determine adjusted positions for the circulating nurse equipment tables 37716a and 37716b. The adjusted circulating nurse equipment table positions may be located in the OR such that the anesthesiologist 37704 does not cross paths with the circulating nurse 37706 during the procedure. Reducing movement intersection may improve movement efficiency during the surgical procedure.

For example, the surgical computing system may determine adjustment parameters associated with surgical site access positioning. The surgical computing system may receive monitored data associated with trocar use and positioning, surgical procedure type, patient body type, co-morbidities, instrument exchanges, and/or the like. Based on the monitored data, the surgical computing system may determine adjustment parameters such as adjusted trocar angulations, for example. The surgical computing system may determine adjustment parameters such as adjusted access ports, for example.

Based on the modified positioning of the OR layout, the OR 37700 in FIG. 17 may allow surgical procedures with higher efficiency and/or outcome success compared to the OR 37650 in FIG. 16. For example, OR 37700 may reduce cumulative displacement (e.g., as shown at 37720), down time and/or wait time (e.g., as shown at 37722), and/or ergonomic risk factors (e.g., as shown at 37724). Cumulative displacement may be reduced, for example, based on OR 37700 having surgical equipment positioning such that unnecessary movement is avoided. For example, OR 37700 may allow surgical procedures to be performed faster, for example, based on reduced equipment wait time, instrument exchange time, procedure wait time, and/or the like. Thus, the modified OR layout 37700 may increase the efficiency and/or outcome success of the surgical procedure.

Turning back to FIG. 15, at 37806, the adjustment parameters may be communicated, for example, to systems within the OR. For example, the surgical computing system may generate a control signal based on the positioning parameter(s). The control signal may be communicated to systems in the OR, and the system may modify their operation(s) based upon the received adjustment parameters. The control signal may be configured to perform adjustments. The control signal may include adjusting a surgical camera location and/or adjusting an angle of view. The control signal may include an indication suggesting an adjustment to HCP's movement within the OR. For example, the adjustment parameters may be presented.

Surgical site infection may be a health problem. The surgical computing system may determine that surgical site infection risk may increase, for example, if environmental contamination is present in the OR. Environmental contamination may occur based on traffic in the OR. The HCP movement data may include HCP traffic in an OR such as door opening, movements, the number of persons inside the OR during the surgical procedure, and/or the like. Environmental contamination, such as air and/or wound contamination, may be reduced, for example, if traffic within the OR is minimized.

For example, the surgical computing system may determine adjustment parameter(s) associated with reducing possible contamination of the OR. The surgical computing system may obtain monitored data associated with HCP movement, for example, that may indicate potential environmental contamination. The HCP movements may include movements that may lead to environmental contamination. Based on the monitored data, the surgical computing system may determine adjustment parameters associated with a limit on HCP movement during a procedure, a limit on door opening, a limit on the number of HCPs inside the OR during the surgical procedure, and/or the like.

The surgical computing system may determine adjustment parameter(s) associated with modifying HCP actions, for example, based on monitored data and/or procedure data. For example, the surgical computing system may obtain monitored data and/or surgical procedure data associated with pre-procedure steps and/or post-procedure steps. The surgical computing system may track OR turn over time between surgical procedures. Based on the turnover time, the surgical computing system may determine how efficiently an OR has been prepared (e.g., cleaned, cleared, and restocked) for the next surgical procedure. The surgical computing system may determine that a procedure step has been performed improperly based on the monitored data. Based on the determination that the procedure step has been performed improperly, the surgical computing system may determine that the procedure step must be redone. The surgical computing system may determine that a procedure step has been performed untimely. Based on the determination that the procedure step has been performed untimely, the surgical computing system may allocate more staff to performing the procedure step.

For example, the surgical computing system may determine that the OR was improperly prepared for the next surgical procedure. The next surgical procedure may involve using a surgical instrument, such as a surgical stapler, for example. The surgical computing system may determine, based on monitored data, that the surgical stapler was not prepared and/or was not located in the OR. Based on the determination that the OR was improperly prepared, the surgical computing system may notify staff about the failed preparation. The surgical computing system may notify the staff to prepare the surgical stapler before the surgical procedure.

For example, the surgical computing system may determine that the OR was inefficiently cleaned after a surgical procedure. The surgical computing system may receive monitored data associated with the staff cleaning the OR after the surgical procedure. The monitored data may indicate that cleaning steps were repeated. The surgical computing system may determine that the repeated cleaning steps were not needed to properly clean the OR. The surgical computing system may notify the staff that the repeated step was not necessary, for example, to improve the efficiency of the cleaning procedure. For example, the surgical computing system, based on the monitored data, may determine that a cleaning step is being repeated. Based on the determination, the surgical computing system may notify the staff performing the repeated step to stop.

The surgical computing system may determine adjustment parameters associated with the number of HCPs for a surgical procedure. For example, the surgical computing system may receive monitored data associated with the number of HCPs in an OR and/or HCP activity levels during a surgical procedure. The surgical computing system, based on the monitored data and/or biomarker data (e.g., as described herein), may determine a modified number of HCPs in the OR for the surgical procedure. The modified number of HCPs may be an increase or decrease in the number of HCPs for the surgical procedure. For example, the surgical computing system may compare the HCP activity intensity with one or more threshold intensity levels to determine the need for more or less staff for the surgical procedure. HCP activity intensity may be determined based on HCP stress levels and/or HCP inactivity. For example, HCP activity intensity may be low if an HCP is idle and/or not performing activities. For example, HCP activity intensity may be high if an HCP is experiencing stress.

For example, the surgical computing system may determine to reduce the number of HCPs for a surgical procedure. The surgical computing system may determine to reduce the number of HCPs for a surgical procedure, for example, if the surgical procedure is determined to be overstaffed based on the monitored data. A surgical procedure may be overstaffed, for example, if there are HCPs in the OR that are idle and/or not performing activities. A surgical procedure may be determined to be overstaffed, for example, if the surgical procedure may be performed with fewer HCPs than are present. For example, a surgical computing system may determine to reduce the number of HCPs for a surgical procedure, for example, if HCP activity levels fall below a threshold. HCP activity levels may fall below a threshold, for example, if the HCPs have downtime or are inactive for a predetermined duration of time throughout the surgical procedure.

The surgical computing system may determine to increase the number of HCPs for a surgical procedure, for example, if the surgical procedure is determined to be understaffed based on the monitored data. A surgical procedure may be understaffed, for example, if there are not enough HCPs in the OR to perform the surgical procedure. The surgical procedure may be determined to be understaffed, for example, if HCP activity intensity and/or HCP stress levels are high. The surgical computing system may determine to increase the number of HCPs for a surgical procedure, for example, if HCP activity levels exceed a threshold.

Staff utilization may be monitored throughout a surgery. A first procedural step within a surgical procedure may require more HCP staff than a second procedural step. The surgical computing system may continuously monitor the surgical procedure to determine staffing needs for a particular procedural step. For example, a surgical computing system may determine that a first surgical procedure step is overstaffed and may determine that a second surgical procedure step is understaffed. The surgical computing system may determine, based on completion of a procedural step and/or task, to reduce the number of HCPs, for example, because the HCP is no longer needed. The surgical computing system may determine, based on the start of a procedural step and/or task, to increase the number of HCPs.

For example, based on the determination to modify the number of HCPs in the OR, the surgical computing system may indicate or give a notification to the OR. If the surgical computing system determines to reduce the number of HCPs in the OR, a notification may be given to certain HCPs to leave the OR. If the surgical computing system determines to increase the number of HCPs in the OR, a notification may be given to HCPs to enter the OR.

For example, the surgical computing system may determine adjustment parameter(s) associated with surgical instruments, such as surgical instrument mix, surgical instrument exchanges, surgical instrument usage, and/or the like. For example, the surgical computing system may determine a recommended surgical instrument for a surgical procedure and/or procedure step. The surgical computing system may determine recommended surgical instrument(s) to improve instrument to job correlation. The surgical computing system may determine recommended surgical instrument(s) to anticipate an unexpected need for a surgical instrument within a surgical procedure.

For example, the surgical computing system may receive monitored data associated with surgical instrument exchanges. The surgical computing system may track surgical instrument exchanges relative to the surgical procedure and/or task and the duration elapsed to accomplish the surgical procedure. For example, the surgical computing system may track instrument exchanges between surgical instruments having a similar function, such as Bipolar RF, Monopolar RF, and/or Ultrasonic advanced energy devices. The surgical computing system may relate the surgical instruments to the time it takes to complete a surgical task. The surgical computing system may perform video analysis of the procedure steps to determine the efficiency of an energy device in accomplishing a surgical task, such as a dissection or transection task, for example.

Based on the monitored data, the surgical computing system may determine recommended surgical instruments, such as a combination of devices for a surgical procedure and/or complication. The recommended surgical instruments may improve the efficiency or efficacy of the surgical procedure. The surgical computing system, for example, may determine recommended instrument mixes that improve efficiency, such as decreasing the time to perform a surgical task, but maintain surgical outcomes. For example, the surgical computing system may determine recommended surgical instruments based on monitored sealing/oozing performance of a surgical instrument over time. For example, the surgical computing system may determine recommended surgical instruments based on proximity to adjacent structure for safety, such as managing thermal spread, and efficiency for future procedure steps. In examples, the surgical computing system may determine recommended surgical instruments to dissect fatty tissue with speed, for example, because vital organs are far away from the surgical site. In examples, the surgical computing system may determine recommended surgical instruments to perform fine dissecting to expose vessels with precision and/or safety, for example, based on proximity to structures. In examples, the surgical computing system may determine recommended surgical instruments to transect vessel(s) based on sealing performance.

For example, the surgical computing system may monitor surgical instrument mix and replacements. The surgical computing system may determine the efficiencies of the various mixes of instruments' impact on access, instrument exchanges, instrument utilization, and/or time to complete the procedure based on monitored data associated with previous procedures. Based on the determined efficiencies, the surgical computing system may determine a recommended surgical instrument mix. The determined recommended surgical instrument mix may decrease the time to complete the procedure.

The surgical computing system may determine recommended surgical instruments based on an anticipated need during a detected surgical complication, for example, to minimize delays to the surgical procedure. For example, the computing system may identify a certain surgical instrument, adjunct therapy, certain surgical device(s), and/or surgical product for treating detected surgical complication. The identified surgical instrument that may treat the surgical complication, for example, may be outside of the surgical procedure plan.

For example, the surgical computing system may receive monitored data associated with a surgical procedure. The monitored data may include surgical instrument usage and/or adjunct treatment usage. The surgical computing system may determine, based on the monitored data and/or procedure plan, recommended surgical instruments, adjunct therapies, surgical devices, surgical products, and/or the like, for example, to minimize the unexpected need within a procedure.

For example, the surgical computing system may determine to have a backup surgical instrument in the event of a surgical complication. The surgical computing system may anticipate the need for a backup surgical instrument based on aggregating or compiling past procedures, co-morbidities, biomarker monitoring, and/or imaging. For example, the surgical computing system may determine that a surgical procedure combined with certain biomarker measurements may lead to a surgical complication. Based on the anticipated surgical complication, the surgical computing system may determine recommended surgical instruments that otherwise may have been unanticipated. Determining the recommended surgical instruments may minimize the need to retrieve an unanticipated product, which may result in delaying the procedure.

For example, the surgical computing system may identify repeatedly used alternative products and/or additional product that may be needed for a procedure, based on monitored data associated with previous surgical procedures. The surgical computing system may determine to add additional product that may be needed for the procedure and/or to stock the repeatedly used alternative product in an OR backup storage location. For example, the surgical computing system may determine primary suggestions and backup alternative combination suggestions based on lacking device inventory. The surgical computing system may receive monitored data associated with the OR setup for a surgical procedure. The OR setup data may include the surgical instrument mix intended for use in the procedure and the instrument mix within the local backup storage. The surgical computing system may determine recommended surgical instruments for the instrument mix intended for use in the procedure and the instrument mix in the local backup storage such that surgical instruments that may be needed for the procedure, including anticipated surgical complications, can be provided.

For example, a surgical complication may call for treatment by a unique device, which may be unavailable. The surgical computing system may determine recommended surgical instruments, such as device combinations and/or approaches, to achieve the same surgical outcome as if the unique/ideal device was used.

The surgical computing system may determine parameters associated with a surgical instrument anticipated for future use in a procedure, for example, based on monitored data and/or procedure data. For example, the surgical computing system may determine the readiness of surgical instruments for use when needed in the procedure. For example, the surgical computing system may determine that a surgical instrument will be used in the next procedural step based on the surgical procedure plan. The surgical computing system may anticipate surgical procedure steps and the need for a surgical product in a ready-to-use state for the anticipated steps.

The surgical computing system may determine that the surgical instrument is not prepared (e.g., in a ready to use state), for example, based on the monitored data. The surgical computing system may indicate, based on the determination that the surgical instrument is not prepared, to HCPs to prepare the surgical instrument. The indication may be configured to prompt the HCPs to prepare the surgical instrument before it is needed for the anticipated step, which may prevent delays in the procedure. In examples, the surgical computing system may determine that the surgical instrument is not present within the OR, for example, based on the monitored data. The surgical computing system may indicate to HCPs, based on the determination that the surgical instrument is not present within the OR, to retrieve the surgical instrument. Retrieving the surgical instrument before the anticipated steps may prevent delays in the procedure.

The surgical computing system may determine parameters associated with reducing inactivity and/or downtime within an OR. For example, a surgical computing system may monitor downtime and inactivity within the OR. The surgical computing system, based on the monitored downtime and inactivity within the OR and/or procedure data, may determine parameters associated with reducing wait times during a surgical procedure. The surgical computing system may determine that inactivity and/or downtime within the OR is inconsistent with the surgical procedure plan. For example, inactivity and/or downtime may be inconsistent with the surgical procedure plan if the inactivity exceeds a predetermined time threshold.

The surgical computing system may determine downtime and inactivity in the OR if the surgical computing system detects that the OR is waiting on results or for other jobs to be completed before moving onto the next procedural step. For example, inactivity may occur based on pathology wait times from checking biopsies and/or margins to determine a next procedural step, such as determining whether resection is needed and/or ensuring enough resection is performed.

The surgical computing system may determine downtime and inactivity based on detected equipment failure. For example, equipment failure, such as monitoring equipment failure, may delay the surgical procedure and impact patient flow and/or resource utilization. To prevent equipment failures, the surgical computing system may determine maintenance schedules and/or replacement schedules that may reduce inactivity resulting from failure during the surgical procedure. For example, the surgical computing system may receive monitored data and/or procedure data. The monitored data and/or procedure data may indicate the types, frequency, and/or times that equipment failure occurs. Based on the types, frequency, and/or times that the equipment failure occurs, the surgical computing system may determine maintenance schedules or schedule replacements for the surgical equipment, for example, to prevent the failures from occurring.

Equipment failures may occur, for example, based on incorrect setup. The surgical computing system may receive monitored data associated with OR setup, HCP reactions and/or facial responses, and the like. The surgical computing system may, based on the monitored data and procedure data, identify errors associated with incorrectly setup equipment. The surgical computing system, based on the identified errors, may notify or provide indication to staff members, for example, to intervene, train, and/or confirm setup prior to surgery.

The surgical computing system may determine parameters associated with running a simulator and/or test run, for example, to prevent equipment failures and reduce the resulting downtimes. A simulator may be run after equipment is setup, for example, to perform a test run to confirm, prior to a surgical procedure, that no errors with the equipment will occur. For example, the simulator may include sequencing energy devices through a normal operation at a power level that does not cause harm to anyone or the surroundings. For example, an RF energy device may activate energy, with voltage and current at the lowest setting, to confirm that a signal was received.

Downtime and inactivity in the OR may occur based on a lack of proper planning, deficiencies in teamwork, communication gaps, limited availability of trained support staff, and/or the like. The surgical computing system may determine an inactivity in the OR inconsistent with the surgical procedure plan, for example, based on the monitored data and/or procedure plan. The procedure plan may indicate that the procedural step should be performed within an allotted time. The surgical computing system may determine an inactivity inconsistent with the surgical procedure plan, for example, if the procedural step is taking longer to complete than the allotted time. The surgical computing system may generate an indication of inactivity inconsistent with the surgical procedure plan. The surgical computing system may determine a recommendation associated with the inactivity inconsistent with the surgical procedure plan.

For example, the surgical computing system may determine a recommendation to use a playbook and/or an app/tablet based on the type of surgical procedure. The playbook and/or app/table may provide an overview of the procedure to staff members prior to surgery indicating to staff member one or more of responsibilities, sequence of actions, equipment setup steps, troubleshooting for common errors/issues, and/or the like. The playbook and/or app/table may ensure the team is prepared and is aware of the roles and responsibilities for the surgical procedure. Whether tasks are performed properly may be monitored. The surgical computing system may determine that a task was performed improperly, such as the task was skipped, performed in the wrong order, and/or performed untimely, based on the monitored data. For example, a surgical task may have been skipped if the surgical procedure plan calls for a step to be taken but an analysis of the monitored data indicates the task was not performed. For example, the surgical task may have been performed improperly if the monitored data indicates that tasks were performed in the incorrect order. The surgical computing system may generate indications associated with audible, visual, and/or haptic feedback to the staff in the OR.

Downtime and inactivity in the OR may occur based on patient positioning for a surgical procedure. Prior to surgery the patient may be transferred to the operating table. The final positioning of the patient may be performed based on planning and coordination by HCPs. The HCPs may take time prior to the surgery to determine the final positioning of the patient. Delays may occur based on patient repositioning during a surgical procedure.

For example, the surgical computing system may receive monitored data and/or surgical procedure plan, such as patient characteristics/profile, surgical procedure type, OR layout, equipment positioning, and/or the like. Based on the monitored data and/or surgical procedure plan, the surgical computing system may determine a recommendation associated with the optimal patient position on an operating bed. The patient positioning recommendation may reduce setup time by avoiding having the OR team plan and coordinate such that the HCPs may direct focus to other tasks. The patient positioning recommendation may reduce downtime and/or inactivity that may have occurred from improper patient positioning leading to repositioning.

The surgical computing system may determine parameters associated with altering emotions experienced by HCPs in the OR. Surgery may be a high stress environment which may cause individual emotional impact to HCPs or between HCPs. The stress may cause distractions, loss of focus, resentment, lack of communication, lack of teamwork, negative impacts towards team members, and/or the like, which may delay and/or impact surgery response times and/or outcomes. The surgical computing system may determine parameters associated with alleviating negative emotions that may occur during a surgical procedure.

For example, the surgical computing system may receive monitored data such as OR staff emotional state. The OR staff emotional state may indicate a stressful environment. The OR emotional state may include expressions or interactions with other HCPs. The surgical computing system may determine parameters associated with altering emotions in the OR. For example, the surgical computing system may determine adjustment parameters and/or generate control signals associated with altering emotions in the OR. The adjustment parameters and/or control signals include adjusting audio and/or visual devices. For example, the surgical computing system may determine parameters adjusting audio devices within the OR, such as playing and/or modifying music or sounds. The modified music or sounds in the OR may be directed at specific HCPs. The music or sounds in the OR may include meditation sounds, which may calm the room.

For example, the surgical computing system may determine parameters adjusting visual displays, such as to providing a visual aid. The visual aid may momentarily distract and improve the mood in the OR. The visual aid may include positive reinforcement played throughout the OR. The visual aid may be displayed on non-critical monitors. The surgical computing system may determine to provide indication or give a notification to staff outside the OR. The indication/notification may include a recommendation to pull team members together after a surgical procedure to resolve conflict, such as resentment.

For example, the surgical computing system may receive monitored data such as signs of fatigue in the OR. The surgical computing system may determine parameters associated with reducing the fatigue, such as playing music in the OR. The surgical computing system may determine to adjust the music in the OR, such as speeding up or slowing down the tempo of the music. The surgical computing system may determine parameters associated with the light to alter the environment and behavior within the OR.

The computing system may monitor healthcare professionals in a surgical procedure and provide parameters associated with improving motions and/or postures of the HCPs. The parameters associated with improving motions and/or postures of the HCPs may be included in recommendations, adjustments, and/or feedback. The parameters may be associated with ergonomic positioning.

For example, a computing system may monitor surgeon motion, posture, and surgical access and generate recommendations to reduce wear on HCPs. The motions and postures of HCPs monitored throughout surgical procedure(s) may be analyzed. Improvements for posture, weight lifting, standing, and the like may be identified.

The computing system may record one or more of patient position, surgeon access location, and surgeon access orientation. The system may analyze one or more of the patient position, surgeon access location, and surgeon access orientation. The computing system may record and analyze one or more of the patient position, surgeon access location, surgeon access orientation, and/or the like. The computing system may record and analyze one or more of the patient position, surgeon access location, surgeon access orientation and/or the like to generate one or more adjustment parameters. The adjustment parameters may reduce repositioning and awkward positions and postures. The adjustment parameters may include one or more of instrument mix selection, trocar location, OR table setup, patient positioning, and/or the like.

For example, the computing system may receive monitored data associated with an operating room. The monitored data may include data associated with one or more of OR layout, surgical equipment location, patient positioning, surgical instrument mix, surgical device positioning, HCP motion(s), HCP posture(s), physical trait(s) of HCP(s), the head and/or eye position(s) of HCP(s), or surgical display positioning. The computing system may determine one or more ergonomic adjustment parameters associated with ergonomic positioning within the operating room based on the monitored data. The ergonomic adjustment parameter(s) may include adjustments to one or more of OR layout, patient positioning, surgical display operation, surgical equipment location and/or the like. The computing system may send an indication of the ergonomic adjustment parameter(s). The computing system may communicate the ergonomic adjustment parameter(s) associated with ergonomic positioning to one or more systems associated with the operating room. For example, the computing system may communicate the adjustment parameter(s) to a system configured to control surgical display(s) in the OR. The surgical display may present the ergonomic adjustment parameters. The system configured to control surgical display(s) may modify the positioning or settings of one or more surgical display(s), for example, based on the ergonomic adjustment parameters.

The computing system (e.g., a surgical computing system) may include a surgical hub 20002 as described herein with respect to FIG. 2. For example, the surgical computing system may include at least one of the following: a surgical hub 20006 in communication with a cloud computing system 20008, for example, as described in FIG. 2. A surgical computing system may include at least one of the following: a surgical hub 20006 or a computing device 20016 in communication with a could computing system 20008. The cloud computing system 20008 may include at least one remote cloud server 20009 and at least one remote cloud storage unit 20010. The computing system may be or may include an HCP monitoring system such as the HCP monitoring system 20000, 20002, 20003, or 20004 as described herein with respect to FIGS. 1-3. The computing system may be a computing system operatively connected to the HCP monitoring system(s) 20000, 20002, 20003, and/or 20004. The computing system may be or may include the computing system 20271 described herein with respect to FIG. 9. The computing system may be or may include the computer system 20063 described herein, for example, with respect to FIG. 4.

The surgical monitoring data may be obtained via the surgical hubs. For example, a surgical hub may obtain surgical monitoring data from various sensing systems such as the wearable sensing system(s) 20011, and/or environmental sensing system(s) 20015 described herein with respect to FIG. 1. The surgical hub may obtain surgical monitoring data from HCP monitoring devices 35510, environmental monitoring devices 35512, patient monitoring devices 5124, and/or modular devices 5102 as described herein with respect to FIG. 11.

Figure 18:
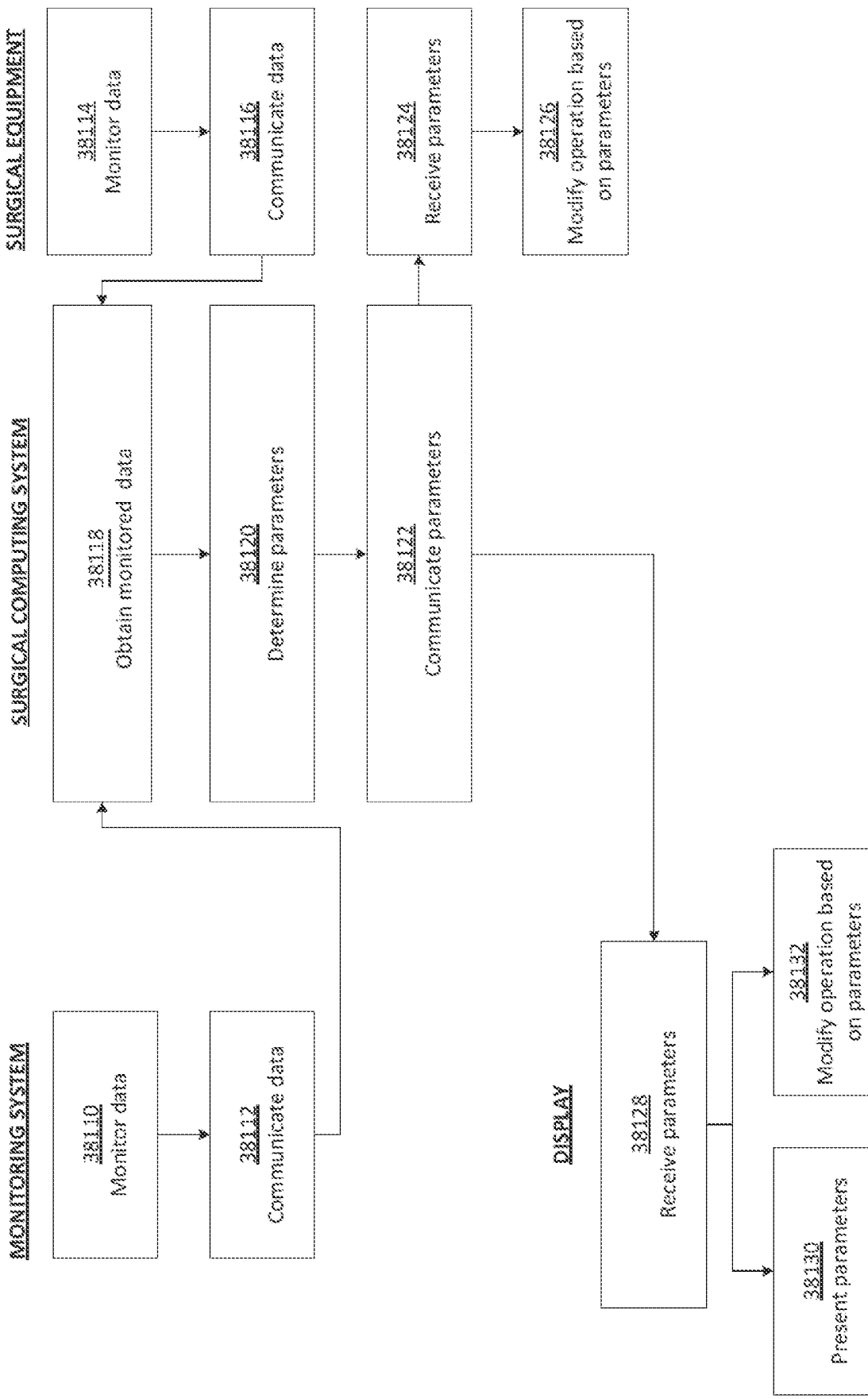
FIG. 18 illustrates a flow diagram of an example processing associated with monitoring an operating room and determining parameters.

FIG. 18 illustrates example processing associated with monitoring an operating room and determining parameters associated with ergonomic positioning. As shown, at 38110, an HCP monitoring system, which may be an HCP monitoring system 20002, 20003, or 20004 as described herein with respect to FIGS. 1-3, may monitor data. The HCP monitoring system may monitor data associated with an OR as described herein with respect to step 37800 in FIG. 15. The monitored data may include data associated with one or more surgical procedures. The surgical procedures may take place in an OR or multiple ORs. The monitored data may include data associated with HCP, the patient, surgical instruments, surgical equipment, and/or surgical devices. The surgical device may include a surgical access device. The monitored data may include data associated with positioning.

At 38112, the HCP monitoring system may communicate the monitored data. The HCP monitoring system may communicate the monitored data to the surgical computing system. The monitored data may be continuously gathered and communicated prior to, during and/or after a surgical procedure.

As shown at 38114, surgical equipment may monitor data. The surgical equipment may be a surgical instrument 20282 as described in connection with FIG. 10. The surgical instrument 20282 may monitor data, such as user inputs associated with movement and positioning of the surgical instrument, for example. The surgical instrument 20282 may use an acceleration sensor to monitor the movement and positioning of the surgical instrument 20282. The surgical instrument 20282 may monitor the orientation of the surgical instrument 20282. The surgical instrument 20282 may monitor the length of time the surgical instrument 20282 is maintained in a particular position.

For example, the surgical equipment may be a visual display, such as the primary display 20023 as described in connection with FIG. 2, and/or other displays described herein. The primary display 20023 may monitor data, such as positioning, for example.

At 38116, the surgical equipment may communicate the monitored data to the surgical computing system. The monitored data may be continuously gathered and communicated prior to, during and/or after a surgical procedure.

At 38118, the surgical computing system may obtain monitored data. For example, the computing system may obtain monitored data as described herein with respect to step 37800 in FIG. 15. The surgical computing system may obtain monitored data from the HCP monitoring system. The surgical computing system may obtain monitored data from surgical equipment. The surgical computing system may obtain monitored data from the HCP monitoring system and surgical equipment.

At 38120, the surgical computing system may process the obtained monitored data. The surgical computing system may determine one or more parameters based at least in part on the obtained monitored data. The monitored data may include OR setup monitoring and/or position and posture monitoring over a surgical procedure. The surgical computing system may determine adjustment parameters associated with ergonomic positioning within the OR. For example, the adjustment parameters may include adjustments associated with an operating room or a surgical procedure. The adjustment parameters may include adjustment(s) to the OR layout, for example, prior to surgery or during surgery. The adjustment parameters may include changes to equipment layout to improve ergonomics of the HCP(s).

For example, the parameters may indicate recommendation(s) for an OR layout prior to surgery. The surgical computing system may obtain monitored data identifying HCP characteristics, for example, prior to starting surgery. The surgical computing system may obtain the monitored data from the HCP monitoring system, which may include a video. The HCP characteristics may include height, arm length, hand shape or length, waist width, shoulder width, age, or focal position of an HCP. Based on the HCP characteristics, the surgical computing system may determine the recommendations for the OR layout prior to surgery. The OR layout recommendations may include table height, for example, for a mayo stand. The OR layout recommendations may include the mayo stand placement and/or angle. The OR layout recommendations may include surgical monitor position and/or angle, for example, to maintain a neutral position or minimize extension or flexion for reach or neck or back strain. The OR layout recommendations include one or more of table height, mayo stand placement and/or angle, surgical monitor position and/or angle, and/or the like.

For example, the surgical computing system may obtain monitored data identifying characteristics of a patient prior to surgery. The surgical computing system may obtain the monitored data from a video, for example. The characteristics of a patient may include height, weight, waist height, and/or shoulder height associated with the patient. Based on the characteristics of the patient, the surgical computing system may determine recommendations for an OR layout prior to surgery. The OR layout recommendations may include patient positioning, such as the position of the patient on the patient bed. The surgical computing system may determine the patient positioning based on the characteristics of the HCP and the patient, for example. The surgical computing system may determine the patient positioning based on the characteristics of the patient relative to the characteristics of the HCP. The surgical computing system may determine the patient positioning based on the characteristics of the HCP, the characteristics of the patient, and a surgical site.

For example, the surgical computing system may obtain monitored data associated with the posture of an HCP, such as a surgeon, during and/or throughout a surgical procedure. The surgical computing system may determine the posture of the HCP based on the monitored data. For example, the surgical computing system may determine that the posture of the HCP is an ergonomic posture. The surgical computing system may determine that the posture of the HCP is a neutral or correct posture. The surgical computing system may determine that the posture of the HCP is an improper or poor posture, such as a straining or awkward posture, for example. A posture of an HCP that is ergonomic, neutral, or correct posture may decrease the wear on the body of the HCP. A posture of an HCP that is an improper or poor posture may increase the wear on the body of the HCP.

The surgical computing system may determine adjustment parameters and/or recommendation parameters associated with the posture of an HCP, for example, based on the determined posture of the HCP. The surgical computing system may determine adjustment parameters and/or recommended parameters that may correspond to a neutral posture.

For example, the surgical computing device may determine adjustment parameters or recommendation parameters associated with a neutral posture of the neck or cervical spine of the HCP. The surgical computing device may determine the position of a display or monitor that corresponds to a neutral posture of the HCP, for example, based on the display's location and/or positioning, the HCP's position and/or the HCP's characteristic(s) described herein. The surgical computing device may calculate adjustment parameter(s) such as raising, lowering, and/or angling the display or monitor. The raising, lowering, or angling the display or monitor may improve the posture of the HCP. The raising, lowing, or angling the display or monitor may reduce strain on the HCP.

For example, the surgical computing device may determine adjustment parameters or recommendation parameters associated with a neutral posture of the mid-back or thoracic spine of the HCP. The surgical computing device may determine the positioning of a table, such as a surgical table or a mayo stand, for example, that corresponds to the neutral posture of the mid-back or thoracic spine of the HCP. The determination may be based on the current positioning of the table, the position of the HCP, and/or HCP's characteristic(s) described herein. The surgical computing device may determine adjustment parameters such as raising, lowering, or angling the table, based on the table position that may result in neutral posture of the mid-back or thoracic spine of the HCP. The surgical computing device may determine adjustment parameters associated with patient positioning that may correspond to the neutral posture. The adjustment parameters may include raising, lowering, and/or angling the position of the patient.

For example, the surgical computing device may determine adjustment parameters or recommendation parameters associated with a neutral posture of the low-back or lumbar spine of the HCP. The surgical computing device may determine the positioning of a table, such as a surgical table or mayo stand, the positioning of a display or monitor, and/or the positioning of a surgical instrument, that corresponds to the neutral posture of the low-back or lumbar spine of the HCP, and may generate adjustment parameters or recommendation parameters accordingly. The determined parameters associated with the recommended positioning of the table, display or monitor, and/or the surgical instrument may minimize or reduce pelvic twist or pelvic tilt. Minimizing or reducing pelvic twist or pelvic tilt may decrease the wear on the HCP.

The surgical computing system may determine parameters associated with positioning of surgical equipment in an OR. The surgical computing system may determine parameters associated with the location of surgical equipment in the OR. The surgical equipment may include a surgical robot, which may be the robotic system 20034 as described herein with respect to FIG. 2. The robotic system 20034 may include a surgeon's console 20036, a patient side cart 20032, and a surgical robotic hub 20033. For example, the surgical computing system may obtain monitored data associated with a surgical procedure, such as a laparoscopic procedure. The surgical procedure may be recorded. The laparoscopic procedure may use surgical equipment such as a surgical robot, for example. The surgical computing system may determine positioning parameter(s) and/or location parameters associated with the surgical robot based on the monitored data. The parameters may include the positioning of the surgical robot. The parameters may include a surgical robot configuration. The parameters may include the location for the surgical robot. The parameters may include introduction of the surgical robot into the procedure. The introduction of the surgical robot into the procedure may include a surgical robot supplementing a procedure, such as a hybrid procedure. The introduction of the surgical robot into the procedure may include a full surgical robot procedure.

The surgical computing system may determine parameters associated with ergonomic positioning of surgical instruments based on the monitored movement of the surgical instruments. For example, the surgical computing system may obtain monitored data associated with the movement of surgical instruments in the OR. The monitored data may be associated with a laparoscopic procedure. The monitored data may include data associated with a surgical robot. Based on the monitored data associated with the surgical instruments in the operating room, the surgical computing system may determine parameters associated with ergonomic positioning of the surgical instruments.

For example, laparoscopic procedures may be monitored to automate a robot setup for similar procedures using surgical robots. The surgical computing system may determine surgical robot setup parameters for similar surgical procedures based on the monitored data.

For example, surgical instrument use may be analyzed. Surgical instrument use may be analyzed based on the monitored surgical instrument exchange. Surgical instrument use may be analyzed based on the monitored usage amount. Surgical instrument use may be analyzed based on an appropriateness of a surgical instrument use for a procedure. For example, the surgical computing system may analyze surgical instrument use. The surgical computing system may receive monitored data associated with surgical instruments. The monitored data associated with surgical instruments may include surgical instrument movement, surgical instrument usage amount, the type(s) of surgical instrument(s) used for a surgical procedure, and/or surgical instrument exchange(s). The surgical computing system may obtain information associated with an ideal or standard for surgical instrument usage. The surgical computing system may determine parameters associated with the surgical instrument use. For example, the surgical computing system may determine parameters associated with the surgical instrument use based on the monitored data. The surgical computing system may determine surgical instrument use parameter(s) based on the ideal standard for surgical instrument usage. The surgical computing system may determine the surgical instrument use parameter(s) based on the monitored data and the predetermined standard surgical instrument usage value(s). For example, the surgical computing system may identify product mix irregularities based on the monitored data and the standard product use practice and/or value(s). The surgical computing system may determine an overuse or underuse of a surgical instrument, for example, for a surgical procedure by comparing the monitored instrument use and the standard instrument use.

The surgical computing system may determine parameters associated with patient positioning, access, and repositioning, for example, to improve HCP ergonomic requirements. For example, a surgical computing system may obtain monitored data associated with patient positioning, surgical access devices, and repositioning within the OR throughout a surgical procedure. The surgical computing system may determine a modified patient position or surgical access point. The modified patient position may include the initial patient positioning and/or the initial surgical access point for a surgical procedure. The modified patient position and/or the modified surgical access point may minimize or reduce heavy labor and/or overstress of the HCPs.

The position of the patient on the operating table may be determined. Prior to a surgical procedure, a patient may be transferred to an operating table. An OR team may plan and/or coordinate the position of the patient on the operating table. The position of the patient may create delays during surgery, for example, due to stopping the procedure to reposition the patient. The recommended position of the patient may be determined, for example by the surgical computing system, based on one or more of the patient characteristic or profile, the surgical procedure type, the OR room layout, and/or surgical equipment positioning. The surgical computing system determining the recommended position of the patient on the operating bed may reduce setup time, for example, by allowing HCPs or an OR team to plan, coordinate, and/or direct focus to other tasks.

For example, based on the monitored data and the determined recommended position of the patient, the surgical computing system may determine whether the current patient position is proper. The surgical computing system may determine feedback based on the determination of whether the current patient position is proper. For example, feedback to change (e.g., and how to change) the patient positioning may be determined based on an improper positioning. Feedback confirming proper patient positioning may be determined if the monitored data indicates proper positioning. The surgical computing system may indicate the recommended patient positioning by casting an outline for proper positioning of the patient on the operating table.

A surgical computing system may determine patient positioning parameters based on surgical monitoring data. Injuries and complications may be prevented through proper patient positioning throughout a surgical procedure. Proper patient positioning may be determined based on surveillance of an OR team. In examples, the surgical computing system receive monitored data associated with an OR and an OR team. The surgical computing system may obtain monitored data associated with patient positioning in the OR. The surgical computing system may obtain monitored data associated with movements or repositioning of the patient, for example, after general anesthesia is administered. The surgical computing system may determine whether it safe to move a patient based on surgical monitoring data such as the blood pressure and/or blood pressure alteration(s) of the patient. The surgical computing system may indicate that it is safe to move the patient on a condition that monitored data indicates a safe systemic blood pressure.

It may be important for an HCP to manage monitors, intravenous lines, and/or endotracheal tubes when moving a patient. The surgical computing system may receive monitored data associated with the monitors, intravenous lines, and/or endotracheal tubes prior to, during, and after movement of a patient. Based on the monitored data, the surgical computing system may determine parameters associated with modifying the patient positioning in the OR. The surgical computing system may determine parameters associated with changing the patient positioning based on the monitored data, for example, to prevent complications. With the surgical computing system determining the patient positioning needs, the OR team or anesthesiologist may spend focus, energy, and/or time on other tasks.

For example, the surgical computing system may determine a risk level associated with a surgical procedure, for example, based on monitored data or historical data. For example, the surgical computing system may monitor patient positioning and/or surgical devices within an OR, such as intravenous lines and tubes, for example. The surgical computing system may determine a risk level associated with the positioning of a patient and/or surgical devices, for example, based on the monitored data. The determined risk level may be associated with a surgical complication. In examples, an improper positioning of surgical devices may increase the risk level in a surgical procedure. The surgical computing system may determine a risk level to be good, low risk, or high risk. The risk level determined to be good may indicate that a positioning of a surgical device is proper and risk of surgical complication is not a concern. A risk level determined to be low risk may indicate that a positioning of a surgical device has a low risk of surgical complication. A risk level determined to be high risk may indicate that a positioning of a surgical device has a high risk of surgical complication. The surgical computing system may determine parameters associated with the positioning of the surgical devices, for example, based on the monitored data. The parameters may include recommendations for positioning of the surgical devices, for example, to decrease the risk of surgical complication.

The surgical computing system may determine the risk of a particular injury or complication based on the monitored data and potential injuries. A range of injuries may occur if a patient is placed or moved improperly during a surgical procedure or if surgical devices are in improper positions. For example, the injuries may include a peripheral nerve injury and/or a postoperative visual loss.

A peripheral nerve injury may be caused by poorly positioned patients. The peripheral nerve injury may result in minor or serious conditions. For example, a peripheral nerve injury may result in a numb arm. A peripheral nerve injury may result in a serious morbidity. Types of peripheral nerve injuries may include an ulnar injury, a brachial plexus injury, and a spinal cord injury. For example, ulnar injuries may occur. Ulnar injuries may occur during surgery. The ulnar nerve may run along the ulna bone. The ulnar nerve may give sensation to a forearm, fourth finger, and/or fifth finger. If the ulnar nerve is compressed, feeling may be cut off from the area. Compression of the ulnar nerve may occur if there is extreme flexion of the elbow, which may stretch the nerve. For example, brachial plexus injuries may occur. Brachial plexus injuries may occur due to improper positioning of patients during surgery. The brachial plexus may include a network of nerves extending from the spinal cord through the neck and into the armpit. If the brachial plexus is improperly positioned, patients may experience numbness and/or weakness in the upper extremity.

For example, spinal cord injuries may occur. Spinal cord injuries may be a severe peripheral nerve injury. Injury to the spinal cord may occur due to improper placement of a patient's neck during a surgical procedure. Spinal cord injuries may result in one or more of tissues ischemia, pulmonary compromise, and/or compartment syndrome. Tissue ischemia may be a restriction of blood supply to tissues, which may cause a shortage of oxygen necessary to keep tissue alive. Ischemia may occur if a patient is improperly adjusted while lying flat on their back. Pulmonary problems may occur if surgery is performed in the lateral decubitus position. Pulmonary compromise may occur due to movement of abdominal contents and/or the mediastinum, which improve airway movement and increase blood flow. Compartment syndrome may occur during surgical procedures, for example, in long surgical procedures. Compartment syndrome may occur if surgery is performed in lithotomy position or lateral decubitus position. Compartment syndrome may include pressure buildup within muscles. Compartment syndrome may include pressure buildup within muscles that decreases blood flow and/or prevents oxygen from reaching nerve and/or muscle cells.

For example, the surgical computing system may determine parameters associated with operation of a visual display. The surgical computing system may obtain monitored data associated with one or more of a head or the eye position of an HCP. Based on the monitored data, the surgical computing system may determine parameters associated with operation of the visual display. The display operation parameters associated with the visual display may be generated based on monitored eye strain and/or monitored viewing position.

In examples, the surgical computing system may determine parameters for reducing eye strain. Improper monitor settings may lead to eye strain, eye fatigue, and/or headaches. An OR surveillance system, such as the HCP monitoring system described herein for example, may monitor eye motions and strain of an HCP during surgery. The surgical computing system may obtain monitored data associated with eye strain. Based on the monitored data, the surgical computing system may determine eye strain associated with the HCP. The surgical computing system may determine display operation parameter(s) associated with a visual display based on the monitored data associated with eye strain. The display operation parameters may include one or more of a setting or adjustment for brightness, color temperature, color contrast, or font associated with the visual display. The surgical computing system may determine display operation parameter(s) associated with one or more visual displays based on the determined eye strain associated with one or more HCPs.

For example, the surgical monitoring system may determine to enlarge a section of the display, implement a zoomed-in or zoomed-out view and/or increase the font of the display, and may send parameters to effectuate the determined adjustment(s).

The surgical monitoring system may, based on the received monitored data determine the direction that the HCP is looking, for example. The surgical monitoring system may identify, based on the received monitoring data that the HCP is looking at a particular portion of the display. The surgical computing system may determine to enlarge the identified portion of the display that the HCP is viewing.

For example, the surgical monitoring system may determine to enlarge a particular portion of the display based on eye strain. The surgical monitoring system may detect, based on the received monitored data that an HCP suffers from eye strain. Eye strain may be detected based on HCP squinting, moving closer to a monitor, increased blink rate, sclera (e.g., red eyes). Based on the determination, the surgical monitoring system may enlarge the identified portion of the display that the HCP is viewing to reduce eye strain. The surgical monitoring system may continue to enlarge the particular portion of the display until eye strain is reduced. The surgical monitoring system may determine to return the display to a normal or the default view upon determining that the HCP is viewing a different portion of the display or is looking away from the display. The surgical monitoring system may determine to return the display to a normal or the default view based on a task completion.

For example, the surgical computing system may determine display operation parameter(s) associated with the brightness of the display based on the energy level and/or fatigue level of the HCP. Details on energy level and fatigue level measurements are described in U.S. application Ser. No. 17/156,287, titled METHOD OF ADJUSTING A SURGICAL PARAMETER BASED ON BIOMARKER MEASUREMENTS, filed Jan. 22, 2021, the disclosure of which is herein incorporated by reference in its entirety. Increasing the brightness of a monitor may reduce the flicker rate of the computer. Increasing the brightness of a monitor and/or reducing the flicker rate of a computer may reduce fatigue. A bright monitor may cause pupils to constrict. Constricted pupils may result in a greater range of focus. A greater range of focus may reduce the need for an eye to accommodate. A greater range of focus may enable an HCP to work longer and/or work with more comfort.

For example, the surgical computing system may determine display operation parameter(s) associated with monitor color temperature. The surgical computing system may determine the monitor color temperature based on the amount of light in the OR. In examples, the surgical computing system may determine to use a warmer color temperature in a dark room. A warmer color temperature may include a yellow-based color temperature. In examples, the surgical computing system may determine to use a colder color temperature in a bright room. A colder color temperature may include a blue-based color temperature.

For example, the surgical computing system may determine display operation parameter(s) associated with monitor contrast. Low contrast on a display and/or monitor may cause eye strain. Higher contrast on a display and/or monitor may reduce eye strain. In examples, a surgical computing system may determine to increase a monitor contrast based on monitored data indicating HCP eye strain.

For example, the surgical computing system may determine display operation parameter(s) associated with monitor font size(s). Small font size may cause eye strain. In examples, the surgical computing system may determine to increase a monitor font based on monitored data indicating HCP eye strain.

For example, the surgical computing system may determine display parameters associated with monitor position. Monitor position may be optimized for a surgical procedure. For example, the optimal view for a laparoscopy surgical procedure may include a monitor positioning at or within 15 to 40 degrees below the horizontal plane of the eye of the viewing HCP. A monitor positioning at 25 degrees below the horizontal plane of the eye of the viewing HCP may be optimal for a laparoscopy surgical procedure. The monitor positioning at or within 15 to 40 degrees or at 25 degrees below the horizontal plane of the eye of the viewing HCP may cause the least amount of neck strain. Adjusting surgical equipment to ergonomic needs of an HCP may minimize neck strain. The surgical computing system may determine, based on monitored data, if a monitor is not in a proper position. The surgical computing system may determine a proper angle for the monitor, for example, to suit the ergonomic needs of the HCP and may indicate the proper angle via the display parameter(s).

At 38122, the surgical computing system may communicate the parameters. The surgical computing system may communicate the parameters to one or more systems associated with the operating room. The surgical computing system may instruct a display to display the parameters, for example, to the HCP within the OR. The parameters may be included in recommendations or feedback for an OR layout. The parameters may be included in recommendations or feedback for operating a display. The parameters may be included in recommendations or feedback for operating or positioning surgical equipment and/or devices. The parameters may be included in recommendations or feedback for patient positioning. The parameters may be included in instructions for operation of surgical equipment. For example, the surgical computing system may communicate the parameters as part of instruments or control signal to surgical equipment. For example, the surgical computing system may communicate the parameters as part of instruments or control signal to a display. The surgical computing system may communicate a determined risk level and/or parameters associated with the risk level, such as surgical device positioning, for example, to a display.

At 38124, surgical equipment may receive parameters. Surgical equipment may receive parameters from the surgical computing system. Surgical equipment may include surgical instruments, surgical devices, surgical robots, surgical tables, an operating bed, and/or the like.

At 38126, surgical equipment may modify its operation. The surgical equipment may modify its operation based on parameters. The surgical equipment may modify its operation based on the parameters received from the surgical computing system. For example, an HCP using a surgical instrument may experience fatigue, such as a weakened grip on a surgical instrument trigger. The surgical computing system may determine, based on monitored data, parameters associated with reducing fatigue. The parameters may include increasing power to the surgical instrument. The surgical computing system may communicate the parameters to the surgical instrument. The surgical instrument may modify its operation such that the surgical instrument may output a higher power despite a weakened grip by the HCP.

At 38128, a display may receive parameters. The display may receive the parameters from the surgical computing system. The display may be a surgical display. The display may be a monitor. The display may be a part of a surgical hub as described herein. The display may be a part of the surgical computing system.

At 38130, the display may present parameters. The display may present the parameters, for example, received from the surgical computing device. For example, the display may present the parameters associated with patient positioning. The display may present an outline of the patient on the operating bed for the proper positioning of a patient for the surgical procedure.

The display may present one or more notifications configured to indicate suggested actions for HCPs to take. The suggested actions may include instructions for performing a surgical procedure or surgical plan. The suggested actions may include instructions for implementing ergonomic positioning within the OR. The suggested actions may include instructions to modify movement and/or posture for HCPs and/or a patient.

For example, the display may present parameters associated with HCP and/or surgical equipment positioning within the OR. In an example, the display may present parameters associated with one or more of table height, mayo stand placement and/or angle, or monitor position and/or angle. The display may present the parameters for the HCP to maintain a neutral position and/or minimize extension or flexion for reach and neck or back strain. The display may present recommendations to HCPs associated with a neutral and/or correct posture. The display may present recommendations throughout a surgical procedure.

For example, the display may present a risk level associated with a surgical procedure, for example, based on monitored data or historical data. The display may receive parameters and/or feedback associated with the risk level. The display may present the parameters and/or feedback associated with the risk level, for example, to HCPs within the OR. The display may use colors to indicate risk level. For example, a color may be associated with a particular risk level. In examples, a risk level determined to be good may be presented as green, a risk level determined to be low risk may be presented as yellow, and/or a risk level determined to be a high risk may be presented as red.

At 38132, the display may modify its operation. The display may modify its operation based on display operation parameters received from the surgical computing device, for example. The display may modify its operation based on display operation parameters associated with reducing eye strain. The display may modify its operation based on display operation parameters associated with ergonomic positioning, such as the positioning of the display.

For example, in response to receiving display operation parameters associated with reducing eye strain from the surgical computing system, the display may modify settings of the display. The display may modify the brightness, color temperature, color contrast, font and/or the like based on the received parameters. For example, the display may increase monitor brightness to reduce eye strain. The display may modify color temperature to reduce eye strain (e.g., to use warm color temperature in an environment with dark lighting, to use cool color temperature in an environment with bright lighting).

For example, the display may receive parameters associated with ergonomic positioning. The display may receive parameters associated with the positioning of the display. The display may receive parameters associated with the positioning of the display with respect to the HCP. The monitor may receive parameters associated with the positioning of the display for a surgical procedure.

For example, the display may modify its positioning to reduce wear on an HCP. The surgical computing system may receive monitored data associated with the head or eye position of the HCP. For example, the surgical computing system may receive monitored data, such as a picture, frame, video, and/or the like, from a camera or surveillance system in the OR. The surgical computing system may determine parameters associated with the position of a visual display, for example, based on the monitored data. For example, the surgical computing system may determine a position of the HCP, such as location within the OR and the HCP's head and eye position, and a display's position and orientation, based on the monitored data. The surgical computing system may determine the HCP's viewing angle of the display, for example, based on HCP location, HCP's head or eye position, and/or monitor position and orientation. Based on the determined viewing angle, the surgical computing system may determine adjustment parameters to modify the display positioning and orientation, for example, to improve motions and/or postures and/or reduce eye strain.

Figure 19:
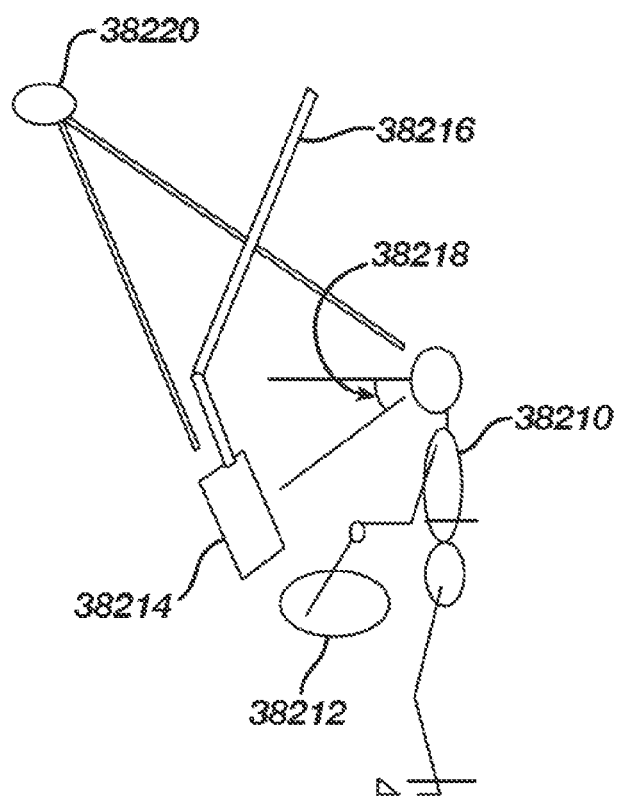
FIG. 19 illustrates an example display position within an operating room.

FIG. 19 illustrates an example display position within an operating room. As shown in FIG. 19, an HCP 38210 may be performing a surgical procedure in an operating room at a surgical site 38212 on a patient. The HCP 38210, during the surgical procedure, may use a surgical display 38214. The position and/or orientation of the surgical display 38214 may be controlled by a multi-axis control arm 38216. As shown in FIG. 19, a viewing angle 38218 may be the angle between the horizontal plane of the eyes of the HCP 38210 and the line of sight towards the surgical display 38214. The operating room may include a surveillance system 38220, which may include, for example, a camera. The surveillance system 38220 may monitor the position of the HCP 38210 and the surgical display 38214. The surveillance system 38220 may calculate the viewing angle 38218, for example, based on the monitored position of the HCP 38210 and the surgical display 38214. For example, the surveillance system 38220 may send the monitored position data to a surgical computing system, and the surgical computing system may calculate the viewing angle 38218 based on the position of the HCP 38210 and the surgical display 38214. Based on the viewing angle, the surgical computing system may determine whether the HCP 38210 is maintaining neutral posture and/or whether the surgical display 38214 is properly positioned. The surgical computing system may determine adjustment parameters for the surgical display, such as a modified position and/or orientation such that the viewing angle is ergonomic and/or improves the HCP's posture.

In examples, the surgical computing system may determine parameters associated with operation or a position of a visual display based on the surgical procedure. For example, in laparoscopic procedures, a display positioning where the display is at or within the range of 15 and 40 degrees below the horizontal plane of an eye of an HCP may minimize neck strain for the HCP. A display positioning where the display is at 25 degrees below the horizontal plane of the eye of the HCP may minimize neck strain for the HCP.

The surgical computing system may communicate the parameters associated with the display positioning to the display. The display may indicate to the OR team a notification based on the parameters. For example, the display may indicate to the OR team that the display is not in the correct position, for example, outside the range of 15 and 40 degrees below the horizontal plane of the eyes of an HCP in laparoscopic procedures. The display's position may be modified, for example, using a multi-axis control arm. The surgical computing system and/or HCP monitoring system may modify the display's position. The display's position may be modified based on determined adjustment parameters from the surgical computing system. The modified display position may minimize or reduce neck strain.

For example, the display may continuously receive parameters associated with ergonomic positioning of the display from the surgical computing system throughout a surgical procedure. The display may continuously modify its operation, for example, its positioning, based on the received parameters throughout the surgical procedure.

Tracking and adjusting a display may be performed. A display may be adjusted based on the HCP using the display and/or the HCP viewing the display. For example, monitor triangulation may be performed. Monitor triangulation with an HCP may be performed based on the head and eye motions of the HCP. Monitor positioning may be determined based on the head and eye motions of the HCP. A monitor positioning may be in an incorrect location, for example, not visible to an HCP using or viewing the display.

For example, the surgical computing system may determine one or more parameters associated with operation of a visual display.

The display may include a self-adjusting monitor. The display may allow a surgical computing system or surgical hub to change the position and/or angle of the monitor. The display may allow the surgical computing system or surgical hub to change the position and/or angle of the monitor to a surgeon using the system.

Figure 20:
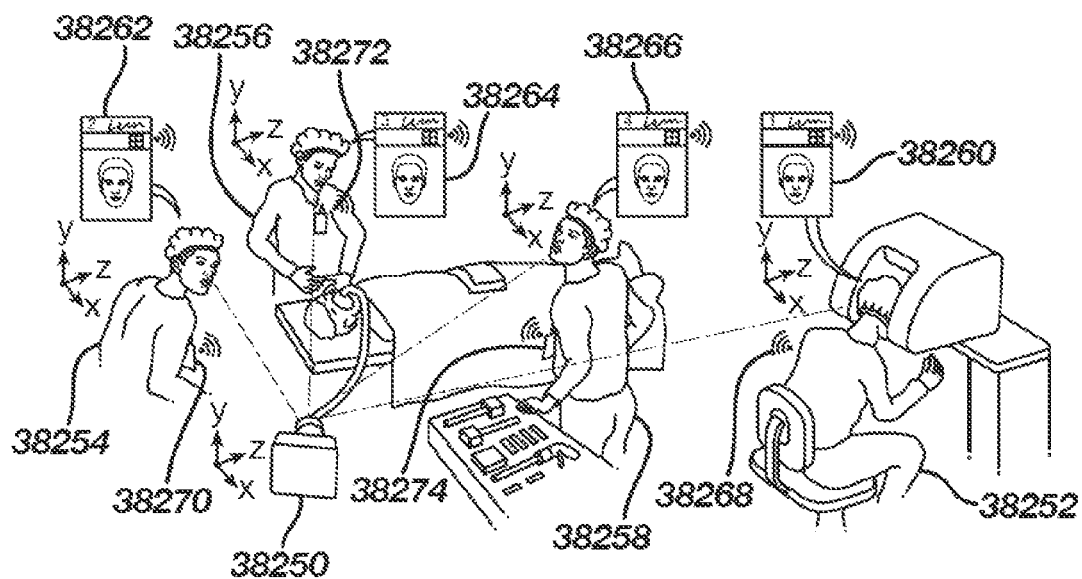
FIG. 20 illustrates an example operating room that includes a surveillance system monitoring head and eye positioning of healthcare professionals.

FIG. 20 illustrates an example operating room that includes a surveillance system monitoring head and eye positioning of healthcare professionals. As shown in FIG. 20, an OR may be monitored using a camera. The camera may monitor the locations, positions, and/or orientations of HCP(s) within the operating room, such as HCP(s) location and/or angle relative to display. For example, the camera may monitor HCPs head or eye position and/or eye contact to the camera and/or display. The camera may send the monitored data to the surgical computing system. HCP(s) within the OR may have an HCP role or job associated with a surgical procedure. For example, as shown in FIG. 20, the HCPs in the OR may be a primary surgeon 38252, an anesthesiologist 38254, a physician assistant 38256, or a nurse 38258.

As shown in FIG. 20, HCP(s) ID and/or role may be determined, for example, using RF signals or facial recognition algorithms. The camera 38250 may monitor HCPs 38252, 38254, 38256, and 38258 within an OR. For example, the camera may use facial recognition algorithms to identify the HCPs within the OR. The camera 38250 may monitor (e.g., capture) the faces of the HCP(s) 38260, 38262, 38264, and 38266 within the OR. Based on the faces of the HCP(s), the camera may use facial algorithms to identify the HCPs. For example, the camera may receive RFID signals from an ID card 38268, 38270, 38272, and 38274 on the HCP(s). Based on the RFID signals, the camera may determine the HCP(s) ID and/or role. Based on the HCP(s) ID, the camera may determine the HCP(s) roles. For example, the camera may determine that HCP 38252 is the primary surgeon, HCP 38254 is the anesthesiologist, HCP 28256 is the physician assistant, and/or HCP 38258 is the nurse. The determinations described herein may be performed by the surgical computing system.

An HCP priority may be determined, for example, by the camera 38250 or a surgical computing system. The surgical computing system may determine an HCP priority, for example, based on a surgical procedure, a surgical procedure step, an HCP ID, an HCP role, and/or the like. For example, an anesthesiologist may have the highest HCP priority (e.g., a first priority), during a surgical procedure step associated with administering general anesthesia. For example, a primary surgeon, an anesthesiologist, a physician assistant, and a nurse may have different a priority based on the surgical procedure and/or step of the surgical procedure. For example, the primary surgeon may have the highest priority (e.g., first priority), the anesthesiologist may have the second highest priority (e.g., second priority), the physician assistant may have the third highest priority (e.g., third priority), and the nurse may have the fourth highest priority (e.g., fourth priority). The priority level may be associated with, for example, a priority for viewing a display.

Figure 21:
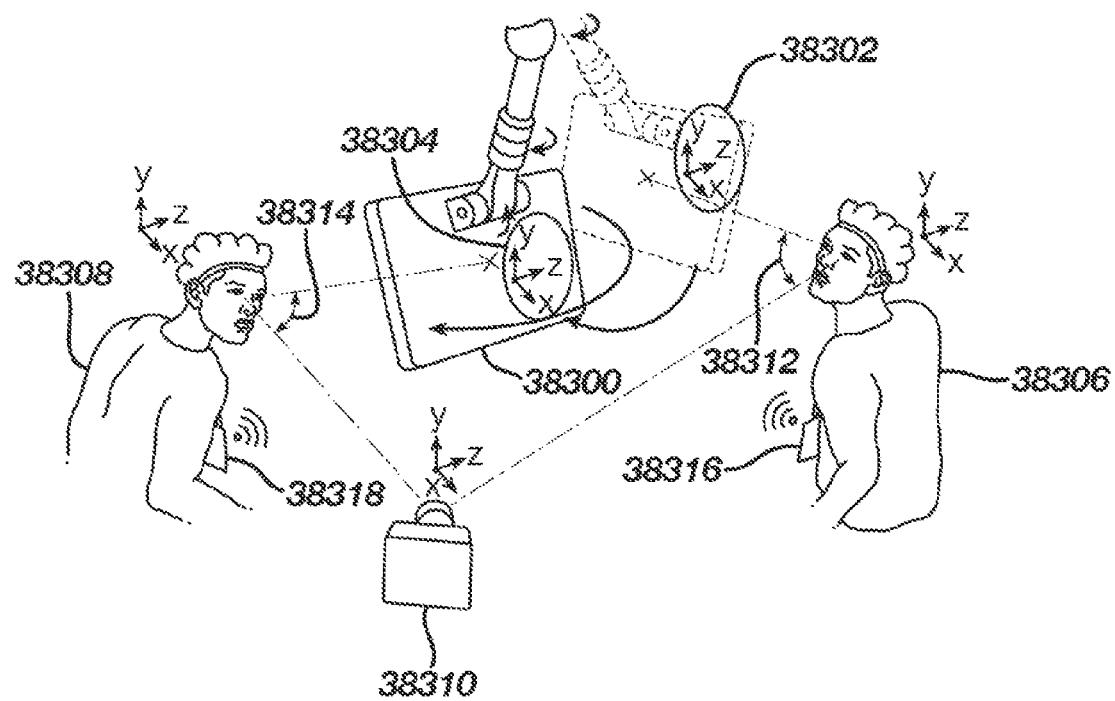
FIG. 21 illustrates an example display in an operating room that may pivot positioning and orientation between healthcare professionals.

FIG. 21 illustrates an example display in an operating room. As shown in FIG. 21, the display 38300 may pivot positions and orientations, for example, between healthcare professionals. For example, the display 38300 may pivot from a first position and/or orientation 38302 to a second position and/or orientation 38304. The surgical computing system may determine to pivot the position and/or orientation of the display 38300, for example, based on determined display adjustment parameters associated with ergonomic positioning within the OR. The display adjustment parameters may be determined based on the HCP(s) present in an OR and/or the roles of the present HCP(s).

As shown in FIG. 21, a first HCP 38306 and a second HCP 38308 may be present in an OR. A camera 38310 may monitor the first HCP 38306 and the second HCP 38308. The camera may send monitored data to the surgical computing system, and the surgical computing system may determine display adjustment parameters based on the monitored data. For example, the surgical computing system may determine a first angle of viewing 38312 associated with the first HCP 38306 and a second angle of viewing 38314 associated with the second HCP 38308. The surgical computing system may determine display adjustment parameters based on the first angle of viewing 38312 and the second angle of viewing 38314.

The surgical computing system may determine display adjustment parameters based on HCP priority, for example, if multiple HCPs are viewing the display. The surgical computing system may determine HCP priority based on an RFID signal on an HCP ID card 38316 and 38318 and/or facial recognition algorithms. For example, the surgical computing system may determine display adjustment parameters to pivot the display toward the higher priority HCP. If an anesthesiologist and a nurse are looking at the display, the surgical computing system may determine display adjustment parameters pivoting the position and orientation of the monitor to face the anesthesiologist, for example, if the anesthesiologist has a higher priority than the nurse. For example, the display adjustment parameters may be switching the display 38306 from the first position and/or orientation 38302 to the second position and/or orientation 38304, such that the higher priority HCP has an improved view.

The invention claimed is:

1. A surgical computing system comprising:
a processor configured to:
receive first monitored data associated with air-born particles in an operating room;
receive second monitored data associated with the operating room, the second monitored data comprising data associated with noise in the operating room;
determine, based on the first monitored data associated with air-born particles in the operating room, an elevated risk level to a healthcare professional in the operating room;
determine, based upon the elevated risk level, one or more air filtration parameters for one or more control systems in the operating room, the one or more air filtration parameters associated with increasing intensity of operation of an air filtration system;
determine, based at least in part on the data associated with noise in the operating room, one or more display parameters for the one or more control systems in the operating room, the one or more display parameters comprising one or more parameters for controlling a display system to emphasize patient biomarker data on the display system;
communicate the one or more air filtration parameters to the air filtration system; and
communicate the one or more display parameters to the display system.

2. The surgical computing system of claim 1, wherein the one or more display parameters comprise one or more parameters associated with prioritizing display of data on the display system.

3. The surgical computing system of claim 1, wherein the processor is further configured to:
receive monitored data associated with a healthcare professional in the operating room; and
determine, based on the monitored data associated with the healthcare professional, one or more parameters for a lighting system; and
communicate the one or more parameters for the lighting system to the lighting system.

4. The surgical computing system of claim 3, wherein the monitored data associated with the healthcare professional comprises data associated with visual focus of the healthcare professional.

5. The surgical computing system of claim 1,
wherein the processor is further configured to:
receive monitored data associated with air composition in the operating room;
determine, based on the monitored data associated with air composition in the operating room, one or more parameters for one or more air handling systems in the operating room; and communicate the one or more parameters for the one or more air handling systems to the one or more air handling systems.

6. The surgical computing system of claim 5,
wherein the data associated with air composition in the operating room comprises data associated with particulates in air in the operating room,
wherein the processor configured to determine the one or more parameters for the one or more air handling systems in the operating room is configured to determine one or more parameters for one or more air duct controls to adjust air flow in the operating room.

7. The surgical computing system of claim 5,
wherein the data associated with air composition in the operating room comprises data associated with particulates in air in the operating room,
wherein the processor configured to determine the one or more parameters for the one or more air handling systems in the operating room is configured to determine one or more parameters for one or more air pressure controls to adjust air flow in the operating room.

8. The surgical computing system of claim 1,
wherein the processor is further configured to:
receive monitored data associated with a patient or a healthcare professional in the operating room;
determine, based on the monitored data associated with the patient or the healthcare professional in the operating room, one or more parameters for one or more temperature control systems in the operating room; and
communicate the one or more parameters for the one or temperature control systems to the one or more temperature control systems.

9. The surgical computing system of claim 8,
wherein the monitored data associated with the patient or the healthcare professional comprises data associated with body temperature associated with one or more of the patient or the healthcare professional.

10. The surgical computing system of claim 9,
wherein the data associated with body temperature associated with one or more of the patient or the healthcare professional comprises data indicating the data associated with body temperature is below a threshold;
wherein the processor configured to determine the one or more parameters for the one or more temperature control systems is configured to determine one or more parameters associated with the one or more temperature control systems increasing air temperature.

11. The surgical computing system of claim 1,
wherein the processor is further configured to:
determine parameters associated with a healthcare professional participating in a surgical procedure in the operating room, the parameters associated with the healthcare professional comprising parameters associated with preferences of the healthcare professional for the operating room during the surgical procedure;
receive monitored data associated with a step in the surgical procedure and monitored data associated with an environment in the operating room;
determine, based at least in part on the monitored data associated with the step in the surgical procedure, the monitored data associated with the environment in the operating room, and the parameters associated with the preferences of the healthcare professional for the operating room, one or more adjustment parameters for adjusting one or more systems in the operating room during the surgical procedure consistent with the preferences of the healthcare professional; and
communicate the one or more adjustment parameters to the one or more control systems.

12. The surgical computing system of claim 11,
wherein the one or more adjustment parameters for adjusting one or more systems in the operating room comprise parameters associated with increasing volume of speech associated with the healthcare professional.

13. The surgical computing system of claim 11,
wherein the one or more adjustment parameters for adjusting one or more systems in the operating room comprise parameters associated with increasing noise cancellation in the operating room.

14. The surgical computing system of claim 11,
wherein the one or more adjustment parameters for adjusting one or more the systems in the operating room comprise parameters associated with augmenting audible cues associated with the surgical procedure.

15. The surgical computing system of claim 1,
wherein the first monitored data associated with air-born particles in the operating room comprises data associated with an occurrence of exhaling by an infectious patient.

16. The surgical computing system of claim 1,
wherein the first monitored data associated with air-born particles in the operating room comprises data associated with an occurrence of a smoke plume associated with operation on cancerous tissue.

* * * * *